(12) United States Patent
King et al.

(10) Patent No.: US 10,453,029 B2
(45) Date of Patent: Oct. 22, 2019

(54) BUSINESS PROCESS FOR ULTRA TRANSACTIONS

(75) Inventors: Nigel King, San Mateo, CA (US); Joe Grundfest, Palo Alto, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 2058 days.

(21) Appl. No.: 11/831,762

(22) Filed: Jul. 31, 2007
(Under 37 CFR 1.47)

(65) Prior Publication Data

US 2008/0183519 A1    Jul. 31, 2008

Related U.S. Application Data

(60) Provisional application No. 60/921,472, filed on Aug. 3, 2006.

(51) Int. Cl.
*G06Q 10/10* (2012.01)
*G06Q 40/00* (2012.01)

(52) U.S. Cl.
CPC ............ *G06Q 10/10* (2013.01); *G06Q 40/12* (2013.12)

(58) Field of Classification Search
USPC ................................................ 705/1.1, 7, 11
See application file for complete search history.

(56) References Cited

U.S. PATENT DOCUMENTS

| 5,537,590 A | 7/1996 | Amado |
| 5,611,052 A | 3/1997 | Dykstra et al. |
| 5,701,400 A | 12/1997 | Amado |
| 5,726,914 A | 3/1998 | Janovski et al. |
| 5,737,494 A | 4/1998 | Guinta et al. |
| 5,737,656 A | 4/1998 | Zander et al. |

(Continued)

FOREIGN PATENT DOCUMENTS

| WO | 2004088561 | 10/2004 |
| WO | 2005055098 | 6/2005 |

OTHER PUBLICATIONS

Sarbanes-Oxley Act of 2002, Jul. 30, 2002, Public Law 107-204, 116 STAT. 745, pp. 27-29.*

(Continued)

*Primary Examiner* — Jan P Mincarelli
(74) *Attorney, Agent, or Firm* — Invoke

(57) ABSTRACT

An audit system automatically ensures compliance with relevant policy by identifying an entity offering a non-audit service that also provides audit services to the enterprise, and ensuring the service is permissible and proper approval has been obtained. If the non-audit service is prohibited or proper approval from an audit committee has not been obtained, execution of the service is prevented. When a permissible non-audit service is executed, this service can be monitored and execution suspended when circumstances change such that the service is no longer permissible or approval for the service expires. The audit system can forward a message to the audit committee or other authority about any suspended business process. If the audit committee subsequently approves the suspended permissible non-audit service, execution of the instance of the business process resumes. The audit system determines whether the vendor entity was paid demands a refund where necessary.

26 Claims, 45 Drawing Sheets

(56) References Cited

U.S. PATENT DOCUMENTS

| | | | |
|---|---|---|---|
| 5,754,857 A | 5/1998 | Gadol | |
| 5,930,762 A | 7/1999 | Masch | |
| 5,960,404 A | 9/1999 | Chaar et al. | |
| 6,044,354 A | 3/2000 | Asplen, Jr. | |
| 6,148,335 A | 11/2000 | Haggard et al. | |
| 6,151,582 A | 11/2000 | Huang et al. | |
| 6,154,753 A | 11/2000 | McFarland | |
| 6,272,472 B1 | 8/2001 | Danneels et al. | |
| 6,311,166 B1 | 10/2001 | Nado et al. | |
| 6,327,656 B2 | 12/2001 | Zabetian | |
| 6,336,094 B1 | 1/2002 | Ferguson et al. | |
| 6,601,233 B1 | 7/2003 | Underwood | |
| 6,643,625 B1 | 11/2003 | Acosta et al. | |
| 6,654,788 B1 | 11/2003 | Chance et al. | |
| 6,714,915 B1 | 3/2004 | Barnard et al. | |
| 6,727,106 B1 | 4/2004 | Ankutse et al. | |
| 6,748,818 B2 | 6/2004 | Jensen et al. | |
| 6,763,353 B2 | 7/2004 | Li et al. | |
| 6,850,643 B1 | 2/2005 | Smith, II et al. | |
| 6,876,992 B1 | 4/2005 | Sullivan | |
| 7,003,477 B2 | 2/2006 | Zarrow | |
| 7,006,992 B1 | 2/2006 | Packwood | |
| 7,062,749 B2 | 6/2006 | Cyr et al. | |
| 7,069,234 B1 | 6/2006 | Cornelius et al. | |
| 7,076,727 B1 | 7/2006 | Flam et al. | |
| 7,113,914 B1 | 9/2006 | Spielmann et al. | |
| 7,136,827 B2 | 11/2006 | Eicher | |
| 7,185,010 B2 | 2/2007 | Morinville | |
| 7,185,192 B1 | 2/2007 | Kahn | |
| 7,188,169 B2 | 3/2007 | Buus et al. | |
| 7,216,132 B1 | 5/2007 | Flam | |
| 7,222,329 B2 | 5/2007 | Cole et al. | |
| 7,246,137 B2 | 7/2007 | Paulus et al. | |
| 7,249,074 B1 | 7/2007 | Land et al. | |
| 7,290,275 B2 | 10/2007 | Baudoin et al. | |
| 7,346,527 B2 | 3/2008 | McKay et al. | |
| 7,373,310 B1 | 5/2008 | Homsi | |
| 7,412,520 B2 | 8/2008 | Sun | |
| 7,421,704 B2 | 9/2008 | Young | |
| 7,505,933 B1 * | 3/2009 | Gutierrez et al. | 705/35 |
| 7,523,053 B2 | 4/2009 | Pudhukottai et al. | |
| 7,603,674 B2 | 10/2009 | Cyr et al. | |
| 7,752,070 B2 | 7/2010 | Hatcher et al. | |
| 7,752,124 B2 | 7/2010 | Green et al. | |
| 7,813,947 B2 | 10/2010 | DeAngelis et al. | |
| 7,885,841 B2 | 2/2011 | King | |
| 7,899,693 B2 | 3/2011 | King | |
| 7,941,353 B2 | 5/2011 | King et al. | |
| 8,005,709 B2 | 8/2011 | King et al. | |
| 8,086,635 B1 * | 12/2011 | Rinker | G06F 21/604 |
| | | | 707/783 |
| 8,296,167 B2 | 10/2012 | King et al. | |
| 8,712,813 B2 | 4/2014 | King | |
| 2001/0004774 A1 | 6/2001 | Huang | |
| 2001/0027388 A1 | 10/2001 | Beverina et al. | |
| 2001/0047274 A1 | 11/2001 | Borton | |
| 2002/0035495 A1 | 3/2002 | Spira et al. | |
| 2002/0038217 A1 | 3/2002 | Young | |
| 2002/0046051 A1 | 4/2002 | Katzman et al. | |
| 2002/0059093 A1 | 5/2002 | Barton et al. | |
| 2002/0082891 A1 | 6/2002 | Mckay et al. | |
| 2002/0082895 A1 | 6/2002 | Budka et al. | |
| 2002/0095322 A1 | 7/2002 | Zarefoss | |
| 2002/0099579 A1 | 7/2002 | Stowell et al. | |
| 2002/0099586 A1 | 7/2002 | Bladen et al. | |
| 2002/0129221 A1 | 9/2002 | Borgia et al. | |
| 2002/0138307 A1 | 9/2002 | Kramer | |
| 2002/0143595 A1 | 10/2002 | Frank et al. | |
| 2002/0174050 A1 | 11/2002 | Eynard et al. | |
| 2002/0174093 A1 | 11/2002 | Casati et al. | |
| 2002/0184130 A1 | 12/2002 | Blasko | |
| 2002/0188629 A1 | 12/2002 | Burfoot | |
| 2002/0188653 A1 | 12/2002 | Sun | |
| 2002/0194042 A1 | 12/2002 | Sands | |
| 2002/0194059 A1 | 12/2002 | Blocher et al. | |
| 2002/0194942 A1 | 12/2002 | Jensen et al. | |
| 2002/0198727 A1 | 12/2002 | Ann et al. | |
| 2003/0046130 A1 | 3/2003 | Golightly et al. | |
| 2003/0069821 A1 | 4/2003 | Williams | |
| 2003/0070072 A1 | 4/2003 | Nassiri | |
| 2003/0110249 A1 | 6/2003 | Buus et al. | |
| 2003/0126073 A1 | 7/2003 | Lawrence | |
| 2003/0126181 A1 | 7/2003 | Young | |
| 2003/0126431 A1 | 7/2003 | Beattie et al. | |
| 2003/0149604 A1 | 8/2003 | Casati et al. | |
| 2003/0150909 A1 | 8/2003 | Markham et al. | |
| 2003/0216991 A1 | 11/2003 | Baker | |
| 2003/0225687 A1 | 12/2003 | Lawrence | |
| 2003/0229525 A1 | 12/2003 | Callahan et al. | |
| 2003/0233571 A1 | 12/2003 | Kraus et al. | |
| 2003/0236725 A1 | 12/2003 | Hickox et al. | |
| 2004/0039619 A1 | 2/2004 | Zarb | |
| 2004/0044617 A1 | 3/2004 | Lu | |
| 2004/0054565 A1 | 3/2004 | Nemecek et al. | |
| 2004/0098358 A1 | 5/2004 | Roediger | |
| 2004/0117283 A1 | 6/2004 | Germack | |
| 2004/0122756 A1 | 6/2004 | Creeden et al. | |
| 2004/0128186 A1 | 7/2004 | Breslin et al. | |
| 2004/0143811 A1 | 7/2004 | Kaelicke et al. | |
| 2004/0158475 A1 | 8/2004 | Juzeszyn et al. | |
| 2004/0162741 A1 | 8/2004 | Flaxer et al. | |
| 2004/0177326 A1 | 9/2004 | Bibko et al. | |
| 2004/0181665 A1 | 9/2004 | Houser | |
| 2004/0216039 A1 | 10/2004 | Lane et al. | |
| 2004/0236740 A1 | 11/2004 | Cho et al. | |
| 2004/0257225 A1 | 12/2004 | Webb, Sr. | |
| 2004/0260566 A1 | 12/2004 | King | |
| 2004/0260582 A1 | 12/2004 | King et al. | |
| 2004/0260583 A1 | 12/2004 | King et al. | |
| 2004/0260591 A1 | 12/2004 | King | |
| 2004/0260628 A1 * | 12/2004 | Minton et al. | 705/30 |
| 2004/0260634 A1 | 12/2004 | King et al. | |
| 2005/0010820 A1 | 1/2005 | Jacobson | |
| 2005/0015622 A1 | 1/2005 | Williams et al. | |
| 2005/0065865 A1 * | 3/2005 | Salomon | G06Q 40/00 |
| | | | 705/35 |
| 2005/0065904 A1 | 3/2005 | DeAngelis et al. | |
| 2005/0075978 A1 * | 4/2005 | Leavitt et al. | 705/40 |
| 2005/0108153 A1 | 5/2005 | Thomas et al. | |
| 2005/0131830 A1 * | 6/2005 | Juarez | G06Q 30/02 |
| | | | 705/51 |
| 2005/0197952 A1 | 9/2005 | Shea et al. | |
| 2005/0209876 A1 * | 9/2005 | Kennis et al. | 705/1 |
| 2005/0209899 A1 | 9/2005 | King et al. | |
| 2005/0228685 A1 | 10/2005 | Schuster et al. | |
| 2005/0251464 A1 | 11/2005 | Ames et al. | |
| 2005/0289024 A1 * | 12/2005 | Hahn-Carlson | G06Q 10/10 |
| | | | 705/30 |
| 2006/0059026 A1 | 3/2006 | King et al. | |
| 2006/0064365 A1 | 3/2006 | Yancey | |
| 2006/0074739 A1 | 4/2006 | King et al. | |
| 2006/0089861 A1 | 4/2006 | King et al. | |
| 2006/0106686 A1 | 5/2006 | King et al. | |
| 2006/0129441 A1 | 6/2006 | Yankovich et al. | |
| 2006/0150156 A1 | 7/2006 | Cyr et al. | |
| 2006/0235732 A1 | 10/2006 | Miller et al. | |
| 2006/0241991 A1 | 10/2006 | Pudhukottai et al. | |
| 2007/0022025 A1 | 1/2007 | Litman et al. | |
| 2007/0088636 A1 | 4/2007 | Nault | |
| 2007/0143136 A1 * | 6/2007 | Moore, III | G06Q 10/1095 |
| | | | 705/2 |
| 2007/0150330 A1 | 6/2007 | McGoveran | |
| 2007/0156495 A1 | 7/2007 | King | |
| 2007/0203718 A1 * | 8/2007 | Merrifield, Jr. | G06Q 10/0635 |
| | | | 705/317 |
| 2008/0183519 A1 | 7/2008 | King et al. | |
| 2011/0119107 A1 | 5/2011 | King | |

OTHER PUBLICATIONS

Report of the Committee on Banking, Housing, and Urban Affairs United States Senate, 2002, Senate Report 107-205, pp. 19-20.*

(56) References Cited

OTHER PUBLICATIONS

Approva Introduces BizRights 2.0 Software to Facilitate More Secure Effective Business Controls and Processes, Business Wire, New York,, Apr. 6, 2004, 3 pages.
Financial Audit Guide: Auditing the Statement of Budgetary Resources, United States General Accounting Office, Financial Management and Assurance, Dec. 2001.
Financial Audit Manual, United States General Accounting Office, Accounting and Information Management Division, Jul. 2001.
Oracle Internal Controls Manager 11i. Datasheet [online]. Oracle Corporation, retrieved from the internet: <URL:http://www.doug.org/newsletter/Janurary/OracleInternalControlsManagerDS.pdf> (Dec. 6, 2012), Apr. 2003.
Microsoft Project 2000 for Windows Product Enhancement Guide, Oct. 1999, 46 pages.
Statement of Financial Accounting Standards No. 13, Dialog® File 35: Dissertation Abs online© 2010 Proquest Info & Learnng. A ste of financial statements that included modified treatments for APB Opinion No. 11 (Accounting for Income Taxes), Nov. 1976.
Year 2000 Wire/WRQ Express 2000 Software Manager Eradicate PC Millennium Bug Now; And Pays Back the Investment by Managing Other Issues Beyond 2000, Business Editors /Technology and Y2K Writers, Oct. 5, 1998, 3 pages.
Abhay, Prepare your computer system for inspection; analysis of two years of FDA warning letters will tell you what is under the microscope, Biopharm International, vol. 18, No. 2, ISSN: 1542-166X, Feb. 2005, 10 pages.
Abu-Musa, Auditing E-Business: New Challenges for External Auditors, Journal of American Academy of Business, vol. 4 No. 1/2., Mar. 2004, 13 pages.
Gray, Risk.02, PRAM It or Walk Away, AACE International Transactions, 1998, 4 pages.
Gupta, The Audit Process as a Function of Differentiated Environment: An Empirical Study, Pennsylvania State University, 1987, pp. 1-644.
Higuera et al., Software Risk Management, Technical Report, CMU/SEI-96-TR-012 ESC-TR-096-012, by Software Engineering Institute, Carnegie Mellon University, Jun. 1996.
Hiltebeitel, The Accounting Standards Overload Issue: An Empirical Test of the Effect of Four Selected Financial Accounting Standards on the Lending Decisions of Bankers, Thesis, Drexel University, 1985, 269 pages.
John et al., Oracle Internal Controls Manager—Release 11i, Oracle, Copyright 2003, Mar. 2004.
Kim et al., Using Enterprise Reference Models for Automated ISO 9000 Compliance Evaluation, Proceedings of the 35th Hawaii International Conference on System Sciences, 2002, 10 pages.
King et al., The convergence of financial and supply chain planning, Management Accounting—London vol. 77, No. 5, ProQuest Info & Learning, May 1999, 5 pages.
Kokmen, Web Takes Matchmaking to Online Level, Denver Post, Sep. 21, 1998, F.06.
Krell, Gauge Performance by the Dashboard, Penton Media, Inc., Internet World, Mar. 2003.
Leymann, Managing Business Processes as an Information Resource, IBM Systems Journal, vol. 33, No. 2, 1994, pp. 326-348.
Lightle et al., Segregation of duties in ERP, The Internal Auditor Altamonte Springs vol. 60; Issue 5, Oct. 2003, p. 27.
McDonald, Conservatives Go Exotic, The Bond Buyer, Newspaper ISSN: 0732-0469, Mar. 5, 2002, vol. 339, No. 31337, Mar. 5, 2002, 4 pages.
Middlemiss, Compliance Issues Overwhelm the Industry, Wall Street & Technology, ProQuest Central, Mar. 2004, p. 20.
Payne, The Role of Internal Audit in Relation to Risk Management, Accountancy SA, Jul. 2002, p. 21.
Pierce, International Standards on Auditing: An Update, Accountancy Ireland, vol. 37, No. 3, ISSN: 0001-4699, Jun. 2005, 5 pages.
Simonetti, Auditing Standards Established by the GAO: Their Meaning and Significance for CPAs, Journal of Accountancy, ProQuest Central 137, 000001, Jan. 1974, p. 33.
Warren, Jr., Continuous Auditing: Implications of the Current Technological, Regulatory and Corporate Environment, Texas A&M University, May 2004.
U.S. Appl. No. 10/464,055, Advisory Action dated Nov. 4, 2008, 3 pages.
U.S. Appl. No. 10/464,055, Advisory Action dated Sep. 9, 2009, 4 pages.
U.S. Appl. No. 10/464,055, Final Office Action dated Jun. 17, 2009, 15 pages.
U.S. Appl. No. 10/464,055, Final Office Action dated Apr. 13, 2010, 18 pages.
U.S. Appl. No. 10/464,055, Final Office Action dated Aug. 18, 2008, 22 pages.
U.S. Appl. No. 10/464,055, Non-Final Office Action dated Feb. 26, 2008, 11 pages.
U.S. Appl. No. 10/464,055, Non-Final Office Action dated Aug. 21, 2007, 12 pages.
U.S. Appl. No. 10/464,055, Non-Final Office Action dated Nov. 2, 2009, 18 pages.
U.S. Appl. No. 10/464,055, Non-Final Office Action dated Dec. 24, 2008, 19 pages.
U.S. Appl. No. 10/464,055, Notice of Allowance dated Sep. 8, 2010, 8 pages.
U.S. Appl. No. 10/464,055, Supplemental Notice of Allowance dated Nov. 9, 2010, 10 pages.
U.S. Appl. No. 10/464,417, Advisory Action dated Apr. 2, 2010, 3 pages.
U.S. Appl. No. 10/464,417, Advisory Action dated Apr. 22, 2009, 3 pages.
U.S. Appl. No. 10/464,417, Advisory Action dated May 7, 2008, 3 pages.
U.S. Appl. No. 10/464,417, Final Office Action dated Jan. 25, 2008, 20 pages.
U.S. Appl. No. 10/464,417, Final Office Action dated Jan. 22, 2009, 32 pages.
U.S. Appl. No. 10/464,417, Final Office Action dated Jan. 20, 2010, 35 pages.
U.S. Appl. No. 10/464,417, Non-Final Office Action dated Dec. 22, 2006, 21 pages.
U.S. Appl. No. 10/464,417, Non-Final Office Action dated Aug. 6, 2008, 30 pages.
U.S. Appl. No. 10/464,417, Non-Final Office Action dated May 21, 2010, 31 pages.
U.S. Appl. No. 10/464,417, Non-Final Office Action dated Jul. 9, 2009, 32 pages.
U.S. Appl. No. 10/464,417, Notice of Allowance dated Nov. 12, 2010, 15 pages.
U.S. Appl. No. 10/464,421, Advisory Action dated Apr. 15, 2010, 2 pages.
U.S. Appl. No. 10/464,421, Advisory Action dated Jan. 29, 2009, 3 pages.
U.S. Appl. No. 10/464,421, Final Office Action dated Oct. 20, 2008, 13 pages.
U.S. Appl. No. 10/464,421, Final Office Action dated Jan. 27, 2010, 23 pages.
U.S. Appl. No. 10/464,421, Non-Final Office Action dated Jul. 9, 2009, 17 pages.
U.S. Appl. No. 10/464,421, Non-Final Office Action dated Apr. 8, 2008, 9 pages.
U.S. Appl. No. 10/464,815, Advisory Action dated Jun. 19, 2008, 3 pages.
U.S. Appl. No. 10/464,815, Final Office Action dated Mar. 4, 2008, 11 pages.
U.S. Appl. No. 10/464,815, Final Office Action dated Feb. 18, 2009, 14 pages.
U.S. Appl. No. 10/464,815, Non-Final Office Action dated Sep. 7, 2007, 10 pages.
U.S. Appl. No. 10/464,815, Non-Final Office Action dated Sep. 4, 2008, 11 pages.
U.S. Appl. No. 10/464,874, Advisory Action dated Oct. 9, 2009, 2 pages.
U.S. Appl. No. 10/464,874, Final Office Action dated Jul. 10, 2009, 15 pages.

(56) References Cited

OTHER PUBLICATIONS

U.S. Appl. No. 10/464,874, Final Office Action dated Jan. 5, 2011, 9 pages.
U.S. Appl. No. 10/464,874, Non-Final Office Action dated Jul. 8, 2010, 12 pages.
U.S. Appl. No. 10/464,874, Non-Final Office Action dated Jun. 11, 2008, 14 pages.
U.S. Appl. No. 10/464,874, Non-Final Office Action dated Dec. 18, 2008, 15 pages.
U.S. Appl. No. 10/464,874, Non-Final Office Action dated Dec. 28, 2009, 16 pages.
U.S. Appl. No. 10/464,874, Non-Final Office Action dated Nov. 29, 2007, 9 pages.
U.S. Appl. No. 10/464,874, Notice of Allowance dated Jun. 7, 2011, 7 pages.
U.S. Appl. No. 10/464,875, Advisory Action dated Dec. 29, 2009, 3 pages.
U.S. Appl. No. 10/464,875, Final Office Action dated Oct. 27, 2009, 12 pages.
U.S. Appl. No. 10/464,875, Non-Final Office Action dated Oct. 16, 2008, 24 pages.
U.S. Appl. No. 10/464,875, Non-Final Office Action dated Mar. 10, 2008, 26 pages.
U.S. Appl. No. 10/464,875, Notice of Allowance dated Jun. 22, 2012, 21 pages.
U.S. Appl. No. 10/464,875, Non-Final Office Action dated Mar. 19, 2009, 13 pages.
U.S. Appl. No. 10/804,364, Final Office Action dated Aug. 18, 2009, 27 pages.
U.S. Appl. No. 10/804,364, Final Office Action dated Oct. 14, 2008, 31 pages.
U.S. Appl. No. 10/804,364, Non-Final Office Action dated Mar. 21, 2008, 15 pages.
U.S. Appl. No. 10/804,364, Non-Final Office Action dated Feb. 5, 2009, 26 pages.
U.S. Appl. No. 10/926,194, Final Office Action dated Aug. 16, 2010, 22 pages.
U.S. Appl. No. 10/926,194, Final Office Action dated Mar. 21, 2014, 28 pages.
U.S. Appl. No. 10/926,194, Non Final Office Action dated Aug. 30, 2013, 30 pages.
U.S. Appl. No. 10/926,194, Non-Final Office Action dated Mar. 2, 2010, 21 pages.
U.S. Appl. No. 10/926,194, Non-Final Office Action dated May 28, 2008, 24 pages.
U.S. Appl. No. 10/926,194, Non-Final Office Action dated Aug. 17, 2009, 30 pages.
U.S. Appl. No. 10/926,194, Non-Final Office Action dated Dec. 18, 2008, 35 pages.
U.S. Appl. No. 10/926,194, Final Office Action dated Aug. 28, 2012, 25 pages.
U.S. Appl. No. 10/926,194, Non-Final Office Action dated Feb. 29, 2012, 26 pages.
U.S. Appl. No. 10/946,146, Advisory Action dated Mar. 16, 2009, 3 pages.
U.S. Appl. No. 10/946,146, Final Office Action dated Dec. 24, 2008, 26 pages.
U.S. Appl. No. 10/946,146, Non-Final Office Action dated Jun. 27, 2008, 11 pages.
U.S. Appl. No. 10/946,146, Non-Final Office Action dated May 27, 2009, 29 pages.
U.S. Appl. No. 10/971,973, Advisory Action dated Dec. 7, 2009, 4 pages.
U.S. Appl. No. 10/971,973, Final Office Action dated Aug. 20, 2010, 22 pages.
U.S. Appl. No. 10/971,973, Final Office Action dated Sep. 30, 2009, 31 pages.
U.S. Appl. No. 10/971,973, Non-Final Office Action dated Oct. 1, 2013, 11 pages.
U.S. Appl. No. 10/971,973, Non-Final Office Action dated Feb. 19, 2010, 17 pages.
U.S. Appl. No. 10/971,973, Non-Final Office Action dated Mar. 17, 2009, 22 pages.
U.S. Appl. No. 10/988,041, Advisory Action dated Jul. 29, 2008, 3 pages.
U.S. Appl. No. 10/988,041, Final Office Action dated Mar. 16, 2009, 14 pages.
U.S. Appl. No. 10/988,041, Final Office Action dated May 14, 2008, 16 pages.
U.S. Appl. No. 10/988,041, Non-Final Office Action dated Dec. 11, 2007, 12 pages.
U.S. Appl. No. 10/988,041, Non-Final Office Action dated Sep. 26, 2008, 12 pages.
U.S. Appl. No. 10/988,041, Non-Final Office Action dated Jun. 12, 2007, 7 pages.
U.S. Appl. No. 11/114,978, Advisory Action dated Jun. 5, 2008, 3 pages.
U.S. Appl. No. 11/114,978, Final Office Action dated Mar. 28, 2008, 13 pages.
U.S. Appl. No. 11/114,978, Non-Final Office Action dated Aug. 25, 2008, 11 pages.
U.S. Appl. No. 11/114,978, Non-Final Office Action dated Nov. 15, 2007, 9 pages.
U.S. Appl. No. 11/114,978, Notice of Allowance dated Jan. 14, 2009, 10 pages.
U.S. Appl. No. 11/114,978, Notice of Allowance dated Mar. 9, 2009, 3 pages.
U.S. Appl. No. 11/327,053, Non-Final Office Action dated Mar. 17, 2010, 32 pages.
U.S. Appl. No. 11/327,053, Notice of Allowance dated Nov. 17, 2010, 10 pages.
U.S. Appl. No. 11/327,053, Notice of Allowance dated Oct. 4, 2010, 9 pages.
U.S. Appl. No. 12/974,261, Final Office Action dated Sep. 15, 2011, 14 pages.
U.S. Appl. No. 12/974,261, Non-Final Office Action dated Mar. 18, 2011, 13 pages.
U.S. Appl. No. 12/974,261, Non-Final Office Action dated Jun. 14, 2013, 14 pages.
U.S. Appl. No. 12/974,261, Notice of Allowance dated Dec. 17, 2013, 15 pages.
U.S. Appl. No. 10/464,421, Non-Final Office Action dated Jun. 12, 2014, 22 pages.
U.S. Appl. No. 10/971,973, Final Office Action dated May 21, 2014, 14 pages.
Nelson, Risk Management and the Accountant, National Association of Accountants, NAA Bulletin, vol. 45, Issue 11, ProQuest Central, Jul. 1964, 5 pages.
Anonymous, Workflow and Collaboration Drive Sarbanes-Oxley Solution, Transform Magazine, vol. 12, Issue 9, ProQuest Central, Sep. 2003, pp. 13-14.
Kinney Jr., Chapter 5: Auditing Risk Assessment and Risk Management Processes, The Institute of Internal Auditors Research Foundation, 2003, 41 pages.
Starr et al., Enterprise Resilience: Managing Risk in the Networked Economy, Strategy and Business, Issue 30, 2003, available online at: http://www.strategybusiness.com/press/article/8375?pgall&tid=230, 13 pages.
U.S. Appl. No. 10/464,421, Non-Final Office Action dated Jan. 14, 2015, 31 pages.
U.S. Appl. No. 10/926,194, Final Office Action dated May 14, 2015, 43 pages.
U.S. Appl. No. 10/926,194, Non-Final Office Action dated Sep. 25, 2014, 33 pages.
U.S. Appl. No. 10/971,973, Non-Final Office Action dated Jul. 30, 2015, 13 pages.
Final Office Action dated Sep. 16, 2015 for U.S. Appl. No. 10/464,421, all pages.
Final Office Action for U.S. Appl. No. 10/971,973, dated Mar. 1, 2016, 11 pages.

* cited by examiner

|  | CREATE SUPPLIER | PAY INVOICE | CONDUCT INVENTORY | ADJUST CYCLE COUNT | GENERATE INVOICE |
|---|---|---|---|---|---|
| CREATE SUPPLIER | ■ | X |  |  | X |
| PAY INVOICE | X | ■ |  |  | X |
| CONDUCT INVENTORY |  |  | ■ | X |  |
| ADJUST CYCLE COUNT |  |  | X | ■ |  |
| GENERATE INVOICE | X | X |  |  | ■ |

Financial Statement    Business Process Certification

General | Financial Items   Organizations   Processes   Risks   Controls
\ 1505

▼ Certification Result—1510
  Summary
    Result
    Details

▼ Ineffective Financial Items—1515

| Financial Item | Last Evaluation |
| --- | --- |
| Cost of Sales | ✗ Materially Weak |
| Total Cost of Sales and Services | ⚠ Deficient |

▼ Summary ——1520

Last Refreshed On:  18-Feb-2004 15:45:32

Changes To Processes Since (01-Dec-1995) —1525
      New Risks Added  87
    New Controls Added  124

Process Certification  ——1530

Processes Certified at Corporate Level
      Not Certified  12   Certified With Issues  0
    Processes Certified at Organization Level
      Not Certified  159   Certified With Issues  0

Audit Evaluation  —— 1535
      Corporate Processes With Ineffective Controls  0    Unmitigated Risks  20
      Organization Processes With Ineffective Controls  7    Ineffective Controls  35

General | Financial Items | Organizations | Processes | Risks | Controls

Last Refreshed On 18-Feb-2004 15:44:14 — 1603
Expand All | Collapse All
⊕ Income Statement-Consolidated

1620

| 1605 | 1610 Process Pending Certification | 1615 Processes Certified with Issues | Processes with Ineffective Controls | 1625 Organizations with Ineffective Controls | 1630 Unmitigated Risks | 1635 Ineffective Controls | Last Evaluation | Last Evaluated By | Last Evaluated On | Evaluate |
|---|---|---|---|---|---|---|---|---|---|---|
| Focus Financial Items ▼ Income Statement-Consolidated | | | | | | | | | | |
| ⊕ ▼ Cost of Sales | ✗ 52/52 | ⟩ 0/52 | △ 6/52 | ⟩ 1/13 | △ 9/53 | △ 31/103 | ✗ Materially Weak | Bacajun, Stanford | 05-Feb-2004 | |
| ⊕ ▼ Total Cost of Sales and Services | ✗ 52/52 | ⟩ 0/52 | △ 6/52 | ⟩ 1/13 | △ 9/53 | △ 31/103 | △ Deficient | Bacajun, Stanford | 05-Feb-2004 | |
| Cost of Sales | ✗ 52/52 | ⟩ 0/52 | △ 6/52 | ⟩ 1/13 | △ 9/53 | △ 31/103 | | | | |
| ⊕ ▼ Employee Expenses | ✗ 7/7 | ⟩ 0/7 | ⟩ 0/7 | ⚠ 1/3 | ⟩ 0/2 | ⟩ 0/2 | | | | |
| ⊕ ▼ Total Employee Expenses | ✗ 7/7 | ⟩ 0/7 | ⟩ 0/7 | ⚠ 1/3 | ⟩ 0/2 | ⟩ 0/2 | | | | |
| Miscellaneous Employee Expenses | | | | | | | | | | |
| ⊕ ▼ Operating Expenses | ✗ 145/145 | ⟩ 0/145 | ⟩ 6/145 | △ 2/15 | △ 19/86 | △ 35/123 | | | | |
| ⊕ ▼ Total Operating Expenses | ✗ 145/145 | ⟩ 0/145 | ⟩ 6/145 | △ 2/15 | △ 19/86 | △ 35/123 | | | | |
| Bad Debt | ✗ 78/78 | ⟩ 0/78 | ⟩ 0/78 | ⟩ 1/13 | △ 10/25 | △ 9/38 | | | | |
| Meals | ✗ 1/1 | ⟩ 0/1 | ⟩ 0/1 | ⟩ 0/1 | ⟩ 0/1 | ⟩ 0/1 | | | | |

ORACLE
Internal Controls Manager

Home | Logout | Preferences | Organizations | Setup | Help

Certifications | Remediation

Home | Financial Statements | Business Processes

Financial Statements Certifications > Financial Statement Certification > Certify Financial Statement

Certify Financial Statement

Cancel | Apply

Certification FinCertTest2     1805     Owner Shah, Dinesh
Type SOX 404     Status Draft
Financial Statement Income Statement-Consolidated     Quarter Q1
Year 2002     Target Completion Date 26-Feb-2004
Certified By Bender, Mrs. Susan     Certified On 15-Feb-2004

▼ Certification Result

Certification Result
I have reasonable assurance that the internal controls for this financial statement have been evaluated to be functioning satisfactorily and that all material changes to the controls are, to the best of my knowledge, captured in the information above.

* Conclusion | Certified

Summary | Sanket Test

Description | Sanket Test

ORACLE — Home

Survey Campaigns > Deployment Details

Deployment Details

○ Deployment View
● Response View
Survey Campaign Name   Self-Assessment Survey1                    — 1977
        Cycle Name   OR Self-Assessment survey
   Deployment Name   Self-Assessment Survey
            Media   WEB
* Status  [Active ▼]

☑ TIP These fields are required to activate a deployment or execute a survey
   Deploy Date and Time   01-Jun-2004 00:00:00
Response End Date and Time   [30-Jun-2004 00:00:00]
* Deployment Type  Standard  (Go)                                  — 1979
         Survey URL   Please click here to take the survey.

Responses

| Number | Response Received Date | Response Status | Answer |
|---|---|---|---|
| 1 | 02-Jun-2004 01:30:42 | ABANDONED | ⚆⚆ |
| 2 | 04-Jun-2004 18:42:57 | ABORTED | ⚆⚆ |
| 3 | 04-Jun-2004 18:00:50 | COMPLETE | ⚆⚆ |
| 4 | 01-Jun-2004 17:00:55 | ABANDONED | ⚆⚆ |
| 5 | 02-Jun-2004 19:45:45 | ABORTED | ⚆⚆ |
| 6 | 04-Jun-2004 18:05:49 | COMPLETE | ⚆⚆ |
| 7 | 04-Jun-2004 17:35:13 | COMPLETE | ⚆⚆ |

— 1981

(Update) (Reset)

Home | Survey Campaigns | Survey Resources | Audit
Copyright 2003 Oracle Corporation. All rights reserved.

ORACLE

Home | Survey Campaigns | Surv

Survey Campaigns > Deployment Details > Survey Responses

Survey Responses

Survey Campaign Name  Self-Assessment Survey1
Cycle Name  OR Self-Assessment survey
Deployment Name  Self-Assessment Survey
Response Received Date  04-Jun-2004

Answers

Expand All | Collapse All

Respondent -1201

| Focus | Answer |
|---|---|
| ▼ Respondent -1201 | |
| ▼ ▼ Are your operational risks goals formally defined and monitored on a periodic basis? | |
|     Yes | ✓ |
|     No | |
| ▼ Who is primarily in charge of risk management at your organization? | |
|     Operational Risk Manager | |
|     Business Unit Manager | |
|     Risk Manager | |
|     Credit Risk Manager | ✓ |
|     Market Risk Manager | |
| ▼ What controls do you have in place to identify new risks? | ✓ |
| ▼ ▼ How often do you aggregate operational risk loss data? | |
|     Daily | |
|     Weekly | ✓ |
|     Monthly | |
|     Quarterly | |
|     Annually | |
| ▼ What type of internal threshold is used in your business unit for collecting loss data? | |
|     b | ✓ |
| ▼ How do you identify the losses arising from a corporate center business? | ✓ |
|     Internal Controls | |
|     Internal Audit | |
|     Employee Self-Assessment Survey | |
|     External Audit | |
| ▼ What type of loss event types are you currently reporting? | |
|     Internal Fraud | ✓ |
|     External Fraud | |
|     Employment Practices and Workplace Safety | |
|     Damage to physical assets | |

Home | Survey Campaigns | Survey Resources | Audience | Invitations | Home |
Copyright 2003 Oracle Corporation. All rights reserved.

ORACLE SCRIPTING
iSurvey

Risk Assessment

Are your operational risks goals formally defined and monitored on a periodic basis? ◯ Yes ◯ No What type of operational risk methodology have you implemented in your business unit?
- The Basic Indicator Approach
- The Standardised Approach
- The Alternative Standardised
- The Advanced Measurement Approach Who is primarily person in charge of risk management at your organization?
- Operational Risk Manager
- Business Unit Manager
- Risk Manager
- Credit Risk Manager What controls do you have in place to identify new risks?

Assessment Details

| | | | |
|---|---|---|---|
| Name | Management Assessment for Controls | Type | Comprehensive Sel |
| Expected Completion Date | | Status | Not Started |

Summary | Survey  Context  Evaluations  Attachments

— 2105

Owner Connors, Timothy Peter (Tim)
Description
Components ——————— 2110

Select All | Select None

| Select | Name | Value |
|---|---|---|
| ☑ | Control Activities | |
| ☑ | Control Environment | |
| ☐ | Information and Communication | |
| ☐ | Monitoring | |
| ☐ | Other | |
| ☐ | Risk Assessment | |

Opinion Summary

Conclusion
Comments

Summary | Survey  Context  Evaluations  Attachments

Home | Audits | Assessments | Risk Library | Setup | Home | Logc
Copyright 2003 Oracle Corporation. All rights reserved.

ORACLE
Internal Controls Manager

Home | Audits | Assessments | Risk Library | Setup

Home Logout Preferences

Evaluation for: Management Assessment for Controls

[Update]

Name Management Assessment for Controls
Description
Executed By Frazier, Mr. Landon
Date of Execution 14-Jan-2004

Evaluation of Assessment
Status Completed
Conclusion Highly Effective
Comments Controls are well understood and control consciousness of the organization is good.

/ 2160

Evaluation of Components

| Component | Effectiveness | Comments |
|---|---|---|
| Control Activities | Highly Effective | Good seperation of duties from control questionairre Responses |
| Control Environment | Highly Effective | Management has high ethical standards that are reflected in the organization as a whole |

[Update]

Home | Audits | Assessments | Risk Library | Setup | Home | Logout | Preferences Copyright 2003 Oracle Corporation. All rights reserved.

Privacy Statement

|  | Strongly Agree | Agree | Unsure | Disagree | Strongly Disagree |
|---|---|---|---|---|---|
| Survey Question | Reliability | | | | |
| 2305 Does Payables Always Check for Manual Check Requests if unmatched invoices are over 30 days old? | 100% | 90% | 80% | 70% | 60% |
| 2307 Are unmatched receipts verified with suppliers within a reasonable time? | 97% | 93% | 87% | 70% | 77% |

|  | Strongly Agree | Agree | Unsure | Disagree | Strongly Disagree | Audit Result |
|---|---|---|---|---|---|---|
| Survey Question | Reliability | | | | | |
| Payables Always Checks for Manual Check Requests if unmatched invoices are over 30 days old | 2367<br>~~100%~~<br>80% | 90% | 80% | 70% | 60% | 2360<br>Fail |
| Survey Answer | X | | | | | |
| Unmatched Receipts are verified with suppliers within a reasonable time | 97% | 2377<br>~~93%~~<br>74% | 87% | 70% | 77% | 2375<br>Fail |
| Survey Answer |  | X | | | | |

Financial Statement By Entity Materiality Grid — 2545

Materiality Based on: Revenue ▼

Materialty Thresholds
Green
Yellow
Red

| | 2505<br>Consolidated | 2510<br>Company 1 | | 2515<br>Company 2 | | 2520<br>Company 3 | |
|---|---|---|---|---|---|---|---|
| Revenue | 1000000 | 123807 | Green | 108820 | Green | 767373 | Red |
| Cost of Goods Sold | 530000 | 163425 | Yellow | 186700 | Yellow | 179875 | Yellow |
| Gross Margin | 470000 | 31254 | Green | 123529 | Green | 315217 | Red |
| Distribution Expense | 180000 | 75916 | Red | 26822 | Green | 77262 | Red |
| Administrative Expense | 100000 | 97212 | Red | 1249 | Green | 1539 | Green |
| Profit Before Interest and Tax | 190000 | 14664 | Green | 32114 | Green | 143222 | Red |
| Interest Expense | 70000 | 57340 | Red | 98 | Green | 12562 | Green |
| Profit Before Tax | 120000 | 71137 | Red | 7406 | Green | 41457 | Yellow |
| Tax — 2525 | 48000 | 28230 | Red | 3880 | Green | 15890 | Yellow |
| Proposed Dividends | 24000 | 23212 | Red | 535 | Green | 253 | Green |
| Retained Earnings | 48000 | 43110 | Red | 3167 | Green | 1723 | Green |

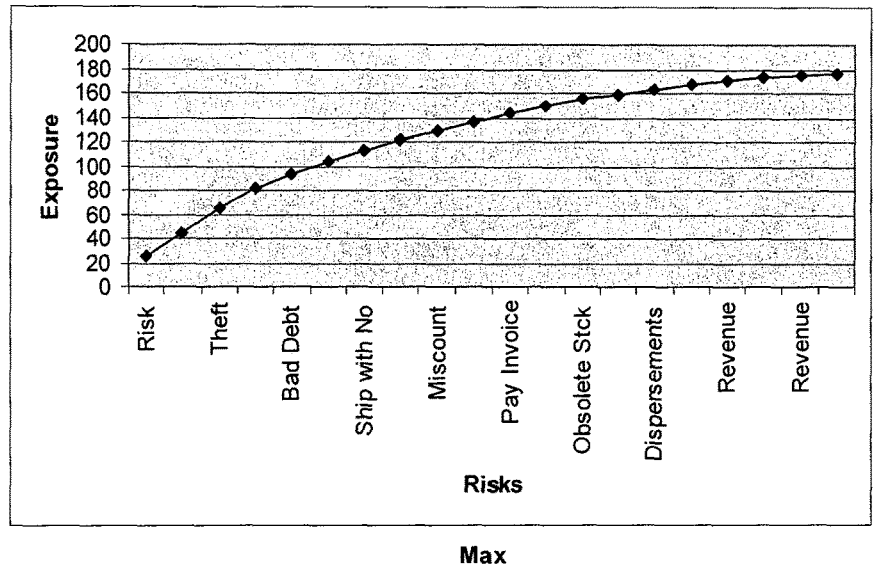

Max

| Risk | Impact | Likelihood | Exposure | Cumulative Exposure |
|---|---|---|---|---|
| Fraud 2855 | 5 | 5 | 25 | 25 |
| Theft 2860 | 4 | 5 | 20 | 45 |
| Collusion on Expenses | 4 | 5 | 20 | 65 |
| Bad Debt | 4 | 4 | 16 | 81 |
| Spoilage | 4 | 3 | 12 | 93 |
| Ship with No Invoice | 2 | 5 | 10 | 103 |
| Pay Invoice Twice | 2 | 5 | 10 | 113 |
| Miscount 2865 | 2 | 4 | 8 | 121 |
| Pay Invoice Without Order | 4 | 2 | 8 | 129 |
| Pay Invoice Without Receipt | 4 | 2 | 8 | 137 |
| Pay Invoice for Substandard Goods | 3 | 2 | 6 | 143 |
| Obsolete Stck | 3 | 2 | 6 | 149 |
| Receipts not Banked | 2 | 3 | 6 | 155 |
| Dispersements not Recorded | 2 | 2 | 4 | 159 |
| Provision for Replacement Inadequate | 2 | 2 | 4 | 163 |
| Revenue recorded without Cost of Gc | 1 | 4 | 4 | 167 |
| Liabilities not Recorded | 1 | 3 | 3 | 170 |
| Revenue Released when Customer h | 3 | 1 | 3 | 173 |
| Assets Overvalued 2870 | 1 | 2 | 2 | 175 |
| Tax Underpayed | 1 | 2 | 2 | 177 |

| Audit Procedure | Control | Risk | Impact | Likelihood | Total Exposure | Coverage | Total Residual R |
|---|---|---|---|---|---|---|---|
| Warehouse Aud | Serial Numbering (3035) | Fraudulent Returns | 5 | 5 | 25 | 15 | 10 |
| Warehouse Aud | Cycle Count (3040) | Theft From Warehouse | 4 | 5 | 20 | 10 | 10 |
| Warehouse Aud | Locked Cage (3045) | Theft From Warehouse | 4 | 5 | 20 | 7 | 13 |
| Expense Manag | Verification by AP | Collusion on Expenses | 4 | 5 | 20 | 10 | 10 |
| Revenue Manag | Approval of Credit Reque | Bad Debt | 4 | 4 | 16 | 5 | 11 |
| Transport Audit | Proof of Delivery Signatu | Spoilage in Transit | 4 | 3 | 12 | 3 | 9 |
| Warehouse Aud | Order Backlog Movemen | Ship with No Invoice | 2 | 5 | 10 | 8 | 2 |
| Payable Audit | Duplicate Invoice Check | Pay Invoice Twice | 2 | 5 | 10 | 7 | 3 |
| Warehouse Aud | Approval of Cycle Count (3050) | Miscount | 2 | 4 | 8 | 4 | 4 |
| Payable Audit | Match Type Control | Pay Invoice Without Order | 4 | 2 | 8 | 6 | 2 |
| Payable Audit | Match Type Control | Pay Invoice Without Receipt | 4 | 2 | 8 | 6 | 2 |
| Payable Audit | Match Type Control | Pay Invoice for Substandard Goods | 3 | 2 | 6 | 6 | 0 |
| Inventory Manag | Days of Sales in Invento | Obsolete Stck | 3 | 2 | 6 | 3 | 3 |
| Cash Processin | Bank Reconciliation | Receipts not Banked | 2 | 3 | 6 | 6 | 0 |
| Cash Processin | Bank Reconciliation | Dispersements not Recorded | 2 | 2 | 4 | 4 | 0 |
| Asset Managem | Depreciation Reserve R | Provision for Replacement Inadequate | 2 | 2 | 4 | 3 | 1 |
| Revenue Manag | Inventory Movement Rec | Revenue recorded without Cost of Goods Sold | 1 | 4 | 4 | 4 | 0 |
| Financial Statem | Chief Accountant Review | Liabilities not Recorded | 1 | 3 | 3 | 2 | 1 |
| | | | | | 197 | | 82 |

BUSINESS PROCESS FOR ULTRA TRANSACTIONS

CROSS-REFERENCES TO RELATED APPLICATIONS

This application claims priority to U.S. Provisional Application No. 60/921,472, entitled "Business Process for Ultra Vires Transactions," filed Aug. 3, 2006, (converted to a provisional from original Non-Provisional application Ser. No. 11/499,894), and is related to U.S. patent application Ser. Nos. 10/464,417 filed Jun. 17, 2003; Ser. No. 10/464,815 filed Jun. 17, 2003; Ser. No. 10/464,421 filed Jun. 17, 2003; Ser. No. 10/464,874 filed Jun. 17, 2003; Ser. No. 10/464,875 filed Jun. 17, 2003; and Ser. No. 10/464,055 filed Jun. 17, 2003; all of which are hereby incorporated herein by reference for all purposes.

BACKGROUND OF THE INVENTION

The present invention relates to the field of software applications generally, and specifically to the implementation of financial applications. The corporate accounting scandals surrounding WorldCom™, Enron™, and Tyco™ spurred the passage of the Federal Sarbanes-Oxley Act of 2002 (sometimes referred to herein as "the Act") in the United States. The Act creates an obligation for officers of certain companies to warrant to their shareholders the accuracy of the company's accounting information, place the control in place to safeguard the assets of the company, and assure the validity of the financial statements. Although these obligations previously existed in some weaker form in the United States, the advent of the Sarbanes-Oxley Act makes these obligations much stronger.

To ensure reliable financial reporting and compliance with laws and regulations, services provided to an enterprise by auditors and/or vendors providing non-audit services are of particular concern under §§ 201 and 202 of the Sarbanes-Oxley Act. For example, § 201 includes a list of non-audit services that cannot be provided an enterprise by their public accounting firms who have provided audit services under the Act. This prohibition removes any temptation from auditors to compromise their non-audit opinions for the sake of maintaining other business with the enterprise. Example categories of prohibited non-audit services include: bookkeeping or other services relating to the accounting records or financial statements of the audit client; financial information systems design and implementation; appraisal or valuation services, fairness opinions, or contribution-in-kind reports; actuarial services; internal audit outsourcing services; management functions; human resource services; broker/dealer, investment adviser, or investment banking services; legal services; expert services unrelated to the audit; and any other service that the Public Company Accounting Oversight Board (PCAOB) determines by regulation to be impermissible. These non-audit services cannot be provided to the enterprise by the auditors even with approval of the audit committee.

Further, § 202 of the Sarbanes-Oxley Act states that all auditing services and non-audit services, that are not de minimus, must be pre-approved by the audit committee of the enterprise. The auditing committee is able to establish policies and procedures for pre-approval, provided these policies are consistent with the Sarbanes-Oxley Act. By prohibiting appointed auditors or vendors that provide audit services to an enterprise from concurrently providing non-audit services to that enterprise, any temptation is removed for the auditors to compromise their opinions for the sake of maintaining other business with the enterprise.

Furthermore, by requiring an enterprise's audit committee to pre-approve all services provided by their auditors, a contract for any of the prohibited purposes will be a contract without lawful purpose, and is therefore ultra vires (from the Latin "beyond the power"—referring to acts beyond the scope of the corporate charter), such that the contract is void. Any monies paid to the audit firm for prohibited non-audit services and/or services not explicitly authorized by the enterprise's audit committee must be returned to the enterprise. Further, any non-prohibited service that has not been pre-approved may not be able to be relied upon, such that the work may need to be redone.

Previously, compliance with this portion of the Sarbanes-Oxley Act required manual oversight of business processes such as whether to allow a service to be performed by a particular firm, obtaining pre-approval, issuing purchase orders, and accounts payable. Such an approach is both expensive and time consuming, and provides opportunity for human error.

It thus is desirable for an audit system to automatically monitor business processes for prohibited transactions. It is further desirable for an audit system to automatically seek an audit committee's approval for transactions as required. It is also desirable to obtain the pre-approval information, such as date of approval, before executing a contract with an audit firm. It is also desirable for an audit system to prevent approval and/or payments for non-audit services without approval from the enterprise's audit committee and to request refunds for prohibited services that were erroneously paid for.

BRIEF SUMMARY OF THE INVENTION

Embodiments in accordance with the present invention ensure compliance with §§ 201 and 202 of the Sarbanes-Oxley Act, for example, by determining whether a service is a prohibited service before allowing execution of a contract for the service with an auditor or vendor providing audit services. Embodiments also can ensure that proper pre-authorization information is obtained and loaded before a contract for permissible services from an auditor or vendor providing audit service is executed. Embodiments also can automatically monitor and handle business processes for prohibited non-audit services, or for permissible non-audit services for which proper pre-authorization information was not entered into the system. Exemplary business processes to be monitored include accounts payable business processes for paying invoices received by the enterprise and purchasing business processes for arranging the purchase of products and/or services by the enterprise. One embodiment identifies the vendor associated with the instance of the business process and automatically determines whether the identified vendor provides audit services. This verification can be done before the contract for a non-audit service is executed, and further may be monitored after the contract is executed to ensure that no problem arises after such execution. The audit system can maintain information for each vendor that indicates whether the vendor provides audit services, and can update this information as needed.

If the audit system determines that the identified vendor does not provide any audit services to the enterprise, that instance of the business process is executed normally. Conversely, if the identified vendor does provide audit services and/or is an appointed auditor to the enterprise, the audit system can check to see if the service is a prohibited service.

If the service is a prohibited service, that instance of the business process can be prevented or suspended immediately. If the service is not a prohibited service, a check can be made to ensure that the proper pre-authorization information was obtained. If the pre-authorization information was not obtained, that instance of the business process can be prevented or suspended immediately until such time as the pre-approval information is obtained. The audit system may forward a message to the audit committee or other authority about the rejected or suspended business process. If the audit committee approves the instance of a non-prohibited business process, the audit system then can allow the instance of the business process to resume.

In a further embodiment, the audit system determines whether the vendor has been paid for the product or service associated with the invoked business process. In one embodiment, the audit system is interfaced with an accounting system or database that maintains payment information for purchase orders, invoices, or other types of information from similar business processes. In another embodiment, the invoked business process includes information about whether the vendor has already been paid for the good or service in question. If the vendor has already paid for the good or service associated with the invoked business process, the audit system creates a debit memo, or demand for a refund, in the enterprise's accounts payable system if the service is determined to be prohibited, or provided without proper pre-approval.

A further understanding of the nature and the advantages of the inventions disclosed herein may be realized by reference of the remaining portions of the specification and the attached drawings.

BRIEF DESCRIPTION OF THE DRAWINGS

The present invention will be described with reference to the drawings, in which:

FIG. 13 illustrates a registry of incompatible functions according to one embodiment of the invention;

FIG. 15 illustrates an example screen display of an audit system that summarizes an audit according to one embodiment of the invention;

FIG. 16 illustrates an example screen display of an audit system that summarizes audit information by financial account according to one embodiment of the invention;

FIG. 18 illustrates an example screen display of an audit system that enables a company officer to certify audit results according to one embodiment of the invention;

FIGS. 19A-H illustrate a set of example screen displays of an audit system that enables the creation of a survey according to one embodiment of the invention;

FIG. 20 illustrates an example screen display of an audit system presenting a survey according to one embodiment of the invention; and FIGS. 21A-B illustrate a set of example screen displays of an audit system presenting an assessment of an enterprise according to one embodiment of the invention;

FIGS. 23A-B illustrate an example correlation between survey question results and audit results according to one embodiment of the invention;

FIG. 25 illustrates an example screen display of an audit system presenting a summary of the materiality of audit units for a financial statement of an enterprise according to one embodiment of the invention;

FIG. 28 illustrates an example table and graph of an audit system displaying separate and cumulative exposure associated with audit units in an enterprise according to one embodiment of the invention;

FIG. 30 illustrates an example table of an audit system displaying separate and cumulative coverage and residual risk associated with audit units in an enterprise according to one embodiment of the invention;

In the drawings, the use of like reference numbers in different drawings indicates similar components.

DETAILED DESCRIPTION OF THE INVENTION

Systems and methods in accordance with various embodiments of the present invention can overcome these and other deficiencies in existing oversight approaches by providing for the efficient and effective approval and/or audit of business processes of an enterprise.

In one embodiment an audit system is operable to analyze any contract, agreement, or request for a new non-audit service before that new service is allowed. For example, a proposal for a new non-audit service is first analyzed to determine if the vendor or firm offering the service also provides audit services. If the service is offered by an auditor, the system checks to determine whether the service is a prohibited service that cannot be performed by the auditor. If the service is not prohibited, but is offered by an auditor, the system can ensure that proper pre-authorization has been obtained and the pre-authorization information entered before allowing the service to be approved. If the service is prohibited or proper pre-authorization has not been obtained for a service from an auditor, then the service can be rejected, denied, or otherwise held from approval until such circumstances change.

In one embodiment an audit system is further operable to monitor any existing or approved services in case circumstances change, or in case the service should not have been allowed. Such an audit system can: configure and implement audit processes; determine the set of risks associated with the business processes of an enterprise; apply a set of controls to the business processes of an enterprise to mitigate the set of associated risks; continuously monitor the effectiveness of a set of controls; determine when business processes used by an enterprise have deviated from a model process; certify new business processes; integrate business processes and their associated risks and controls with financial statements; creates audit procedure to be followed by auditors and employees to implement audit processes; and verify proper segregation of incompatible functions. The audit system can include a hosted service that provides auditors with a set of audit procedures and enables auditors to track compliance with these procedures for a set of standard business processes. If circumstances change, such that the vendor offering the service now also offers audit services, then the audit system can suspend that service until pre-approval information is obtained, or can cancel the service from that provider altogether.

Figure 1:
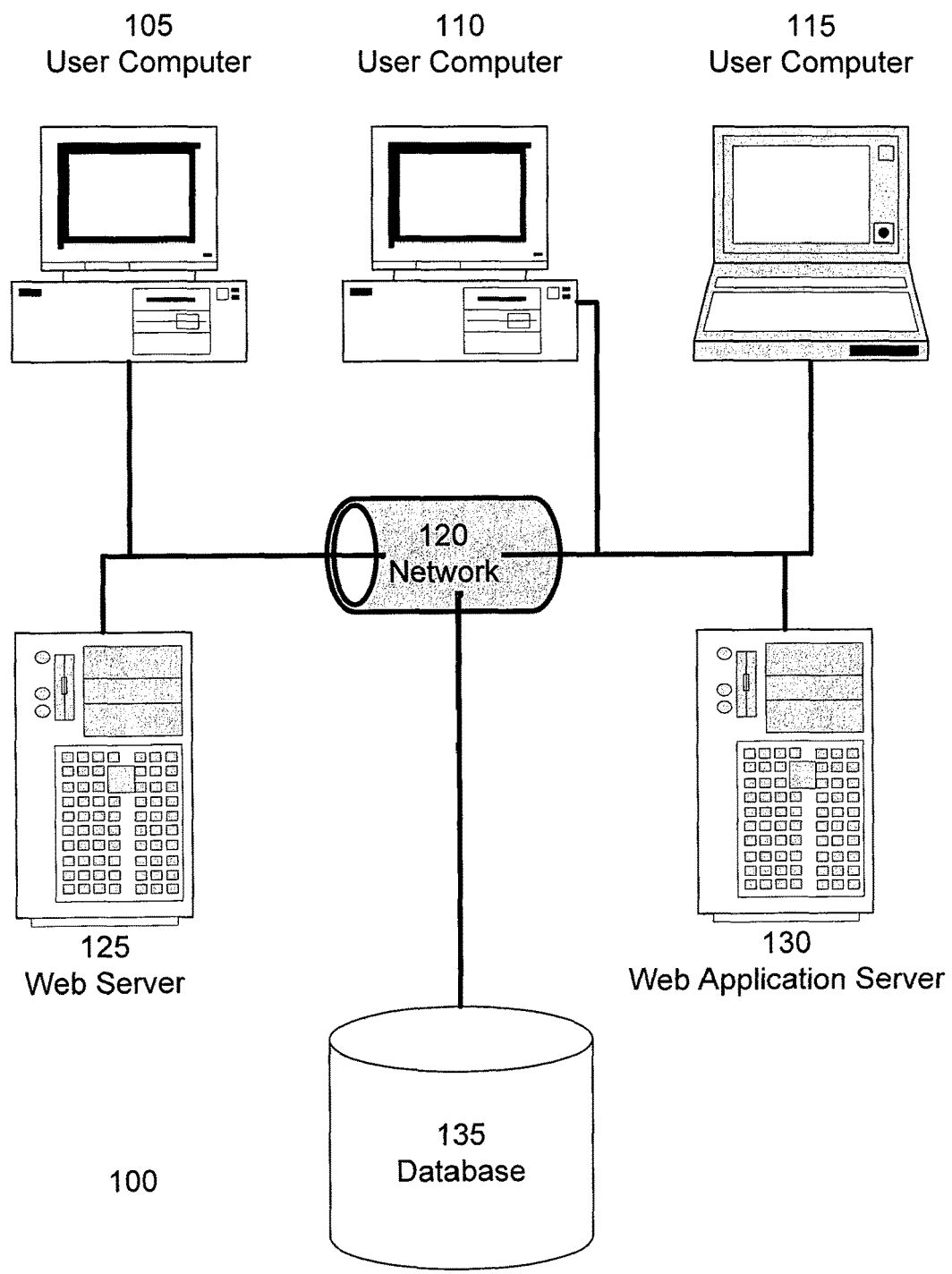
FIG. 1 is a block diagram of a system for implementing one embodiment of the invention.

FIG. 1 is a block diagram of an exemplary system 100 for implementing such one embodiment. System 100 includes user computers 105, 110, and 120. User computers 105, 110, and 120 in one embodiment are general purpose personal computers having Web browser applications. Alternatively, user computers 105, 110, and 120 can be any other electronic device, such as a thin-client computer, Internet-enabled mobile telephone, or personal digital assistant, capable of displaying and navigating Web pages or other types of electronic documents. Although system 100 is shown with three user computers, any number of user computers can be supported.

A Web server 125 is used to process requests for Web pages or other electronic documents from user computers 105, 110, and 120. In one embodiment, all user interaction with the audit system is via Web pages sent to user computers via the Web server 125.

Web application server 130 operates the audit system. In one embodiment, the Web application server 130 includes one or more general purpose computers capable of executing programs or scripts in response to the user computers 105, 110 and 115. The Web application can be implemented as one or more scripts or programs written in any programming language, such as Java™, C, or C++, or any scripting language, such as Perl, Python, or TCL.

In one embodiment, the Web application server 130 dynamically creates Web pages for displaying the audit system and audit output data. The Web pages created by the Web application server 130 are forwarded to the user computers via Web server 125. Similarly, Web server 125 receives Web page requests and audit input data from the user computers 105, 110 and 120, and forwards the Web page requests and audit input data to Web application server 130.

As the Web application on Web application server 130 processes audit data and user computer requests, audit data can be stored or retrieved from database 135. Database 135 stores general audit data used by every user for every audit in the enterprise. Database 135 also stores audit data associated with individual audits and/or individual users of the audit system. In one embodiment, the Web application on the Web application server 130 can retrieve any previously stored data from the model database 135 at any time. This allows users to modify or update audit data.

An electronic communication network 120 enables communication between computers 105, 110, and 115, Web server 125, Web application server 130, and database 135. Network 120 may further include any form of electrical or optical communication devices, including wireless and wired networks. Network 130 may also incorporate one or more local-area networks, such as an Ethernet network; wide-area networks, such as the Internet; and virtual networks, such as a virtual private network.

The system 100 is one example for executing an audit system according to one embodiment. In another embodiment, Web application server 130, Web server 125, and optionally model database 135 can be combined into a single server computer system. In alternate embodiment, all or a portion of the Web application functions may be integrated into an application running on each of the user computers. For example, a Java™ or JavaScript™ application on the user computer is used to process or store audit data or display portions of the audit application. Java™ and JavaScript™ are trademarks of Sun Microsystems, Inc., of Santa Clara, Calif.

Figure 2:
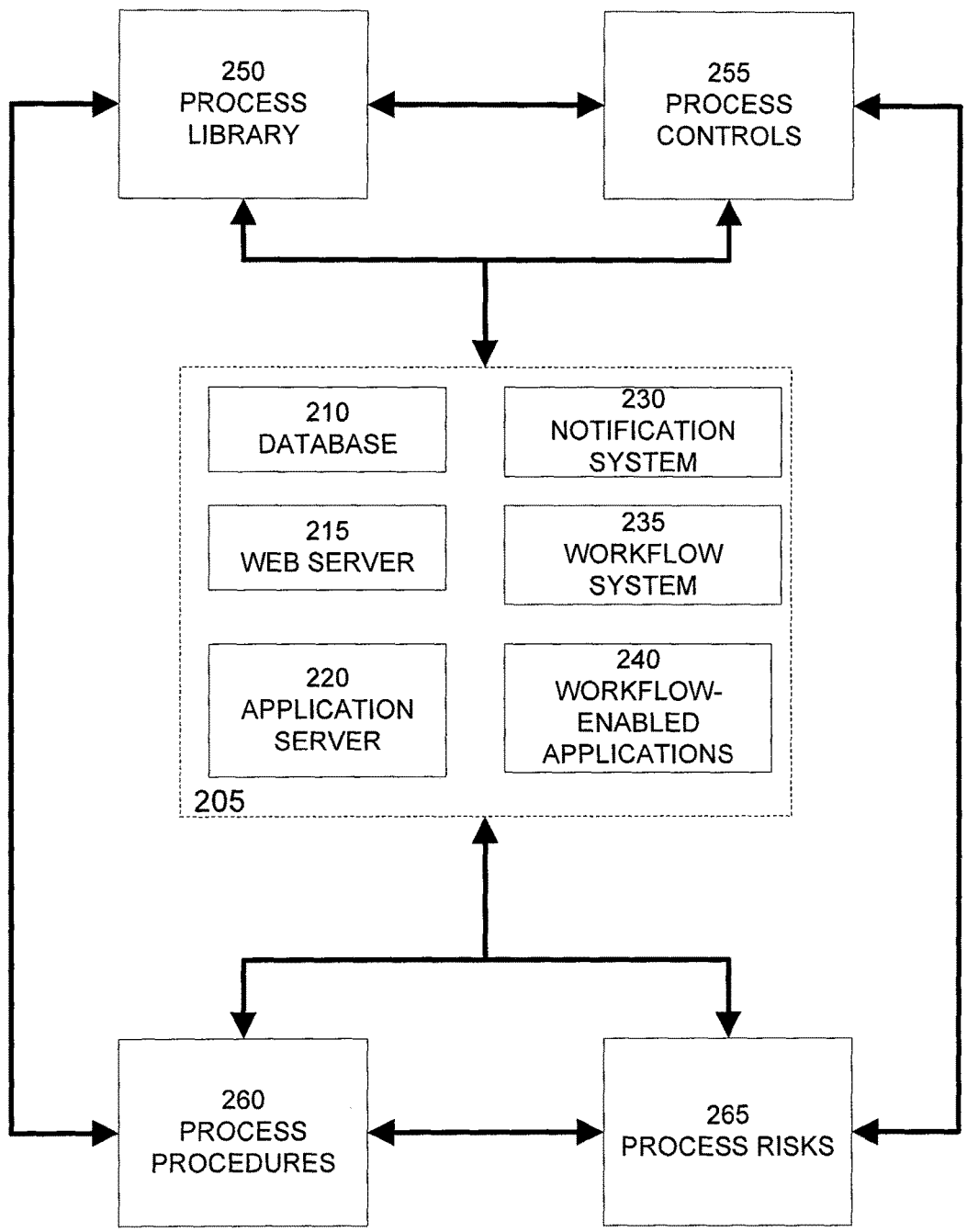
FIG. 2 is a block diagram illustrating a set of applications and data objects used by one embodiment of the invention.

FIG. 2 is a block diagram 200 illustrating a set of applications 205 and data objects used in one embodiment. The set of applications 205 includes a database 210, a Web server 215, and an application server 220, similar to that discussed above. Additionally, the set of applications includes a notification system 230, a workflow system 235, and a set of workflow-enabled applications 240.

The notification system 230 enables communication between audit system users and the audit system. Communications can be in the form of electronic messages such as electronic mail and instant messages. The notification system 230 can be used to gather data and to distribute information or instructions from audit system users or other individuals. Communications can include forms or questionnaires to be completed by recipients. Users return the completed form to the notification system 230. The notification system 230 then processes the completed forms to extract the data provided by users. The notification 230 can transfer extracted data to any of the other applications or to other audit system users.

The workflow system 235 enables the implementation of business processes. A business process typically includes a planned series of work activities, referred to as business functions, with defined inputs and results. The workflow system allows business processes to be defined for any of the operations of a business enterprise. Business functions can specify the business functions needed to complete an operation, the personnel responsible for performing each of the business functions, and the inputs and outputs of each of the business functions. Business processes can include conditional branches, so that different business functions are performed in response to the result of one or more previous work activities. In one embodiment, the workflow system 235 has a graphical user interface for visually defining a business process or a business function in a manner similar to drawing a flowchart.

In one embodiment, the workflow system 235 is linked to a set of workflow-enabled applications. In this embodiment, the workflow system 235 is not only a drafting tool for defining business process, but also directly controls the operations of the workflow-enabled applications. Each business function in the business process is linked to an underlying function of a workflow-enabled application. Selecting a business function in a business process invokes the associated function of the workflow-enabled application.

For example, a business process can define the business functions to be followed to pay an invoice, and can be linked to a workflow-enabled accounts payable application. The workflow-enabled accounts payable application will operate according to the business process defined by the workflow system. If, for example, the workflow system specifies that invoices over a threshold amount, for example $100,000, be routed to a senior manager for approval, while invoices under this threshold can be approved by a junior manager, then the workflow-enabled accounts payable application will route all invoices received according to this criteria. In a further example, the notification system 230 can be used to route invoices and collect approvals as specified by the business process.

In a further embodiment, a business function of a business process represents a collection of related sub-functions, each representing a different work activities, or alternately represent a single work activity. For example, a procurement to payment business process can define the work activities used by an enterprise to procure and pay for business supplies. Examples of business functions within the procurement to payment process may include a procurement function to request business supplies, a receiving function to handle receipt of the business supplies, and a payables function to pay for the supplies following delivery. Each of these business functions can have numerous sub-functions. For example, the procurement function can have sub-functions for soliciting bids, evaluating bids from suppliers, and ultimately selecting a winning bid.

In yet a further embodiment, business functions representing a collection of related sub-functions may correspond with menus of workflow-enabled applications. Employees assigned to a specific business function will have access to the corresponding menu in workflow-enabled applications and any of the collection of related sub-functions can be activated via the menu. Conversely, an employee will be unable to access a menu of a workflow-enabled application corresponding with a business function not assigned to the employee.

The set of workflow-enabled applications can include applications adapted to a variety of business operations, including purchasing applications, such as Oracle Purchasing; general ledger applications, such as Oracle General Ledger; project management applications, such as Oracle Projects; accounts payable and receivable applications, such as Oracle Payables and Oracle Receivables; human resources applications, such as Oracle Human Resources; account generation applications, such as Oracle Account Generator; service applications, such as Oracle Service; engineering management applications, such as Oracle Engineering; inventory applications, such as Oracle Inventory; Web employee applications, such as Oracle Web Employees; Web customer applications, such as Oracle Web Customers; Web supplier applications, such as Oracle Web Suppliers; and implementation applications, such as Oracle Implementation Wizard.

In addition to the set of applications 205, a set of data objects is used by the audit system. A process library 250 is a set of business processes implemented in the workflow system 235 and, in one embodiment, associated with workflow-enabled applications 240. A typical process library can include over one thousand different business processes. Business processes can be generally applicable to all businesses, or specific to a certain type of business or industry.

A set of process risks 265 is associated with the business processes of the process library. A process risk is an undesirable outcome of a business process. Risks can result from a variety of sources, including from employees failing to follow the steps of a business process, from mistakes or wrong decisions made by employees, from employee malfeasance, and from business effects, such as customers failing to pay bills. Risks can be classified into categories, such as the type of risk, the organization(s) affected by the risk, and the severity of the risk. Each business process can be associated with one or more process risks, and conversely, each process risk can be associated with one or more business processes.

A set of process controls 255 are associated with the set of process risks 265 and the business processes of the process library 250. Controls are additional processes, conditions, and/or notifications intended to mitigate the associated risks. A control can be a manual control instructing an employee to verify a physical condition. A manual control can be implemented using the notification system. For example, control may require that a signature file or other valuable item be secured in a safe. In this example, the notification system will send a verification request to a trusted employee. The trusted employee will check to ensure the item is secured, and then respond to the verification request. The notification system will record the employee's verification for future reference.

A control can also be another business process implemented by one or more workflow-enabled applications. For example, an invoice control can be a two-, three-, or four-way matching of a received invoice with a purchase order, an inventory record for the associated item, and/or an acknowledgement of the acceptance of the item. These matching operations can be defined as a business process in the workflow system and executed by the functions of underlying work-flow enabled applications.

A set of process procedures 260 is associated with the other data objects. The process procedures provide documentation for performing the business processes of the process library 250. A typical set of procedures can include hundreds of different procedures for performing all or portions of the different types of business processes. The process procedures provide documentation to employees assigned to perform all or a portion of a business process on the appropriate way to perform their assigned tasks. In one embodiment, a procedure can be associated with more than one type of business process. Additionally, the set of process procedures 260 includes audit procedures for auditing the business processes. The audit procedures are associated with one or more business processes of the process library 250. The audit procedures provide auditors with documentation for auditing the associated business process. Auditors assigned to a specific business process can retrieve the appropriate audit procedures from the set of process procedures 260.

Figure 3:
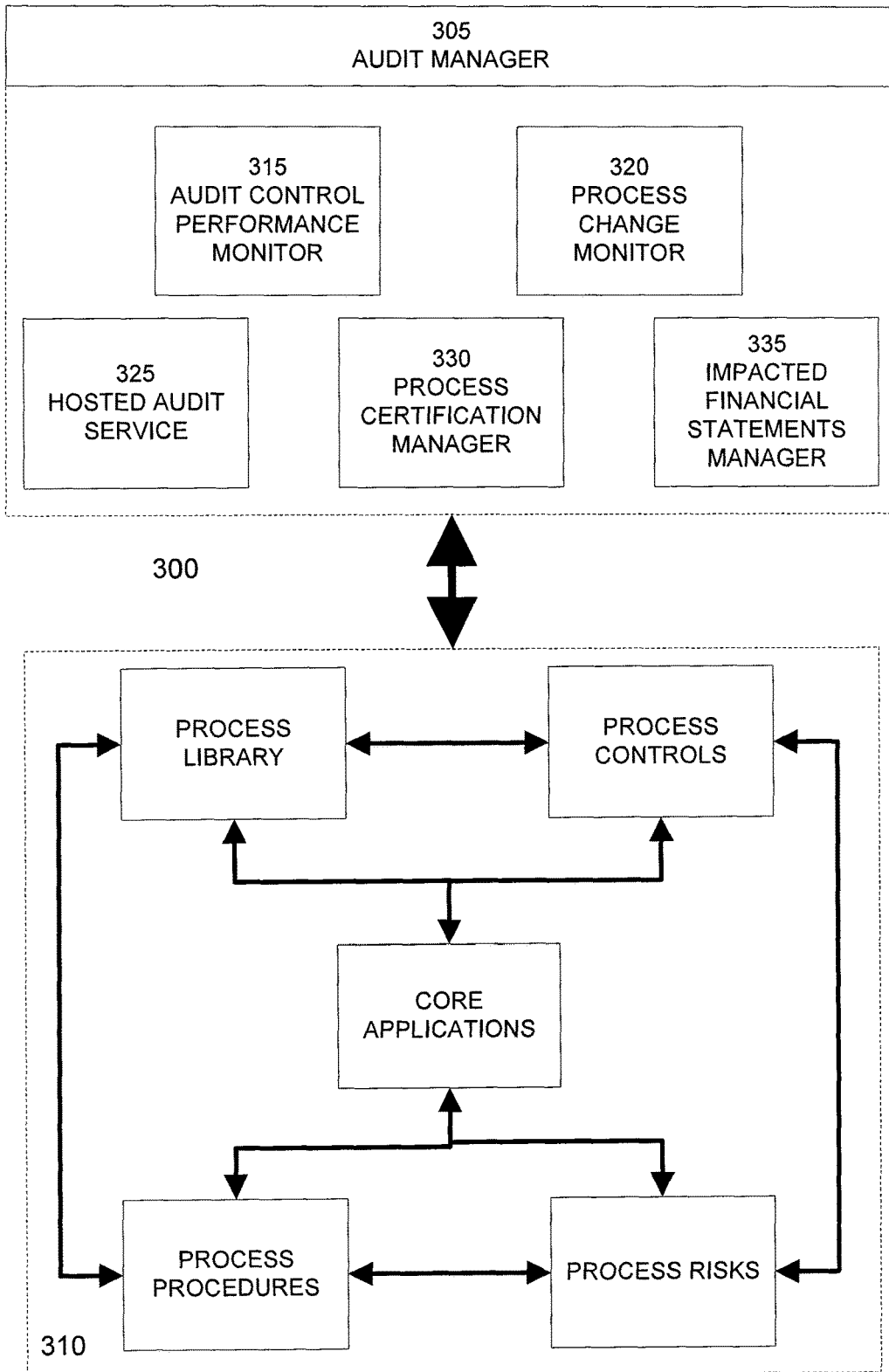
FIG. 3 is a block diagram illustrating one embodiment of the invention.

FIG. 3 is a block diagram 300 illustrating a configuration in accordance with one embodiment. A set of data objects and core applications, such as that discussed with respect to FIG. 2, is interfaced with an audit manager 305.

The audit manager 305 provides a central interface to all audit related tasks in an enterprise. The audit manager 305 enables an auditor to develop a picture of the processes of the company, similar to the library needed for ISO 9000 compliance audit. The audit manager 305 allows processes to be viewed and decomposed into many levels.

Additionally, part of the internal audit function involves maintaining the relationship between a business process and the financial accounts that the process impacts. For example, the Order to Cash process affects the Revenue, Deferred Revenue, Cost of Goods Sold, Finished Goods Inventory, and Accounts Receivable Control accounts. The audit manager 305 enables an auditor to efficiently view a business process and its associated financial accounts.

The audit manager 305 enables an auditor to associate risks for each process and the controls that mitigate each risk. The audit manager 305 can associate controls in the form of additional workflows or business processes to manage a risk. For example a control can enable processes such as profit screening or notification of a low margin order to finance ratio. As discussed below, controls can be continuously monitored for variances in Key Performance Indicators (KPI) recorded in a Performance Management Framework (PMF). Each KPI can have associated control limits or tolerances. If a process exceeds any of its KPI, an audit function or process can be automatically initiated by the audit manager 305.

An additional type of control risk arises from insufficient segregation of duties. If too many workflow activities are concentrated in a single person, the chance of employee errors or malfeasance going undetected is greatly increased. The audit manager 305 enables auditors to confirm that there are no employees that have access to pairs or groups of functions that are inconsistent with good internal controls. An example of functions that should be segregated include authorizing new suppliers and authorizing checks. As business processes are created, segregated functions are identified. The audit manager accesses the organizational structure of the enterprise to ensure that segregated functions are not performed by the same person.

The audit manager 305 also includes project templates defining standard audit procedures for each business process. In one embodiment, the project templates for audit procedures are defined in a workflow-enabled project management application linked with the business process in the workflow system. In this embodiment, the project templates for auditing a business process are workflows defined by the workflow system. An audit project template can include standard audit procedures, document templates, and standard deliverables needed for an audit of an associated business process. The audit manager 305 is interfaced with a workflow-enabled project management application to enable collaboration between auditors by providing planning functions, task assignment functions, progress tracking functions, communication functions, and document management functions. Task assignment functions enable the project management application to locate available people with the skill set to match assignments. Progress tracking functions enable the project management function to monitor progress against milestones.

When initiating an audit of a business process, the audit manager 305 uses the project management application to create an audit project from the appropriate audit project template. An audit project can be initiated as a scheduled activity or as the result of an trigger event, such as a large accounts receivable write off. As discussed elsewhere, the performance management framework enables auditors to continuously monitor Key Performance Indicators (KPI) to determine if a trigger criteria has fallen out of tolerance.

The audit manager 305 executes the audit project using the functions of the underlying project management application. The audit manager uses the project management application to record audit issues warranting further investigation, to record follow ups to audit issues, and to resolve any audit opinion differences, which exist when two auditors have differing opinions on whether a process is in control. In one embodiment, a threaded discussion capability, included as part of the notification system, is used to resolve audit opinion differences. The audit manager 305 can store and manage supporting documentation in a document management system. The supporting documentation may include references to transactions or electronic documents, including documents developed in other tools such as spreadsheets, review notes, scanned documents, and other portable document formats.

This exemplary audit manager 305 also employs specialized computer-aided audit tools. Examples of these tools include risk assessment tools such as Ratio Calculators, Anomaly Detectors, Sampling Methods, Process Controls Reports, and Fraud Detectors. A fraud detector is a tool used to detect suspicious transactions, including identifying people who submitted more than one expense report for a given week or expense reports with more than $100 of expenses without receipts.

The audit manager 305 further includes audit functions linked to standard financial reports, such as Subledger to General Ledger Integrity or Profit Reconciliation. Audit functions also can be linked to compliance reports, which guide the auditor through checking compliance with regulations like SOP 97-2, or checking contingent liabilities from a supply contract. Audit functions also can be linked to IT reports. For example, an IT report can identify users authorized to create payables invoices.

The audit manager 305 can be tightly integrated with the workflow system and the workflow-enabled applications. As a project status or task is changed, a workflow is initiated and reviewers and approvers of the project are notified by the notification system, such as by e-mail. The audit project status can be linked to the final audit opinion, so that the notification system automatically notifies the appropriate people of the audit finding.

In one embodiment, the audit manager 305 also integrates with a mapping between the organization units in an enterprise and the business processes that they perform. As each organization may be running a slight variation of a standard business process, the audit manager includes a process change monitor and process certification manager, discussed below, to identify process variations and to ensure that each organizations' business processes are approved. Additionally, the audit manager 305 can associate an audit schedule with an organization based upon the mapping of business processes to the organization. For example, an Accounts Receivable process might require auditing every six months. Based upon the mapping between organizational units and business processes, the audit manager identifies organizational units that employ the Accounts Receivable process and automatically schedule audit projects for these organizational units.

As discussed above, the Sarbanes-Oxley Act requires corporations to conduct surveys of management and to enable anonymous reporting of potential problems. one embodiment of the audit manager 305 includes a survey facility to survey management on their opinion of the adequacy of internal controls and to enable anonymous "whistleblower" reporting. The survey facility employs the notification system. Survey users can route their responses to one or more specific organizational levels, to ensure that an issue receives appropriate attention. Like audit issues, the notification system can track follow-up responses to a survey issue in a threaded message format, and survey respondents can anonymously view follow-ups to their issues and can anonymously add their own follow-up responses.

The audit manager 305 includes a number of supporting modules for performing audit-related tasks. These modules work in conjunction with the audit manager 305 and include an audit control performance monitor 315, a process change monitor 320, a hosted audit service 325, a process certification manager 330, and an impacted financial statements manager 335. The operation of these modules will be discussed in detail below.

Figure 4:
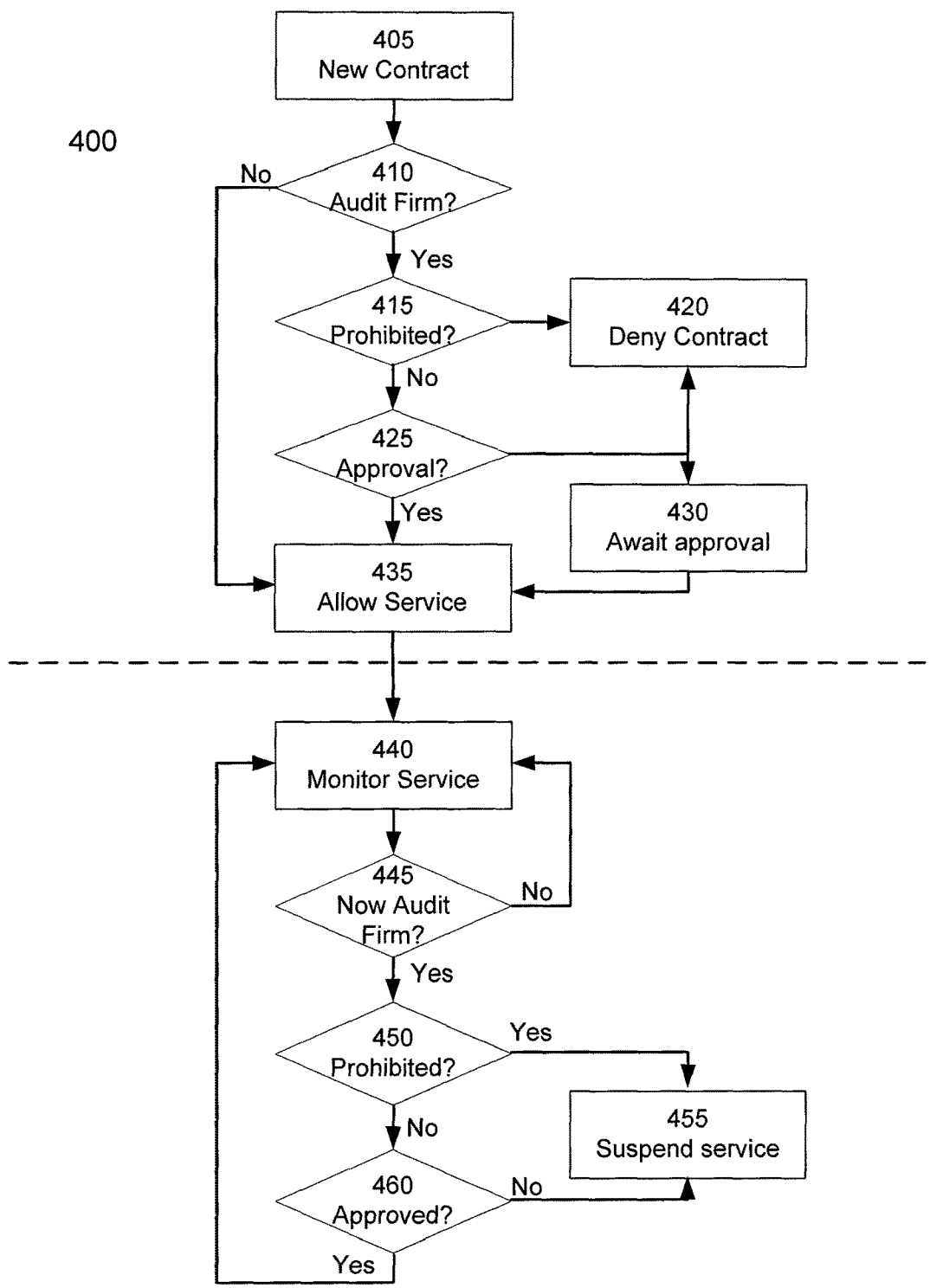
FIG. 4 illustrates a process for authorizing and monitoring services in accordance with one embodiment of the invention.

FIG. 4 illustrates the flow of an approval and monitoring process 400 in accordance with one embodiment. In this process, a request for a new service for an enterprise is received from an entity such as an auditor, vendor, or other service provider 405. The request can be in any appropriate form, such as an electronic version of a contract for services. After the request is received, the system first determines whether the entity offers auditing service to the enterprise 410. If not, then the request can be allowed 435 (after undergoing other approval steps as known in the art but not discussed herein as not being part of the present invention). If the entity does offer audit services to the entity, then the system can determine whether the requested service is prohibited under § 201 of the Sarbanes-Oxley Act 415 (or any other such law, rule, or regulation). If so, the request is denied 420. If not, the system can check to determine whether proper pre-authorization from the appropriate audit committee was received and entered into the system 425. If so, then the request can be approved 435. If not, the request can be denied 420 or at least held until proper pre-authorization information is obtained 430, after which the request for service can be allowed.

Once the service is allowed, the system can monitor the service 440. The monitoring can be done at any appropriate time, such as periodically or at random or set times. The system can monitor to determine whether the entity offering the non-audit service now also offers audit services to the entity 445. If not, then the service and monitoring can continue 440. If the entity now also offers audit services, the system can check whether the present non-audit service is prohibited as discussed above 450. If so, the service can be automatically suspended 455. If not, the system can determine whether proper pre-authorization information was obtained and entered 460. If so, the service and monitoring can continue 440. If not, the service can be suspended until such approval information is obtained and entered 455, or may be suspended indefinitely.

In one embodiment, the system categorizes each non-audit service as prohibited or permissible. If the service is permissible, then the system can also track the pre-approval information and link the appropriate tables accordingly. The categories can also be revisited and updated upon changes in the relevant policy, laws, rules, and/or regulations. In another embodiment, the audit committee can give time-specific authorizations for certain services. For example, a non-audit service from a particular vendor might be approved for a period of one year. In such an embodiment, the authorization for services is revisited periodically to ensure that all services are still approved. If an approval expires, the system can automatically suspend the service and attempt to obtain an updated approval, or at least generate a notification that the approval has expired and that the service has been suspended.

Figure 5A:
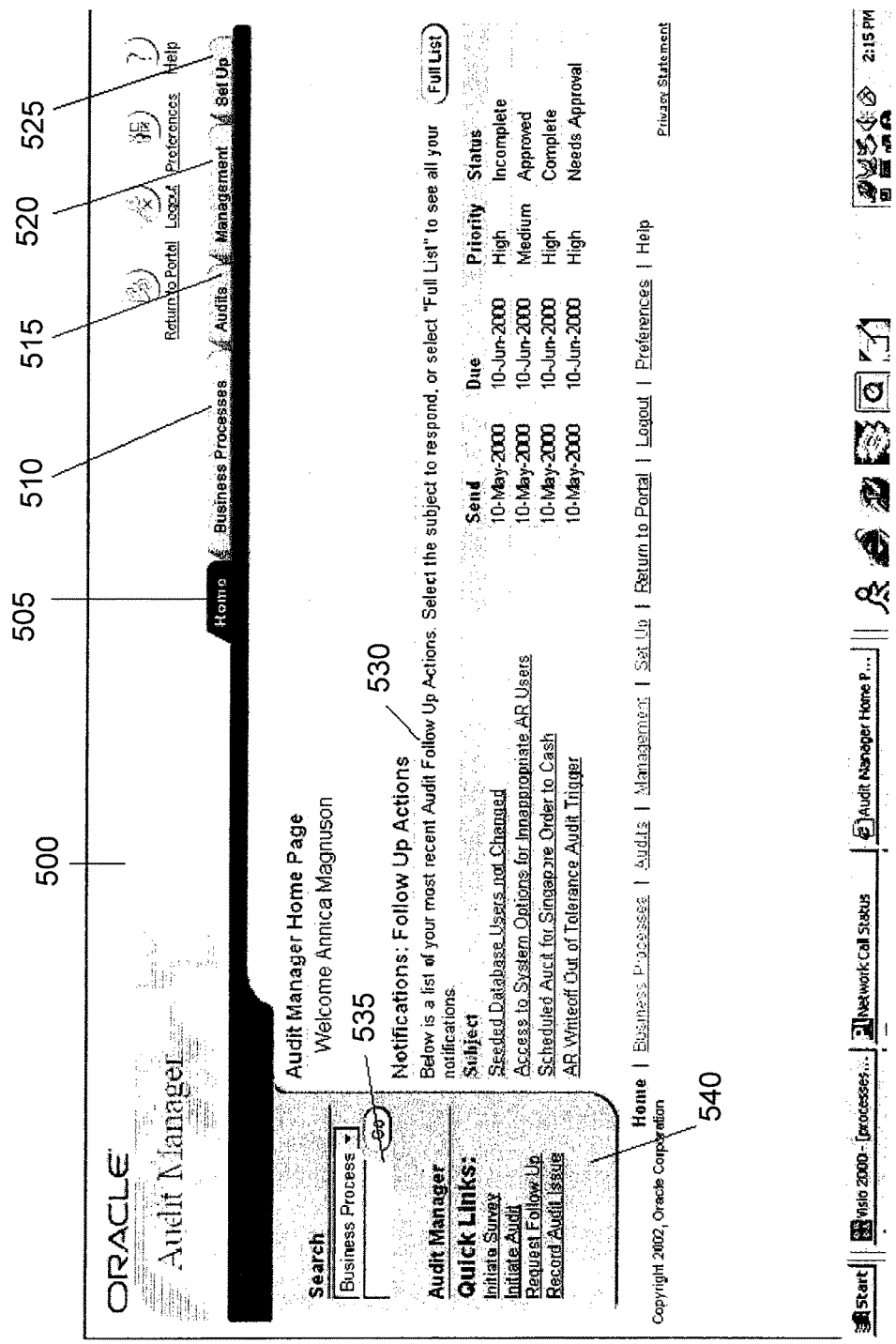
FIG. 5A is an example screen display of one embodiment of the invention.

FIG. 5A is an example screen display 500 of one embodiment of the audit manager. In one embodiment, screen display 500 is presented to a user via a Web browser. Screen display 500 includes tabs 500, 510, 515, 520, and 525 for navigating between sets of audit functions and audit information. By selecting a different one of the tabs, the user is presented with a different set of audit functions and audit information.

Home tab 505 corresponds to a default, or home, display where relevant daily information is presented to users. In FIG. 5A, the screen display 500 corresponds to an example home page, and the Home tab 505 is shaded to indicate to the user that the home page is the current display.

The home page includes a notifications section 530 displaying a subset of the audit issues and audit tasks to be performed by the user. The home page is personalized for each user, so that each user is presented with relevant audit issues and tasks. The notifications section 530 can include alerts to any outstanding follow up actions that have not been implemented, to any processes that have fallen outside of acceptable performance limits, and to any organization units that are due an audit according to the audit schedule of the organization.

The Business Processes tab 510 enables auditors to document the business processes and relevant surrounding information to be audited. The Audit Tab 515 enables auditors to define standard audit workflows for the audit of specified Business Processes, Audit Approaches and Lines of Business. The Management Tab 520 enables the manager of the audit department to plan the resources and skills needed for audit projects. The Set Up Tab 525 enables the manager of the audit department to set the audit schedule for the Business Processes and to assign the business processes to organization units. Tabs 510, 515, 520, and 525 are discussed in more detail below.

A search function 535 enables audit managers to search for audit relevant information using the search box. Auditors can search for information by business process, auditor, a standard workflow, an audit project, a procedure in the standard procedures manual, or a predefined risk.

The home page also presents frequently performed tasks and functions in the Quick Links section 540. In display 500, the Quick Links section includes task such as initiating a survey of management's assessment of the effectiveness of internal controls, initiating a new audit project, requesting follow up on a particular audit issue, and recording a new audit issue.

Figure 5B:
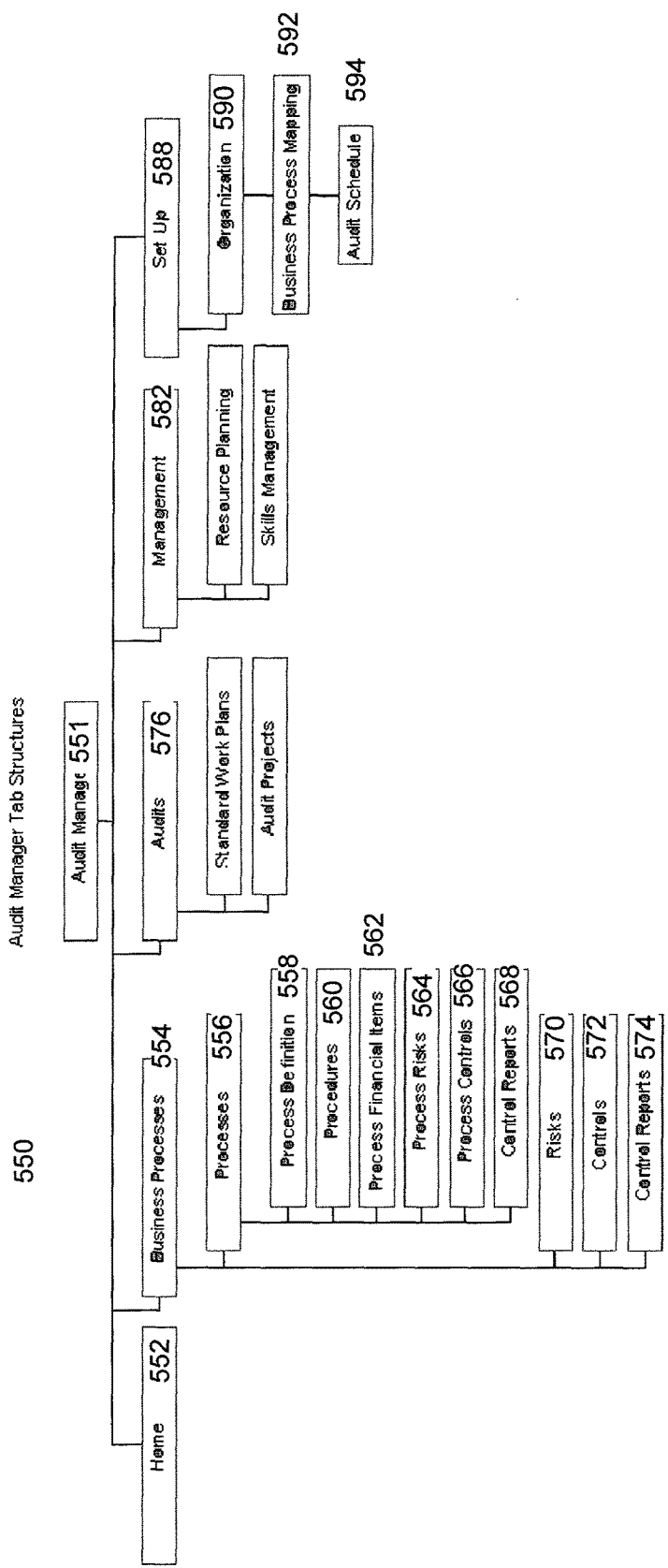
FIG. 5B is a block diagram of the user interface of one embodiment of the invention.

FIG. 5B is a block diagram 550 of the user interface for one embodiment. Block diagram 550 illustrates the user-interface tabs discussed above and their associated sub-functions. FIG. 5B is provided to explain the functions in an organized fashion and alternate embodiments may arrange these functions differently.

The business processes tab 554 includes process selection 556 for viewing details of one or more business processes. As discussed above, one embodiment employs the workflow system not only as a drafting tool for the designer of the business process, but also as the actual implementation of the business process. The processes selection 556 enables access to the database of business processes and process activities. In one embodiment, the business processes are displayed in the menu system. Users can navigate to different processes and invoke their underlying functions in workflow-enabled applications. Business processes also can reference other business processes.

Before being deployed by an enterprise, business process need to be certified. Certification ensures that the process complies with the standards of the enterprise. In one embodiment, selection 556 additionally displays the certification status of a business process. Example values of certification status include "Requested," which indicates that certification is requested, "Certified," which indicates that the manager or employee responsible for a process has certified that this process has been approved, and "Attested," which indicates that an auditor has verified the adequacy of the controls of a business process.

A "Request Certification" function is provided by selection 556 to initiate certification of a business process. The certification function sends a notification to all process owners, who are managers responsible for all or a portion of a process, to certify the business processes have adequate internal controls. Process owners of higher level processes can review the certification status of subsidiary processes as part of their own certification process. The responses of these notification are processed to determine the certification status of the business process.

Selection 560 displays procedures associated with business processes. As discussed above, a set of procedures is associated with the business processes. These procedures can be modified to fit the needs of the enterprise. In a further embodiment, the procedures are integrated with a workflow-enabled training application, such as Oracle iLearning. Employees are trained in procedures by the training application. In this embodiment, selection 560 allows auditors to track the progress of employees in studying the procedures.

Selection 564 displays risks associated with business processes. The Risks selection 564 from within the Processes tab 556 displays the risks that relate to the each business process in a table. In one embodiment, each risk is classified according to its probability and impact. For example, the risk of a loss making order being accepted may have a low probability and a high impact. Similarly, the risk of a salesperson accepting a kickback from a distributor may have a high probability and a low impact. Users can select risks from within the table and review the controls that apply to that risk. Users can create a new association between an existing risk and a business process, or add a new risk and associate the risk with one or more business processes.

Selection 566 displays the controls used to mitigate risks associated with the business processes. For example, one risk associated with the order to cash cycle might be the risk of customer default. Controls that address this risk might include setting approval limits for credit granting authority, ensuring the separation of duties between sales and credit management, and setting credit holds if an account is over 45 days past due. Each of these controls can be associated with one or more risks, or vice-versa.

In one embodiment, controls are of one of three general types. First, audit trigger events are controls that trigger audit events in response to variances in control limits or tolerances monitored by the performance management framework.

Second, workflow definition controls are additional workflow processes or sub-process integrated with the workflow of a business process to mitigate an associated risk. For example, a workflow definition control for a sales quotation process adds functions that perform profit screening or notification of a low margin order to finance. If a sales quotation business process is implemented by a workflow-enabled application, then the workflow definition controls will automatically implemented by the workflow-enabled application.

Third, controls can be included in profiles and system options. These controls change the settings or configuration of one or more workflow-enabled applications to implement a control.

An embodiment of the selection 566 displays controls within a table. Users can select controls and review the risks associated with each control. Users can also select controls and view the associated business processes. Users can create a new association between an existing control and a risk, or add a new control and associate the control with one or more risks.

Selection 562 displays financial items associated with business processes. A desirable result of auditing is determining the relationships between business processes and the key financial accounts they impacts. For example, the Order to Cash process effects the Revenue, Deferred Revenue, Cost of Goods Sold, Finished Goods Inventory, and Accounts Receivable Control accounts. Verifying the balances in an account requires an understanding of the processes affecting the account and the risks associated with these processes.

Selection 562 enables auditors to associate business processes to one or more key accounts. Auditors can then view financial accounts to determine the set of business processes, risks, or controls associated with each account.

In one embodiment, an impacted financial statement can be created from the set of business processes, risks, and controls. An impacted financial statement is a financial report, such as a balance sheet, annotated with information from the set of business processes, risks, and controls. A user can view the impacted financial statement as an electronic document. By selecting one or more line items on the impacted financial statement, users can view the risks, controls, and processes impacting the selected line.

A further embodiment imports financial data, such as account information, as XML files employing a standard XML schema for financial data. One such scheme is the XBRL standard taxonomy. The XML file is parsed to identify the financial accounts. Information from each identified financial account is then matched with the financial information associated with the set of business processes. An impacted financial statement is then created by combining the account information from the XML file with the associated business processes.

Selection 568 enables auditors to monitor the effectiveness of controls. The Audit manager utilizes the Performance Management Framework (PMF) integrated with a set of workflow-enabled applications to assign process objectives to a business process. The PFM can define process objectives as either control objectives or performance objectives. For example, the Accounts Receivable Department of a company may have performance objectives that are consistent with minimizing working capital requirements. An example of a performance objectives might be to minimize Days Sales Outstanding. The accounts receivable department may also have control objectives that are consistent with separation of credit granting authority and sales commitments. An example of a control objective might be to minimize Costs of Bad Debt.

The PFM enables users to associate one or more key performance indicators (KPI), which are quantitative measurements of compliance with a control or performance objective, to a business process. KPI can also be associated with controls to monitor risk mitigation. Each KPI has a desired objective value. The PFM continuously monitors the KPI for deviations from the desired objective value. Any deviations in KPI values outside a defined tolerance value triggers an audit event.

Selection 568 allows auditors to review the control and performance objectives associated with a business process, and enables auditors to add additional control and performance objectives in the form of KPI to business process. This allows auditors to determine whether control and performance objectives are in place to allow management to see if its objectives are being met. By integrating the PFM with the business processes defined by the audit manager, the audit manager enables managers and auditors to monitor the enterprise's performance with regard to both process objectives and risk mitigation.

Risks selection 570 displays similar information as selection 564, but with the information orientated to display processes associated with each risk, rather than the risks associated with each business process. Risk selection 570 also displays controls associated with each risk, similar to selection 566, but with the information orientated as controls associated with each risk, rather than the controls associated with each business process. Risks selection 570 also includes a risks search page enabling users to search for risks by name, process type, risk category, impact category, line of business, financial statement, and financial item. Risk selection 570 also enables auditors to navigate a hierarchical tree to locate a specific risk. Risks selection 570 further enables auditors to add or delete risks.

Selection 572 displays the controls associated with business processes, similar to selection 566, but orientated to display the risk and/or business processes associated with each control. Selection 572 enables auditors to add or delete controls. Selection 572 also includes a control search function to search for controls by name, process type, risk category, impact category, line of business, financial statement, and financial item. Control selection 572 also enables auditors to navigate a hierarchical tree to locate a specific control.

Additionally, if the control is associated with a performance or control objective, auditors can view a list of the KPI that have been created for the organization. Similarly, if the control is a workflow definition controls, auditors can view business processes associated with the control. If the control type is a system option, auditors can view a list of profile options and system option for the workflow-enabled application running the process. If the control type is a manual control, the text of the manual control can be viewed by the auditor.

Control reports selection 574 enables auditors to review the control and performance objectives associated with a business process, and to add additional control and performance objectives in the form of KPI to business process, similar to selection 568. However, selection 575 orientates information to display the business processes associated with each control or performance objective, rather than the control and performance objectives associated with each business process.

Audit Tab 570 enables auditors to create the audit projects, to record the activities of the audit project as it executes, and finally to issue the audit opinion and audit summary report. When a specific audit project is undertaken, either as a scheduled activity or as the result of an trigger event, (such as a large accounts receivable right off), the audit project is created from an audit project template for the business flow being audited. For example, if the business flow being audited is Order to Cash, the order to cash audit project template is used. The tasks required to audit the process risks of the Order to Cash process are also in the audit project template. The reports that verify the controls are in place can be referred to from within the audit project template.

Once an audit project is initiated, auditors can locate available people with the skill set to match the assignment. Once underway, audit projects can be monitored for progress against project milestones. Under the Audit tab 576, auditors can perform functions related to performing and recording their work, such as record audit issues, assigning follow up actions, attaching supporting documentation, and conducting threaded discussions. Additional specialized reporting is provided either on request or distributed through audit participants to both issue the audit opinion on completion or issue the audit summary report.

Audit tab 576 also provides auditors with specialized computer-aided audit tools including: Ratio Calculators, Anomaly Detectors, Sampling Tools, Legal Compliance Check Reports, Contract Contingency Check Reports, Process Control Reports, and Fraud Detectors.

The audit tab 576 also provides questionnaires to confirm an enterprise's contingency planning for continuance of operations. These questionnaires can be distributed via the notification system. Additionally, the audit tab 576 enables auditor to conduct information technology (IT) audits using specialized questionnaires and reports supplied for this purpose. These IT-specific features include reports for checking database security, function security, network security, physical access security, applications configurations, and applications configuration change history.

Management tab 582 enables managers of the audit department to create audit project templates and associate audit project templates with business processes. The audit templates are used as the standard workplan when auditing the associated business process. The management tab 582 also includes staff planning capability and skills management capability to help audit department managers ensure they have the right number of competent auditors to ensure the processes are in control.

Set up tab 588 enables auditors and audit department managers to perform the administrative functions such as assigning the audit schedules to organizations or business processes, defining segregations of duties, and recording incompatible functions. Audit can be scheduled on an organizational basis. For example, you may choose to audit the accounts receivable department every six months.

Segregation of duties is implemented to prevent employee malfeasance. Set up tab 588 allows auditors to define pairings of specific functions within one or more business processes that must not be available to the same user. In one embodiment integrated with a set of workflow-enabled application, the workflow-enabled applications automatically record the identity of the user performing each function in a business process. This is compared with the pairings of segregated functions defined by the auditors to ensure segregation of duties.

Similarly, set up tab 588 enables auditors to record a set of prohibited functions for each function in a business process. For example, a user having access to a create accounts payable invoice should not also have access to functions to create suppliers and enter purchase orders. Otherwise, there is a risk that the user can create fictitious suppliers and have the enterprise disperse funds to them.

Figure 6:
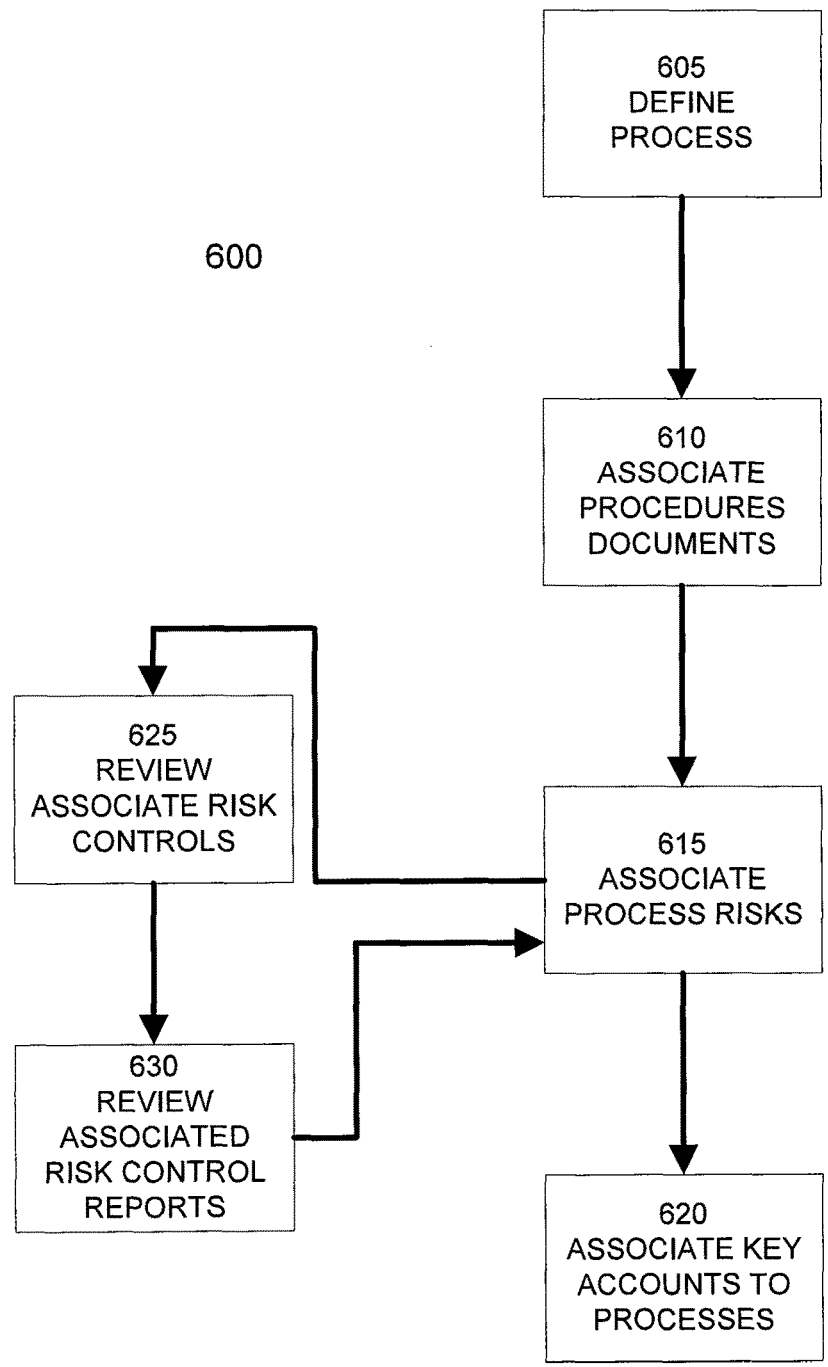
FIG. 6 is a block diagram of a method for creating a business process according to one embodiment of the invention.

FIG. 6 is a block diagram of a method 600 for creating a business process in accordance with one embodiment. At step 605, a business process is defined. A business process can be defined from scratch using a workflow system, or by selecting a predefined business process from the business process library. A predefined business process from the business process library can also be modified to create a business process tailored to a specific purpose within an enterprise.

At step 610, procedure documents are associated with the business process defined in step 605. The procedure documents provide documentation for auditing the business process. In one embodiment, predefined procedure documents are associated with a predefined business process in the business process library. As business processes are selected from the library and configured for use in the enterprise, the associated procedure documents are also selected and designated for use during audits of the business process. In a further embodiment, a predefined procedure document can be modified to create a procedure tailored to a specific need within the enterprise.

At step 615, process risks are associated with the business process. Process risks can be selected from a predefined set of risks associated with a business process in the business process library. In one embodiment, process risks can be automatically associated with a business process based upon the organization using the business process. In a further embodiment, auditors can associate additional risks, either predefined or newly created, with the business process.

At step 620, key accounts are associated with the business process. Key accounts are financial accounts impacted by the business process and its associated risks. In one embodiment, the association of key accounts with a business process is used to create impacted financial statements, discussed elsewhere in this application.

Step 625 determines the risk controls associated with the business process. In one embodiment, the set of risks associated with the business process in step 615 determines a corresponding set of risk controls in step 625. In this embodiment, a set of predefined risks is associated with a corresponding set of predefined controls intended to mitigate these risks. In step 625, an auditor can review the controls associated with the business process. An auditor can add, remove, or modify the controls as he or she sees fit to tailor the controls to the needs of the enterprise.

Similarly, step 630 determines the risk control reports associated with the risk controls. Control reports, as discussed above, enable auditors to review the control and performance objectives associated with a business process, and to add additional control and performance objectives in the form of KPI to business process. In step 630, auditors can review the control reports associated with the business process, and can add, remove, or modify the control reports as he or she sees fit to tailor the control reports to the needs and process objectives of the enterprise.

Figure 7:
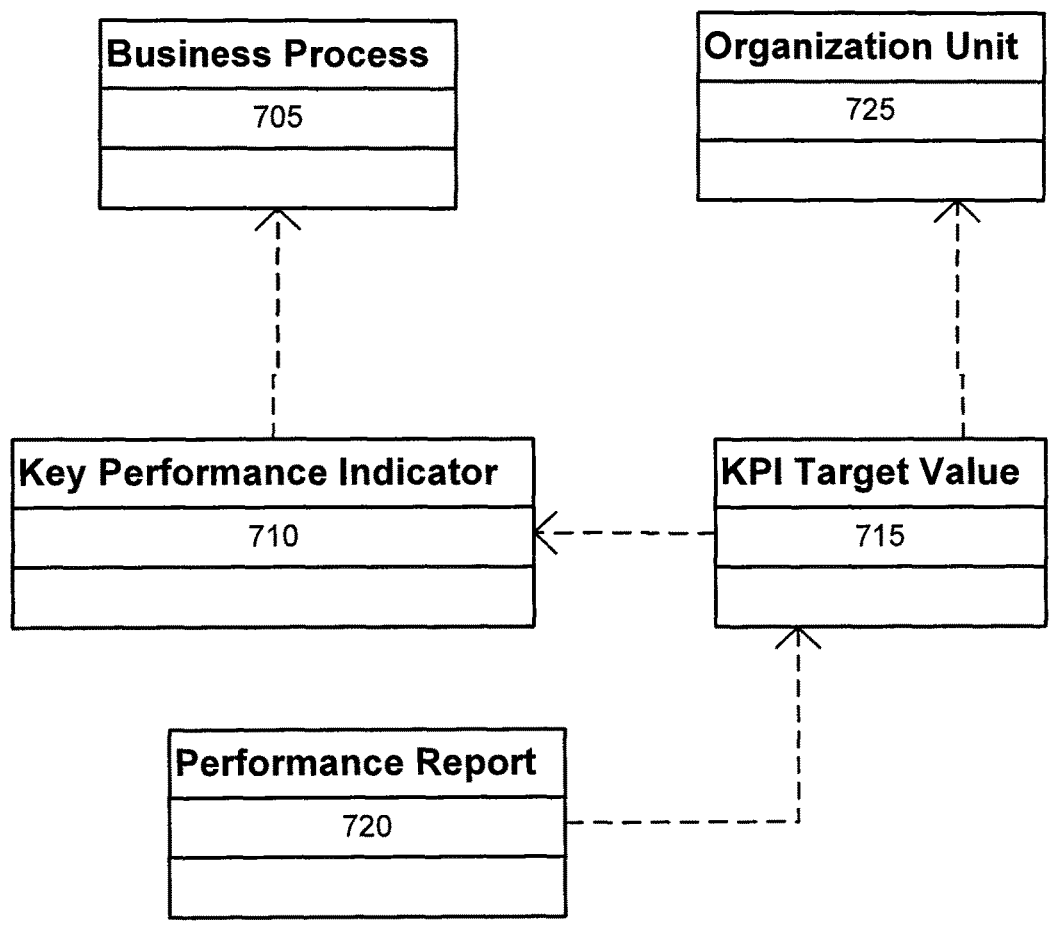
FIG. 7 is a block diagram of a portion of one embodiment of the invention for monitoring the performance of a business process.

FIG. 7 is a block diagram 700 of a portion of one embodiment for monitoring the performance of a business process. A business process 705 is associated with a key performance indicator 710. The key performance indicator determines a quantitative value representing the performance of the business process. For example, a key performance indicator 710 can be the average time to ship a product, the amount of accounts receivable pass due, or any other attribute derived from a business process.

The value of the key performance indicator is compared with a KPI target value 715. A result of this comparison is used to create a performance report 720 describing the business process's 705 performance in comparison to its objectives. The KPI target value 715 can be derived from a performance objective defined by the organizational unit 725 implementing the business process, or alternatively as discussed above, set by an auditor from the audit manager.

In one embodiment, the key performance indicator 710 is determined by a performance management framework application. The value of the key performance indicator 710 is determined as frequently as needed. Embodiments determine the key performance indicator's 710 value on a continuous basis, while alternate embodiments determine this value at other time intervals, such as daily, weekly, monthly, quarterly, and/or yearly.

Figure 8:
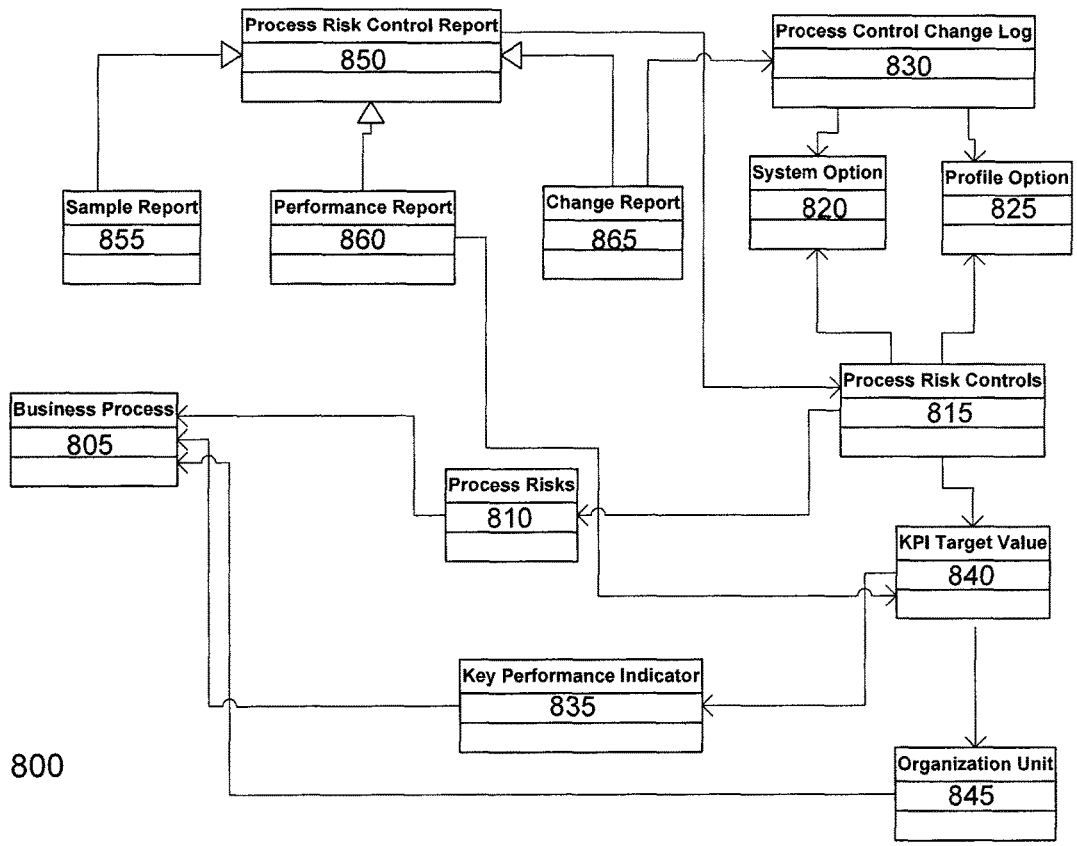
FIG. 8 is a block diagram illustrating the association of a business process with process risks, controls, and control reports according to one embodiment of the invention.

FIG. 8 is a block diagram 800 illustrating the association of a business process with process risks, controls, and control reports according to one embodiment. Business process 805 is associated with key performance indicators 835, KPI target values 840, and an organizational unit 845 in a manner similar to that described above with regard to FIG. 7. Business process 805 is additionally directly associated with organizational unit 845, so that auditors can view all of the business processes associated with an organizational units, or all of the organizational units associated with a business process.

Business process 805 is associated with process risks 810. The process risks 810 are associated with process risk controls 815 used to mitigate the process risks 810. Process risk controls 815 are associated with the KPI target value 840 to enable comparison of a process risk control's KPI values with their corresponding KPI target values 840.

Process risk controls 815 are further associated with system options 820 and profile options 825. As discussed above, one type of process risk controls can be implemented using the profiles and configurations of one or more workflow-enabled applications. The system options 820 and profile options 825 are associated with the process control change log 830, which records the change in the process risk controls 815 over time.

Process risk controls 815 are also associated with the process risk control report 850. The process risk control report 850 creates summaries and reports of the process risk controls, enabling auditors and managers to monitor the performance of process risk controls. The process risk control report 850 employs a sample report 855 as a template for creating reports. The process risk control report 850 can create performance reports 860 summarizing the performance of a process risk control relative to a KPI Target value 840. Additionally, the process risk control report 850, in conjunction with the process control change log 830, can create a change report 865 summarizing the changes to the process risk controls 815 over time.

A great deal of the time and effort in an audit is spent verifying the business processes that an enterprise is using. Enterprises often have a global or standard business process. For example, there may be a standard business process for running an Order Desk. Auditors can authorize the standard process as the standard way of running Order Desk operations for all companies in the enterprise. However, a given company or organization unit within the enterprise may be running a derivative or variation of the standard process. Deviations from the approved standard process may be justified in terms of local legal framework or customs. For example, some countries mandate the number of digits in a journal numbering scheme.

When the derivative process is audited, the auditors must determine whether the derivative process introduces any additional risks. Any additional risks must be evaluated by auditors and/managers. If the risks of the derivative process are acceptable, then the derivative process is approved. Depending on the nature of the risks introduced by a derivative process, approval may be required from one or more auditors or managers.

The audit manager enables enterprises to formalize the approval of business processes and their derivatives. The workflow system acts as a repository of all of the business processes of the enterprise. In one embodiment employing workflow-enabled applications to implement the business processes, derivative processes are automatically added to the workflow system as organizational units change their operations. In an alternate embodiment, organizational units provide the workflow system with descriptions of their business processes manually. The workflow system associates derivative business processes with their implementing organizational units.

The audit manager compares the business processes of an organizational unit with the standard global business process already approved by the enterprise to identify deviations from the standard business process. Auditors can view each deviation and its approval status (e.g. approved, unapproved, or approval in progress), issue approval requests to the appropriate auditors and managers through the notification system, and monitor any follow up discussions or actions undertaken in either approving the derivative process or bringing the derivative process back in line with the approved global process. Once a derivative process has been approved, it is added to the repository of approved business processes and will be available to auditor in future audit cycles. Additionally, the approvals, justifications, and discussions related to process deviations are also included as a record of the approval of the derivative process.

Figure 9:
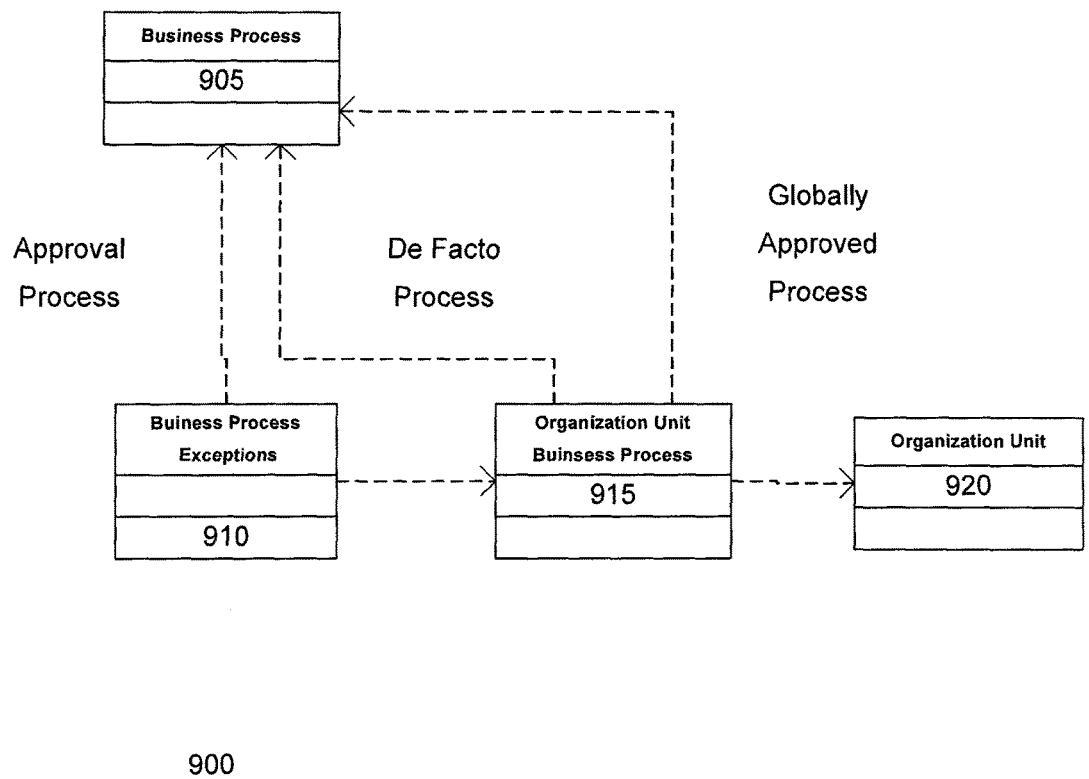
FIG. 9 is a block diagram of a portion of one embodiment of the invention for approving a variation of a business process.

FIG. 9 is a block diagram 900 of a portion of one embodiment for approving a variation of a business process. The de facto business process 905 is compared with the organizational business process 915. The organizational business process 915 inherits the global approved business process and any changes associated with the organizational unit's business processes from the organizational unit 920. Any deviations from the approved business process are identified and subject to an approval process. As deviations are accepted as business process exceptions 910. Additionally, users can request approval for changes to the standard business process.

In response to the initiation of an approval process, either arising from a user request or from the identification of a deviation in the de facto business process, the business process change monitor notifies one or more responsible users associated with the business process. The notification identifies the deviation (or requested deviation). Responsible users can include managers, auditors, and attorneys, who are responsible for determining whether the deviation is acceptable from business, financial, and legal perspectives. Each notified user can approve or disapprove of the deviation. The approval decision and any comments from each notified user are shared with the other users. Notified users can discuss the deviation using the notification system, such as the threaded discussion capability, until a consensus is reached. Based on the decision, the deviation can be approved and implemented, or disapproved and removed. The record of the approval process is preserved to document the changes to the business process.

Figure 10:
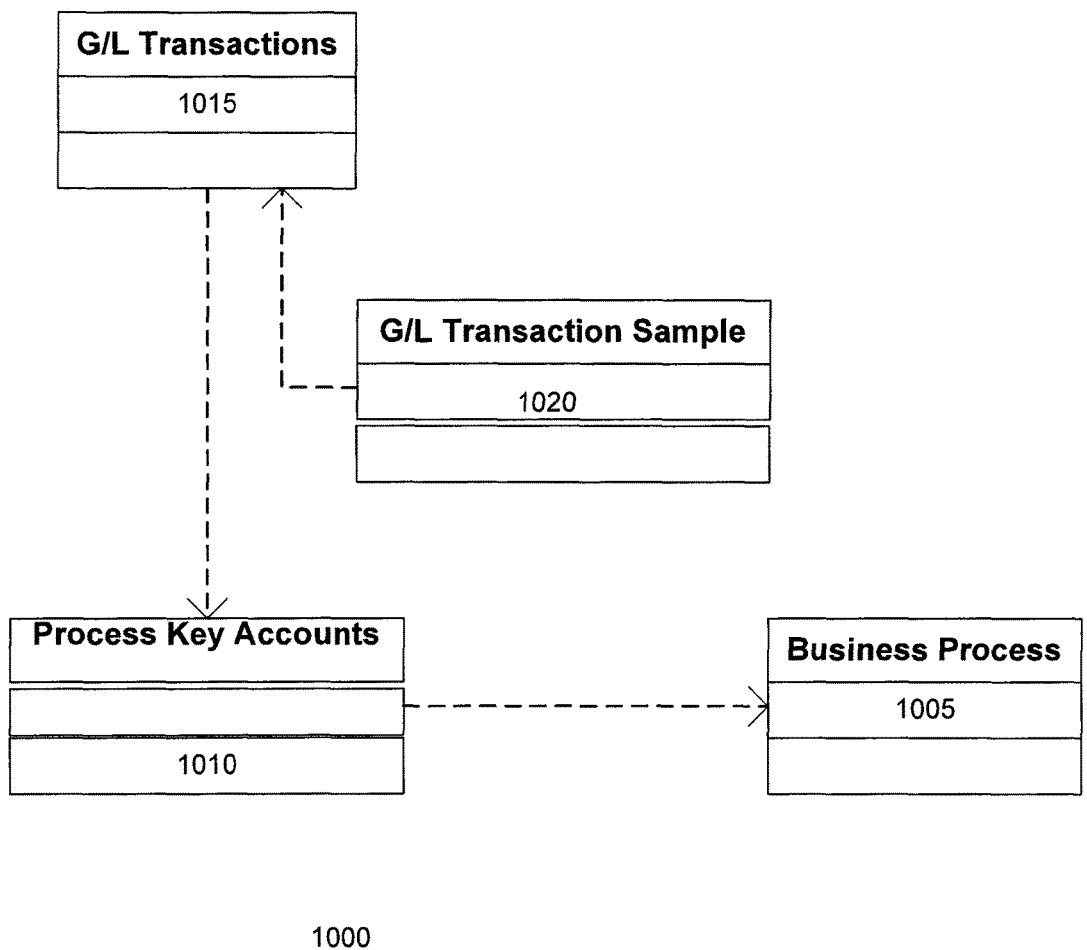
FIG. 10 is a block diagram of a portion of one embodiment of the invention for creating an impacted financial statement.

FIG. 10 is a block diagram 1000 of the association of a business process with a financial account for creating an impacted financial statement and auditing sample transactions in one embodiment A business process 1005 is associated with one or more key financial accounts 1010. The financial accounts 1010 are associated with a set of general ledger transactions 1015 that impact the financial accounts 1010. Auditors can select general ledger transaction samples 1020 for further scrutiny. In one embodiment, the association of the business process 1005 with key accounts 1010, general ledger transactions 1015, and general ledger transaction samples 1020 enable auditors to view sample transactions associated with a business process.

In addition to scrutinizing sample transactions, auditors can initiate testing steps to validate that a control is in place and is effective. A testing steps module of the audit manager enables auditors to define steps to validate controls. The steps can define a manual testing procedures, for example to test the physical security of an item, or to create one or more reports searching for suspicious behavior. For example, to detect risks associated with "quid pro quo" orders between an enterprise and a customer/supplier, a supplier audit report or a supplier/customer netting report, which identifies entities that are both customers and suppliers, can be created.

Additionally, a report can be created from one or more KPI monitored by the performance management framework. For example, a report can summarize purchases as a percentage of sales. Another type of report can monitor the change in profile or system options effecting the behavior of a business process. For example, a workflow-enabled accounts payable application can have options for activating or deactivating an audit trail, setting a default country, allowing folder customization, and enabling/disabling sequential numbering. Frequent changes in these options can indicate suspicious activity warranting further investigation.

Figure 11:
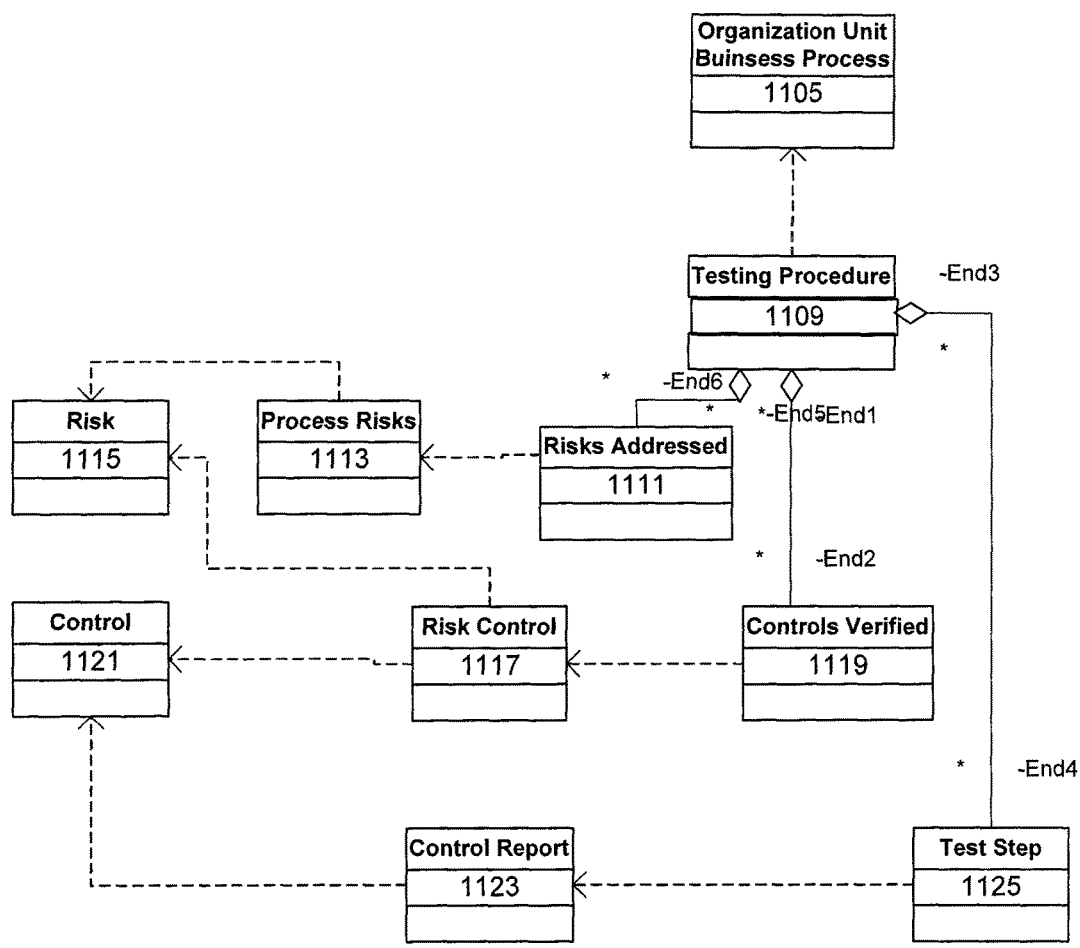
FIG. 11 is a block diagram illustrating a set of data objects used by one embodiment of the invention.

FIG. 11 illustrates a block diagram 1100 of the association of a set of testing steps with a business process. The organizational unit business process 1105 is associated with a testing procedure 1109. The testing procedure has several different testing paths used to validate the business process and its controls. First, the testing procedure is associated with a set of risks addressed 1111 by the business process. These general risks are further refined into a set of specific process risks 1113. Each process risks can be associated with one or more controls 1117.

In a second testing path, the testing procedure 1109 is associated with a set of controls verified 1119. The controls verified 1119 are the controls validated as adequate for the business process. The controls verified 1119 are derived from the set of risk controls 1117. Risk controls 1117 are associated with a risk 1115. Controls 1121 are associated with the risks 1115 to determine the set of risk controls 1117.

In a third testing path, the testing procedure 1109 is associated with one or more test steps 1125. Each test step is associated with one or more control reports 1123 reporting the value of one or more KPI associated with a control 1121.

Another aspect is a hosted audit service. Although the audit manager is ideally tailored for integration with a workflow system and a set of workflow-enabled applications, some enterprises do not have this degree of application integration. Other enterprises may be using incompatible workflow applications.

Figure 12:
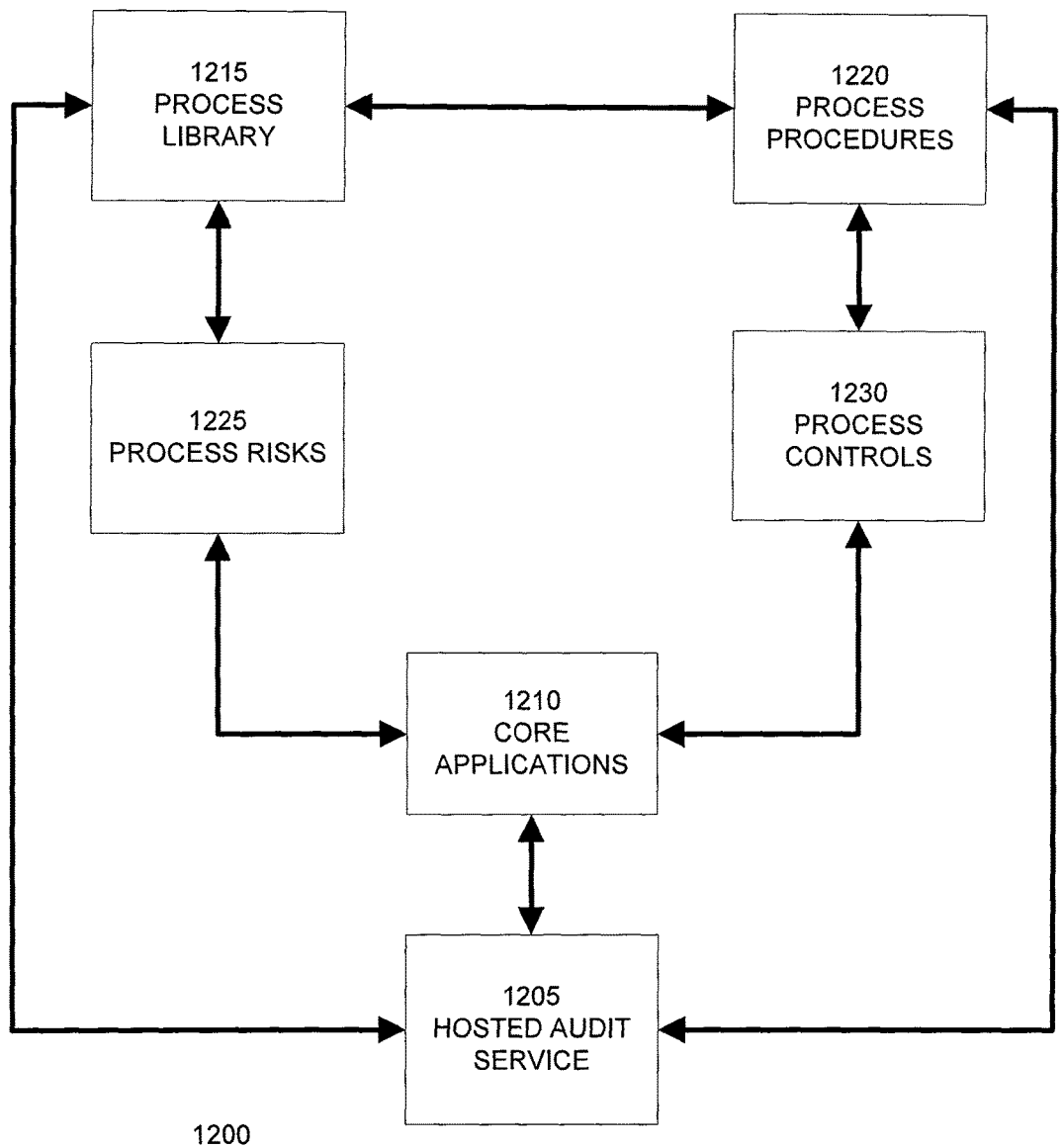
FIG. 12 illustrates a block diagram of a hosted audit service according to one embodiment of the invention.

To address the audit needs of these enterprises, a hosted audit service leverages the process library and associated process procedures, risks, and controls to provide an audit "package" tailored to the needs of the enterprise. FIG. 12 illustrates a block diagram 1200 of a hosted audit service according to one embodiment. Auditors can access the hosted audit service 1205 to select business processes from the process library 1215 equivalent to the enterprise's business practices. Because the process library 1215 includes business processes based on standard business and industry practices, it is very likely some processes in the process library 1215 will closely resemble the enterprise's actual business practices.

Based on the auditor's selection of business processes, the hosted audit service 1205 creates an audit procedures manual from the set of process procedures 1220. As discussed above, the process procedure documents are associated with the appropriate business processes. The hosted audit service 1205 leverages this association to create an audit procedure manual tailored to the business practices of the enterprise. The enterprise's auditors can follow the audit procedures manual to audit the business practices of the enterprise.

Additionally, the set of business processes 1215 is associated with sets of process risks 1225 and process controls 1230. The hosted audit service 1205 can create a list of the associated risks and controls for the business processes selected by the auditor. Auditors can use this list of risks and controls to verify that their enterprise has adequate controls and that all possible risks are addressed.

Unlike some of the above-discussed embodiments of the audit manager, which actually implement business processes and associated controls in workflow-enabled applications, one embodiment of the hosted audit service does not execute business processes or controls. However, this embodiment of the hosted audit service does provide auditors with a custom-tailored audit "package" that can be manually implemented in their enterprise. This provides substantial time and cost savings for auditors as compared with having to develop their own audit procedures internally or with outside consultants.

Additionally, the hosted audit 1205 provides auditors with a central interface to all audit related tasks. In one embodiment, the hosted audit service 1205 provides a central interface similar to audit manager 305. The hosted audit service 1205 enables auditors to create and manage audit projects. This embodiment of the hosted audit service 1205 provides auditors with planning functions, task assignment functions, progress tracking functions, communication functions, and document management functions, similar to those described for audit manager 305. The hosted audit service 1205 can be used to schedule audits automatically.

The hosted audit service 1205 enables auditors to audit issues warranting further investigation, follow ups to audit issues, and resolutions of audit opinion differences. In a further embodiment, the hosted audit service 1205 includes a threaded discussion capability is used to resolve audit opinion differences. The notification system and its threaded discussion capabilities are also used by the hosted audit service to conduct management surveys and to enable anonymous "whistleblower" reporting. The hosted audit service 1205 can store and manage supporting documentation in a document management system and includes specialized computer-aided audit tools, such as Ratio Calculators, Anomaly Detectors, Sampling Methods, Process Controls Reports, and Fraud Detectors.

In a further embodiment of this aspect, the hosted audit service 1205 is provided to auditors via a Web-browser interface. Auditors access the hosted audit service 1205 via a Web browser to select business processes appropriate to their enterprise, to create and download an audit procedures manual based on the selected business processes, and to create and download a list of risks and controls. Additionally, the hosted audit service 1205 provides audits with a central interface to all audit related tasks similar to that in screen display 400 discussed above.

In a further embodiment, the audit manager includes a registry of incompatible business functions. FIG. 13 illustrates a registry of incompatible business functions 1300 according to one embodiment. The registry of incompatible business functions is created from a library of business processes or duties, such as process library 250 or process library 1215. As the process library is created, a corresponding list of incompatible business functions is created for each business function in a business process. If a business function represents a set of related sub-functions, each sub-function can inherit a list of incompatible business functions from the parent business function, and further may include additional sub-functions. When a business process is selected from the library by auditors for inclusion in the enterprise, the business functions of the selected business process and its corresponding list of incompatible business functions are added to the registry 1300. In a further embodiment, auditors can add additional business functions to the registry. As an auditor adds a business function to an enterprise, the audit manager prompts the auditor to select incompatible business functions.

For example, registry 1300 is a table having a list of business functions duplicated on both axes. The arrangement of registry 1300 is for purposes of illustration, and alternate embodiments of the registry can include different data structures. In registry 1300, the "Create Supplier" function is incompatible with both the "Pay Invoice" and "Generate Invoice" function, as indicated by the "X" in the corresponding columns. Similarly, the "Conduct Inventory" and "Adjust Cycle Count" business functions are incompatible with each other.

In one embodiment, a reporting function of the audit manager ensures that functions are segregated among employees according to the incompatibilities listed in registry 1300. To create a report, the audit manager compares the business functions in the registry 1300 with the business functions assigned or available to each employee. Employees having access to two or more incompatible business functions are added to the report. The report may include information for identifying employees having incompatible duties, such as their name and organization, as well as information concerning the incompatible functions, such as a list of all incompatible functions assigned to each employee on the report.

In another embodiment, an alert function of the audit manager provides auditors with a warning when incompatible duties are assigned to an employee. In this embodiment, as duties are assigned to an employee, the assigned duty and any other previously assigned business function are compared with the business functions in registry 1300 to identify any potential incompatibilities. If an incompatible business function has been assigned to an employee, an alert can be sent to auditors and/or management. In one embodiment, the performance management framework monitors the processes added to each employee and compares added functions with the registry 1300. In a further embodiment, the notification system communicates alerts of incompatible duty assignments with auditors and/or management. In still another embodiment, the audit system may be further integrated with the workflow applications and prevent the assignment of incompatible functions to employees.

In a further embodiment, one or more risks, similar to the process risks 265 discussed above, can be associated with each set of two or more incompatible functions. The risks associated with sets of incompatible functions can be classified into categories, such as the type of risk, the organizations affected by the risk, and the probability and severity of the risk. Each set of two or more incompatible functions can be associated with one or more risks, and conversely, each risk can be associated with one or more sets of incompatible functions.

Figure 14A:
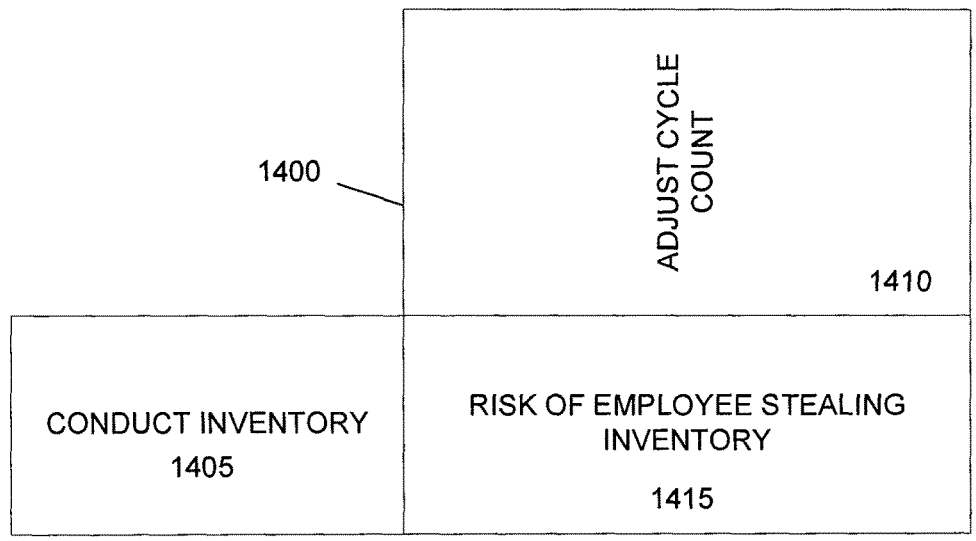
FIGS. 14A and 14B illustrate risks associated with pairs of incompatible functions.
Figure 14B:
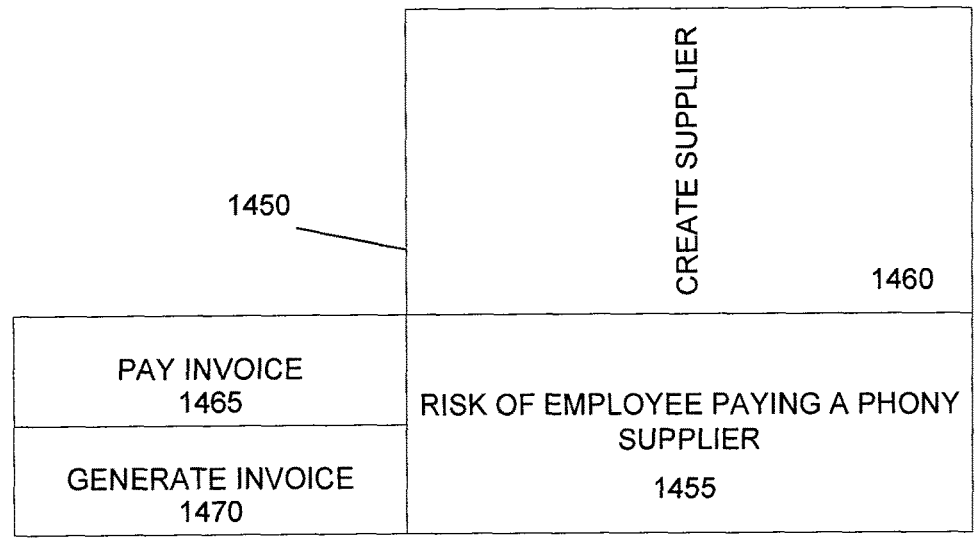

FIGS. 14A and 14B illustrate example risks associated with pairs of incompatible functions. FIG. 14A illustrates an example set 1400 of incompatible functions. In this example, set 1400 is one of the sets of incompatible functions defined in registry 1300. Set 1400 includes incompatible functions "Conduct Inventory," 1405, and "Adjust Cycle Count," 1410. A set of risks 1415 is associated with the set 1400 of incompatible functions. The set of risks 1415 includes "Risk of employee stealing inventory." This risk, along with any other risks in the set of associated risks 1415, can be assigned to one or more categories, for example "Theft." Each risk in the set of associated risks can be assigned a risk probability and risk impact. For example, "Risk of employee stealing inventory" may have a "high" probability of a risk occurring and a "medium" level of impact to the enterprise.

Similarly, FIG. 14B illustrates another example set 1450 of incompatible functions associated with a set of risks 1455. In example set 1450, the functions "Create Supplier," 1460, "Generate Invoice," 1465, and "Pay Invoice," 1470 are associated with the set of risks 1455. The set of risks 1455 includes the risk "Employee paying a phony supplier."

In a further embodiment, the sets of risks associated with incompatible functions are derived from standard accounting references, such as the report of the Treadway commission. In a further embodiment, the sets of risks associated with incompatible functions may be provided by an enterprise's internal or external auditors. The sets of risks and their respective associations with sets of incompatible functions may be based on standard accounting references and modified to include risks specific to an enterprise.

The sets of risks associated with sets of incompatible functions can be used by the audit manager application and hosted audit service in the same way that risk associated with business processes in the process library are used. For example, risks associated with a set of incompatible functions can be included in audit reports. Auditors can view all of the risks in an enterprise introduced by incompatible functions in an audit report, and view each incompatible function assignment associated with a risk, risk category, risk probability, or risk impact.

Incompatible functions and their associated risks can trigger additional audit tasks to be resolved in the audit manager application. The audit manager application tracks the resolution of these additional audit tasks for future reference. As an example, for some incompatible function assignments, especially in smaller enterprises, an auditor may decide to continue to allow an employee to performs several incompatible function because the risk is outweighed by the burden to the enterprise to reassign one or more of the incompatible functions to a different employee. In these situations, the audit manager application will note the auditors' discussion and approval of this issue.

The audit manager application can also generate impacted financial statements including risks associated with incompatible functions. As discussed above, an impacted financial statement can be created from the set of business processes, risks, and controls. The risks includes process risks associated with business processes and risks associated with incompatible functions. An impacted financial statement is a financial report, such as a balance sheet, annotated with information from the set of business processes, risks, and controls. A user can view the impacted financial statement as an electronic document. By selecting one or more line items on the impacted financial statement, users can view the risks, controls, and processes impacting the selected line.

In one embodiment, the audit system formally communicates the results of an audit to company officers. Company officers can review the audit results in detail to identify specific risks, their associated process controls, and the potentially impacted financial accounts. If the company officers decide to certify, or warrant, the audit results, for example to comply with the Sarbanes-Oxley Act, the audit system documents the company officers' approval.

FIG. 15 illustrates an example screen display 1500 of an audit system that summarizes an audit according to one embodiment. In this example, a company officer can view screen display 1500 by selecting the tab 1505. Screen display 1500 includes a certification section 1510, an ineffective financial items section 1515, and summary section 1520.

Certification section 1510 displays whether the current audit has been wholly or partially certified as well as any comments or details pertaining to the audit certification. The certification of audit results by company officers using the audit system is discussed in more detail below.

Ineffective financial items section 1515 displays any financial items associated with business processes designated by auditors as having ineffective financial controls. As discussed above, the auditors using the audit manager designate business processes as having effective or ineffective financial controls during an audit. In one embodiment, the audit manager automatically identifies the financial items associated with ineffectively controlled business processes and adds these financial items to the ineffective financial items section 1515. For each financial item listed in section 1515, the company officer or other user can select the item to reveal additional information about the ineffective controls associated with the financial item.

Summary section 1520 summarizes the results of the audit. In particular, summary section 1520 includes audit results that might be a cause for concern for company officers. For example, summary section 1520 includes changes to business processes 1525, uncertified processes 1530, and audit evaluation 1535. Audit evaluation 1535 lists business processes with ineffective controls, organizational variances to business processes with ineffective controls, unmitigated risks, and specific ineffective controls. As with other sections, the corporate officer or other user can select an item in section 1520 to view additional details.

FIG. 16 illustrates an example screen display 1600 of an audit system that summarizes audit information by financial account according to one embodiment. A company officer or other user can view screen display by selecting tab 1603. Screen display 1600 organizes audit results by their associated financial items. Column 1605 presents a list of all of the financial items related to the audit. In one embodiment, column 1605 is automatically populated by the audit system using the associations between financial items, business processes, organizations, risks, and controls, as well as the audit results created using audit projects, as discussed above. In the example screen display 1600, column 1605 presents a hierarchical list of financial items. This enables company officers or other users to view general financial items, or to view one or more sub-items associated with a general financial item. Sub-items can be selectively hidden or shown to provide the company officer with the desired granularity of information.

For each financial item, or sub-item if shown, column 1610 lists the number of associated business processes pending certification. Column 1615 lists the number of business processes associated with a financial item or sub-item that are certified, but have issues. Similarly, for each financial item or sub-item, column 1620 lists the number of associated business processes with ineffective controls, column 1625 lists the number of associated organizations with ineffective controls, column 1630 lists the number of associated unmitigated risks, and column 1635 lists the number of associated ineffective controls. For each item listed in columns 1610-1635, selecting the item will display detailed information on the specific processes, organizations, risks, or controls represented by that item.

Set of columns 1640 lists the auditors' evaluation of the associated financial item, as well as the name of the auditor and the date of the audit.

Figure 17:
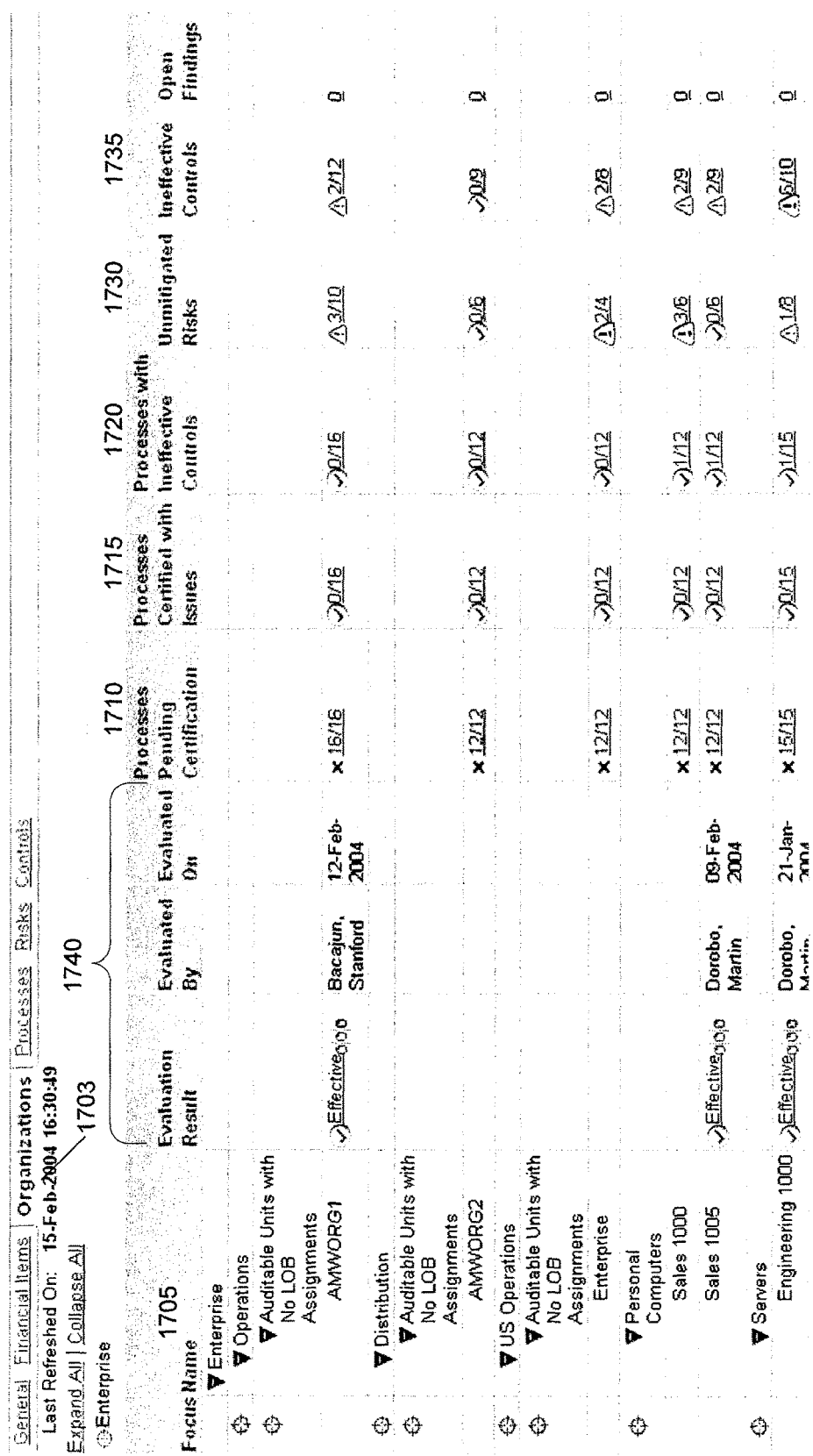
FIG. 17 illustrates an example screen display of an audit system that summarizes audit information by organization according to one embodiment of the invention.

FIG. 17 illustrates an example screen display 1700 of an audit system that summarizes audit information by organization according to one embodiment. A company officer or other user can view screen display by selecting tab 1703. Screen display 1700 organizes audit results by their associated organizations within the business enterprise. Column 1705 presents a list of all of the organizations in the enterprise related to the audit. In one embodiment, column 1705 is automatically populated by the audit system using the associations between financial items, business processes, organizations, risks, and controls, as well as the audit results created using audit projects, as discussed above. In the example screen display 1700, column 1705 presents a hierarchical list of organizations. This enables company officers or other users to view the audit information associated with the primary business organizations of their enterprise, or to view audit information of one or more sub-organizations under a primary business organization. Sub-organizations can be selectively hidden or shown to provide the company officer with the desired granularity of information.

For each organization, or sub-organization if shown, column 1710 lists the number of associated business processes pending certification. Column 1715 lists the number of business processes associated with an organization that are certified, but have issues. Similarly, for each organization, column 1720 lists the number of associated business processes with ineffective controls, column 1730 lists the number of associated unmitigated risks, and column 1735 lists the number of associated ineffective controls. For each item listed in columns 1710-1735, selecting the item will display detailed information on the specific processes, risks, or controls represented by that item.

Set of columns 1740 lists the auditors' evaluation of the associated financial item, as well as the name of the auditor and the date of the audit.

Using the screen displays such as 1500, 1600, and 1700, a company officer can review the results of an audit and quickly identify those business processes, organizations, risks, and controls that are potentially troublesome. The company officer can then focus their attention on resolving these matters. Once the company officer has reviewed the audit results to his or her satisfaction, he or she can certify the audit results. Certification officially records the company officer's approval of the audit results, which can be in the form of an audit report, an audited financial statement, or other type of document. Additionally, statutes and regulations, for example the Sarbanes-Oxley Act, require company officers to certify their audit results.

FIG. 18 illustrates an example screen display 1800 of an audit system that enables a company officer to certify audit results according to one embodiment. Section 1805 displays information on the financial statement to be certified by a company officer. Included in section 1805 is the name, date, and type of audit information, for example a financial statement, to be certified by the company officer.

Section 1810 displays the certification result. If the company officer approves of the audit results and decides to certify the audit results, section 1810 displays the company officer's certification. Section 1810 includes one or more input fields for recording the company officer's certification and his or her comments. In one embodiment, section 1810 includes an input field for capturing an electronic signature of the company officer. In another embodiment, the company officer's certification can be recorded and authenticated by other systems.

Once a company officer has certified the audit results, the audit results and the certification are stored for future reference. In the event that the business enterprise's financial results need to be restated, the stored audit results can be retrieved to show that all of the financial items, business processes, organizations, risks, and controls were carefully considered by the company officer before certification. Thus, the saved audit results provide the company officer with a well-documented decision trail demonstrating their good faith in certifying the audit results.

In a further embodiment, the audit system includes a system for creating, deploying, and analyzing surveys to perform risk assessment. As discussed in detail below, the audit system can generate survey questionnaires. Survey questionnaires can be generated automatically by the audit system or manually by auditors. Surveys can be associated with one or more contexts, which include an enterprise, an organization within the enterprise, a business process, a risk, a control, or any combination thereof. Using the process library and the associated sets of process risks and process controls, the audit system can automatically determine the set of individuals that should participate in the survey. Using the core applications discussed above, the audit system can then distribute survey questionnaires to the set of individuals and collect the survey results. Survey results can be aggregated to create risk assessments detailing the perceived risks to the survey context. Additionally, survey results and risk assessments can be saved for future reference or to document an enterprise's good-faith efforts to comply with its legal obligations.

Figure 19A:
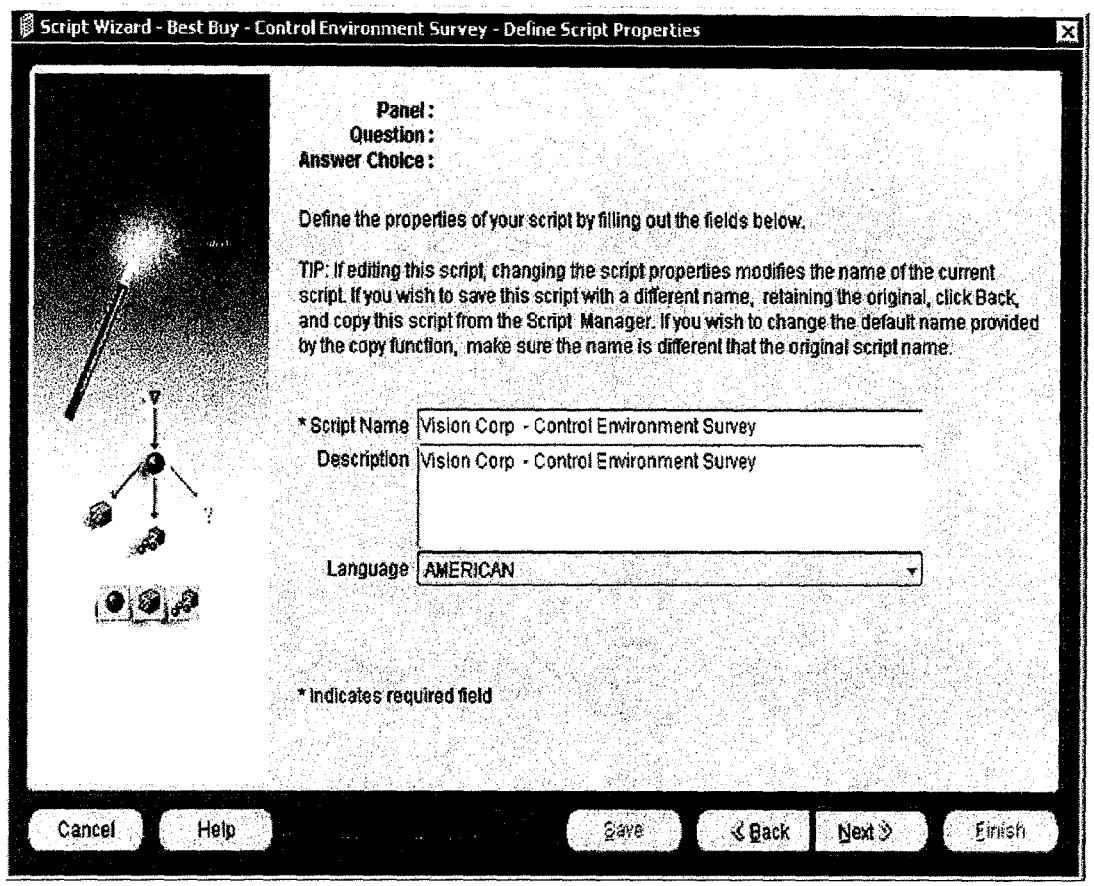

In one embodiment, auditors can manually design survey questionnaires. FIGS. 19A-H illustrate a set of example screen displays of an audit system that enables the creation of a survey according to this embodiment. FIG. 19A illustrates a screen display 1900 showing the initialization of a new survey questionnaire. A survey questionnaire, or script, is a sequence of survey questions to be presented to a survey recipient. In screen display 1900, an auditor can specify a name, a description, and a language for a new survey script. Further embodiments can include additional survey questionnaire attributes.

Figure 19B:
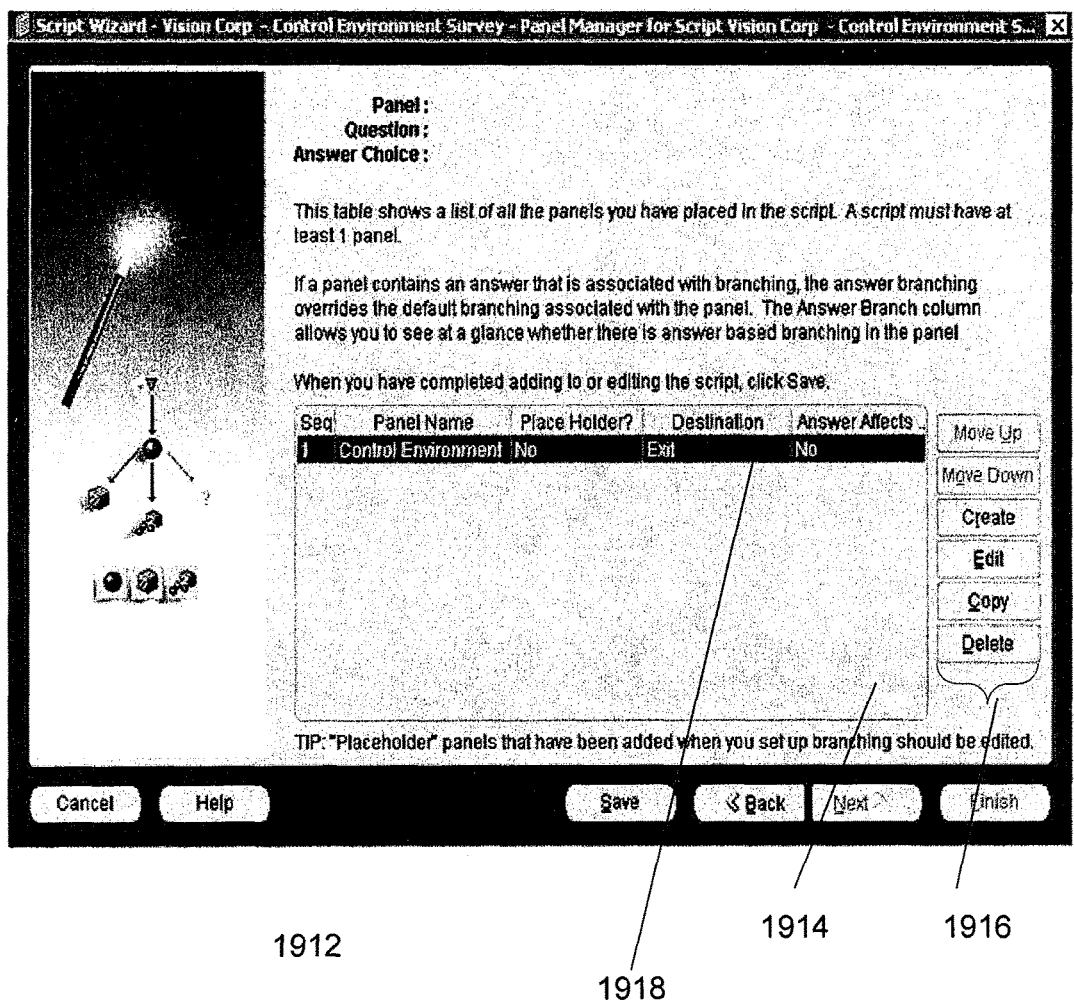

FIG. 19B illustrates a screen display 1912 showing the management of panels in the survey questionnaire according to one embodiment. In this embodiment, survey questionnaires can be divided into one or more panels. Each panel represents a separate set of questions. In a typical embodiment, panels of questions are presented one at a time to the survey recipient. After completing a panel, the survey questionnaire presents the next panel, if any, in the sequence.

Screen display 1912 includes a list 1914 of all of the panels in the survey questionnaire. Auditors can use the set of controls 1916 to create, edit, copy, move and delete panels in the list 1914. For each panel, a list entry 1918 displays the name of the panel and the destination panel, which is the next panel in the sequence of panels in the survey questionnaire. In an additional embodiment, list entry 1918 allows auditors to specify branching sequences of panels in response to the survey recipients' answers. By creating and editing list entries such as list entry 1918, auditors can create multiple panels and arrange these panels into one or more sequences.

Figure 19C:
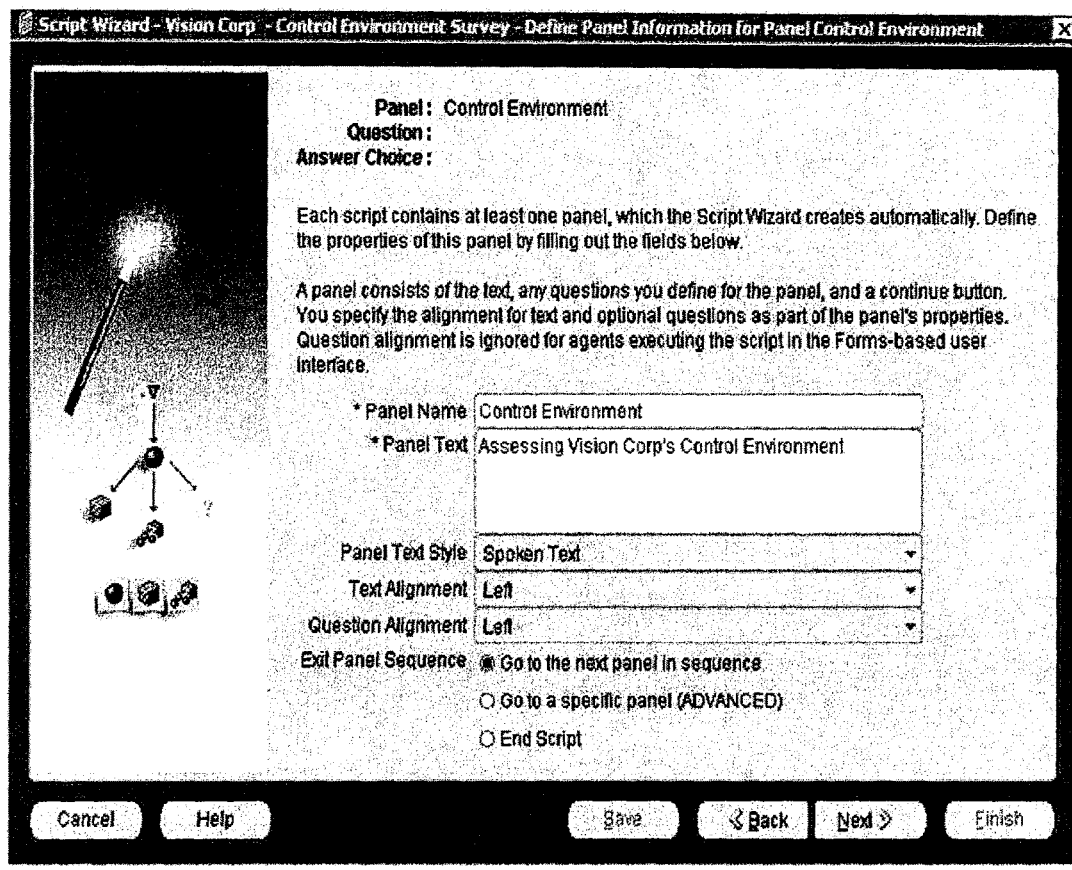

FIG. 19C illustrates a screen display 1925 showing the management of panel attributes in the survey questionnaire according to one embodiment. In screen display 1925, auditors can specify attributes of a panel, including the panel name, explanatory text on the panel, other text formatting attributes, and the next panel in the sequence, such as a specific panel, the next panel in the list 1914 discussed above, or the end of the survey questionnaire.

Figure 19D:
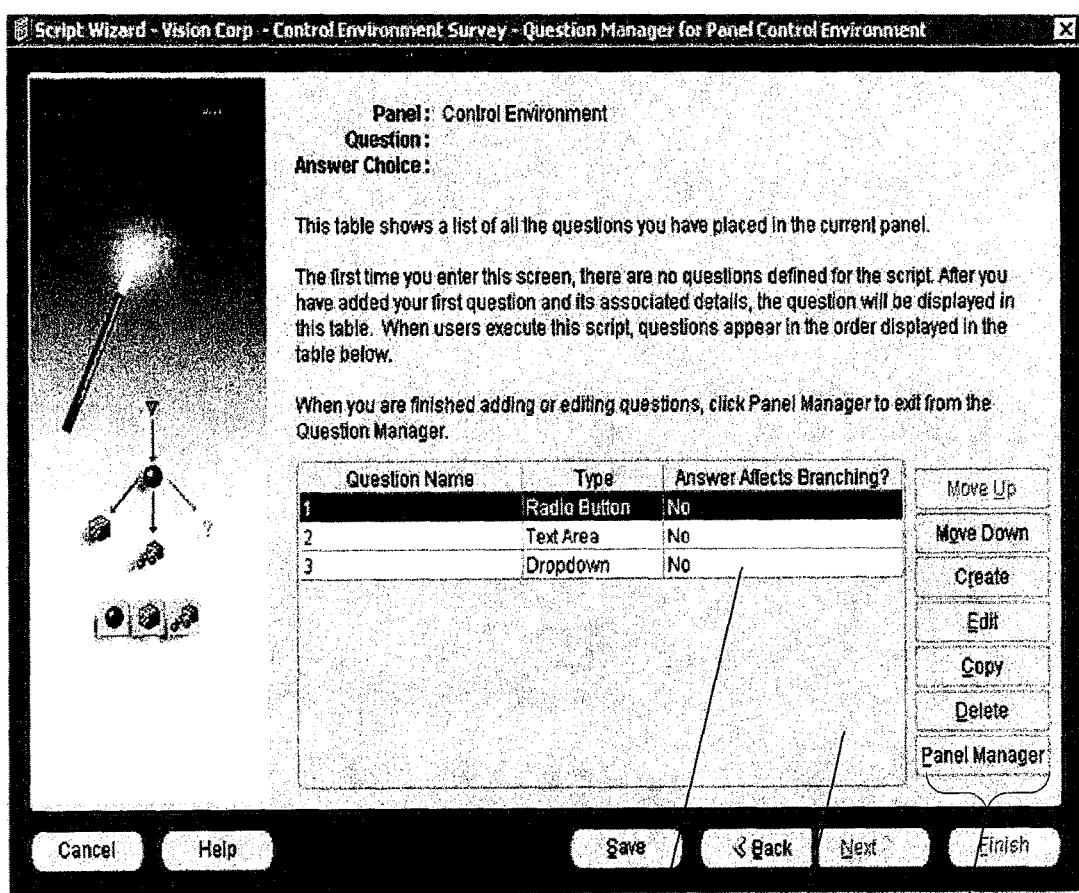

FIG. 19D illustrates a screen display 1937 showing the creation of a set of questions for a panel in the survey questionnaire according to one embodiment. Screen display 1937 includes a list 1939 of all of the questions on a given panel in the survey questionnaire. Auditors can use the set of controls 1941 to create, edit, copy, move and delete questions in the list 1939. For each question, a list entry 1943 displays the name of the question, the user interface element used to collect the its answer, for example, a radio button, a text area, or a dropdown menu, and whether a survey recipients answer affects the sequences of panels in the questionnaire, for example, by branching to a different panel.

Figure 19E:
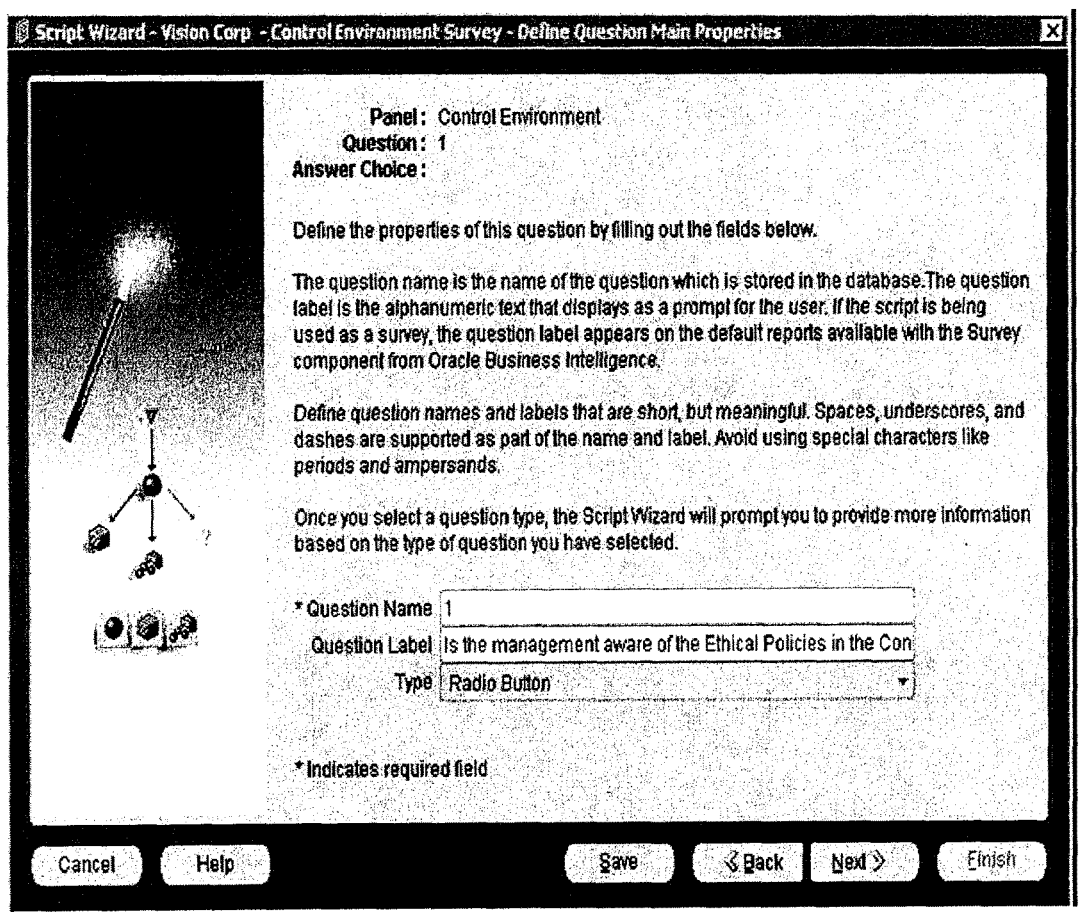

FIG. 19E illustrates a screen display 1950 showing the management of question attributes for a question on a panel in the survey questionnaire according to one embodiment. In screen display 1950, auditors can specify attributes of a question, including the question name, the question text and the user interface element used to collect its answer from a survey recipient.

Figure 19F:
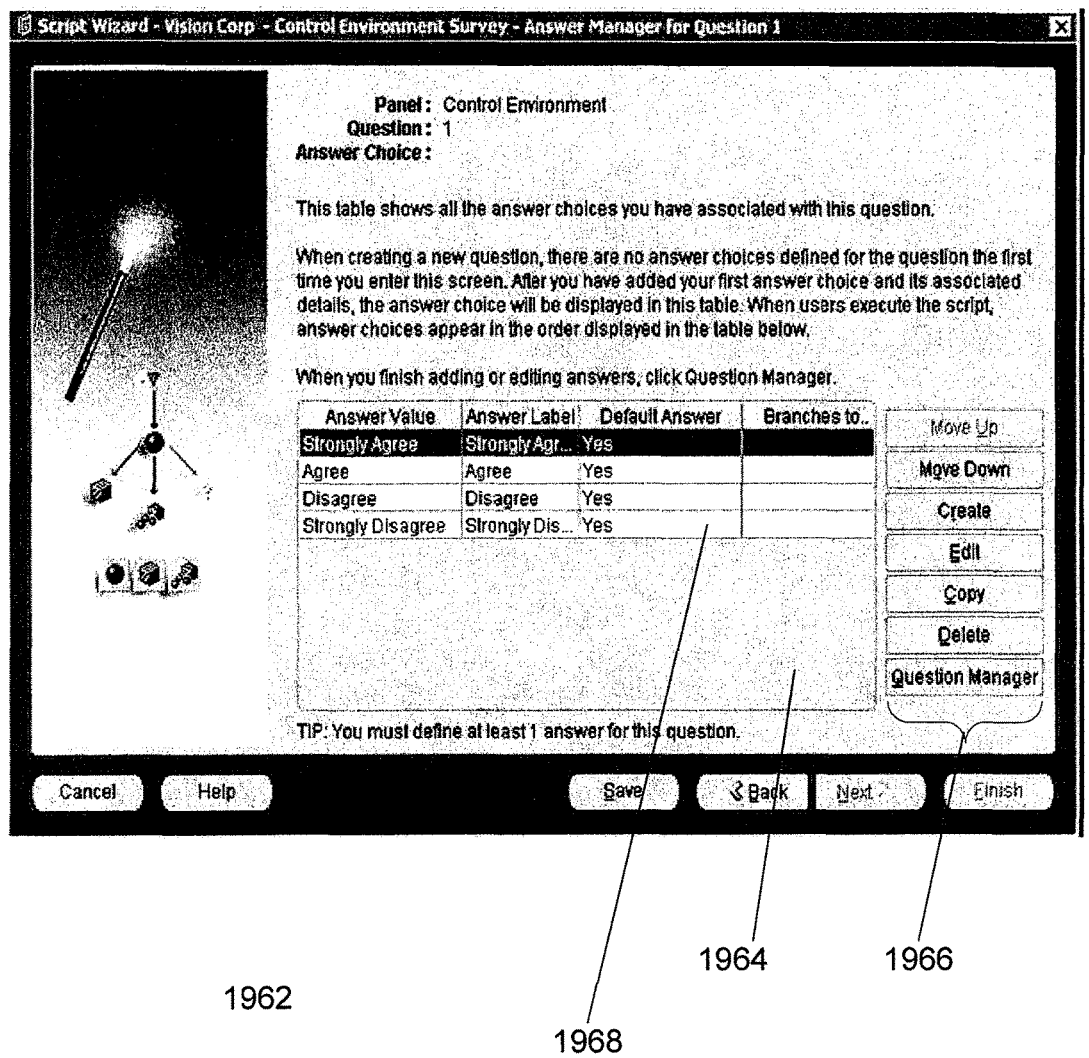

FIG. 19F illustrates a screen display 1962 showing the management of question answer attributes for a question on a panel in the survey questionnaire according to one embodiment. Auditors have the option of defining questions in a multiple-choice, true/false, or similar format. In screen display 1962, auditors can specify a set of potential answers for a question on a panel in the survey questionnaire. Screen display 1962 includes a list 1964 of all of the potential answers to a question. Auditors can use the set of controls 1966 to create, edit, copy, move and delete answers in the list 1964. For each answer, a list entry 1968 displays the label and value of a potential answer, for example "Agree" or "Disagree," a default answer value, and optionally the next panel of questions to be selected if the survey recipient selects a given answer.

Following the definition of all the panels and their associated questions and answers in a survey questionnaire, auditors can specify the deployment of the survey questionnaire to one or more survey recipients. FIG. 19G illustrates a screen display 1975 showing the management of the deployment of a survey questionnaire according to one embodiment. In screen display 1975, auditors can assign a survey questionnaire to a specific survey campaign in section 1977. A survey questionnaire can be used in multiple survey campaigns, enabling auditors to use a survey questionnaire to gather information from multiple sets of recipients and/or at multiple intervals. Auditors specify the deployment date and the period for survey responses in section 1979. Section 1981 allows auditors to view the status of survey responses for a survey campaign, for example, whether recipients have completed or abandoned responding to a survey questionnaire. Additionally, a survey campaign can be automatically repeated at specified intervals (for example, on a quarterly basis) to generate ongoing risk assessments.

In addition, auditors can specify the set of survey recipients to receive a survey questionnaire. In one embodiment, auditors can specify the survey recipients directly. In an additional embodiment, auditors associate a survey campaign with a context, such as an enterprise, an organization within the enterprise, a business process, a risk, a control, or any combination thereof. Using the process library and the associated sets of process risks and process controls, the audit system can automatically determine the set of individuals that should participate in the survey.

FIG. 19H illustrates a screen display 1988 showing the set of answers provided by an individual survey recipient. Auditors can view answers provided by each survey recipient to assess potential risks with the associated survey context. FIG. 20 illustrates an example screen display 2000 of an audit system presenting a survey according to one embodiment. Screen display 2000 illustrates a single panel in an example survey questionnaire, as presented to a survey recipient.

FIGS. 21A-B illustrate a set of example screen displays of an audit system presenting an assessment of an enterprise according to one embodiment. Screen display 2100 of FIG. 21A illustrates the initiation of a risk assessment associated with one or more survey campaigns. In this embodiment, an auditor can create a risk assessment. A menu 2105 enables auditors to configure aspects of the risk assessment, including one or more associated survey campaigns to be used to gather data for the assessment and one or more contexts for the risk assessment. As discussed above, a risk assessment context can include an enterprise, an organization in the enterprise, a business process, a risk, a control, or any combination thereof. In the components section 2110, an auditor can select components to be included in the risk assessment, such as control activities, control environment, information and communication, monitoring, risk assessment activities, or other components.

FIG. 21B illustrates a screen display 2150 presenting the results of an example risk assessment according to one embodiment. In one embodiment, the audit system distributes the survey campaigns associated with the risk assessment to the appropriate survey recipients. The audit system collects and records each recipient's survey results. Additionally, the audit system aggregates survey information to create a risk evaluation. In one embodiment, a component is given a positive risk assessment value if all of the survey results are positive for survey questions associated with the component. Additionally, a component is given a negative risk assessment value if any survey results are negative for survey questions associated with the component. Section 2160 displays the risk assessment value, representing an aggregate of the survey results, for each component included in the risk assessment. Section 2160 includes the name of each component evaluated, an effectiveness value (for example, "highly effective" or "ineffective"), and comments explaining the effectiveness value.

In an additional embodiment, the audit system can generate survey questionnaires automatically. In this embodiment, auditors specify one or more contexts to be included in a risk assessment. Auditors can also specify one or more components to be included in the risk assessment. A survey question library includes a set of questions and/or question templates. In one embodiment, the survey question library also associates each question with one or more contexts and/or components. Based upon the specified contexts and components, the audit system selects a portion of the set of questions to create a survey questionnaire matching the specifications of the risk assessment. Additionally, using the process library, the associated sets of process risks and process controls, and the list of employees associated with each process, the audit system can automatically determine the set of individuals that should participate in the survey.

Figure 22:
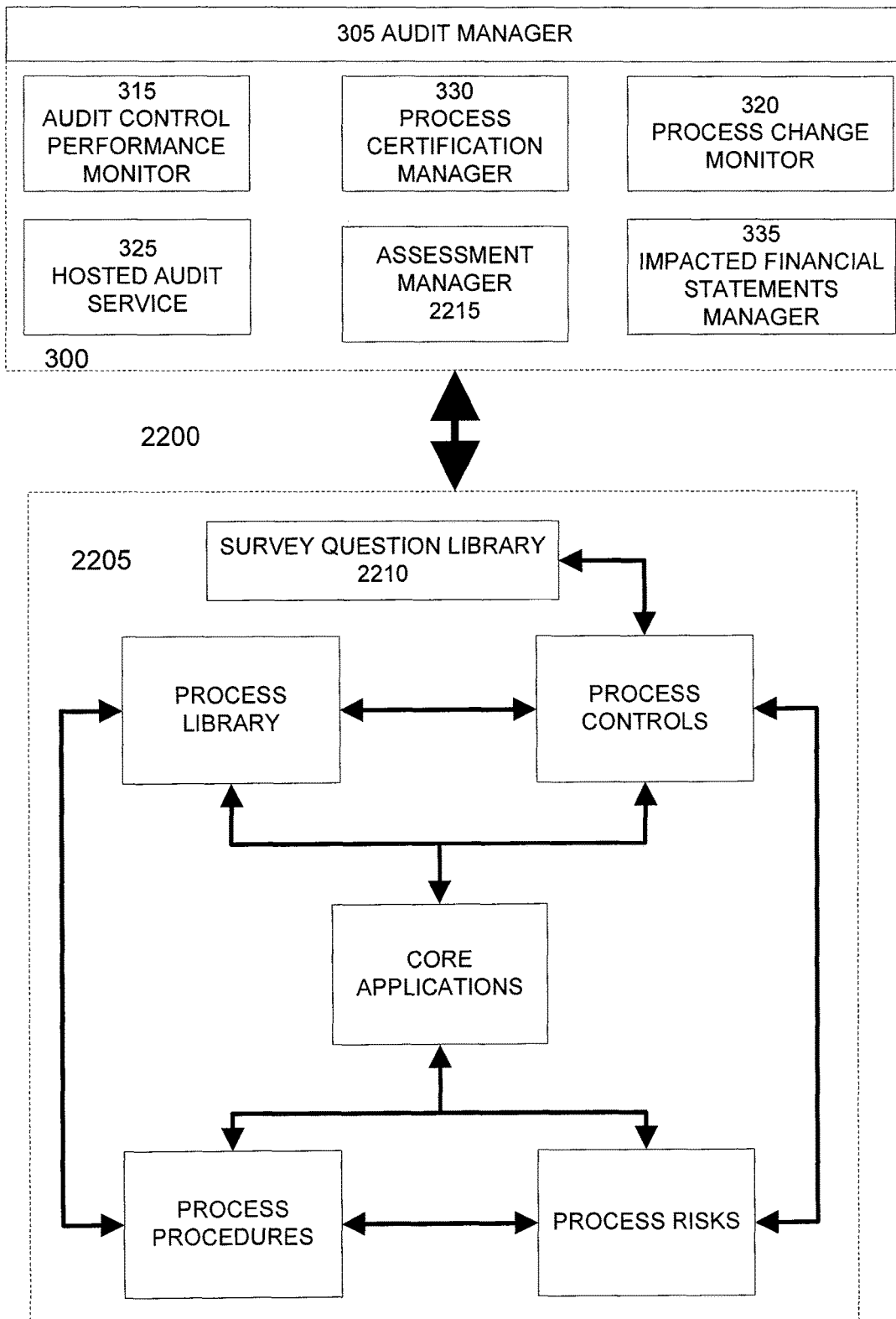
FIG. 22 illustrates is a block diagram illustrating one embodiment of the invention.

FIG. 22 illustrates is a block diagram 2200 illustrating one embodiment. Block diagram 2200 is similar to diagram 300 shown in FIG. 3 and discussed above. In block diagram 2200, the portion 2205 of the audit system includes a survey question library 2210. The survey question library 2210 is connected, either directly or indirectly, with the set of process controls, the process library, the set of process procedures, the set of process risks, and the core applications. Additionally, the audit manager 305 is associated with the assessment manager 2215, which enables the initiation, processing, and review of risk assessments, as described above.

In a further embodiment, survey results can be used to predict audit results for one or more controls, including whether it is likely that any controls will fail the audit. In this embodiment, pattern detection and data mining techniques can be applied to one or more sets of survey results to predict when a control is likely to be rated ineffective and therefore the associated risk to be unmitigated. For example, a survey question might ask users to rate the professional standards of an organization's procurement department on a scale of 1 to 5. If previous audit results have revealed a correlation between the previous survey results of this question (e.g. a rating of 3 or less) and a failing audit result, then the results of the current survey can be used to assess the likelihood of failure of the controls associated with this survey question. For example, survey results of 3 or less can trigger an immediate audit or greater scrutiny during upcoming audits. Additionally, if survey results are greater than 3, but have been slowly declining over time, the audit system can alert auditors to this downward trend towards a potential control failure, enabling corrective measures to be instituted prior to the failure of the control.

In one embodiment, the library of survey questions and associated controls include a set of default correlations between survey question results and the likelihood of control failure in subsequent audits. The set of default correlations reflect the analysis of survey question results and audit results from one or more enterprises over an extended period of time. The set of default correlations can be created using any well-known statistical analysis technique to find multi-variable correlations between survey question results and audit results.

In a further embodiment, the set of correlations between survey question results and audit results can be updated after each survey and audit in an enterprise. Thus, an enterprise can start with the set of default correlations when the audit system is initially installed and gradually update its set of correlations to reflect the analysis of its own past survey question results and audit results. In one embodiment, an exponentially-weighted moving average function is used to update the set of correlations between survey question results and audit results. An exponentially weighted moving average function assigns weights to the results of one or more survey questions over time. The weighted sum of the survey question results are used to determine a failure probability score, indicating the likelihood that the control will fail during the next audit period. More recent survey question results are weighted more heavily than older survey question results. After each audit, weights are increased for survey questions that correctly predict audit results and decreased for survey questions that do not correctly predict audit results.

In an alternate embodiment, survey questions and controls are arranged on orthogonal axes of a table. Each table entry is at the intersection of a survey question and a control and had a value indicating whether there is a correlation between the survey question and the control. Each table entry also has a weighting estimating the probability of a control failure from the associated survey question. These weightings can be adjusted after each audit to reflect the correlation between survey question results and audit results.

Additionally, the reliability of each control can be stored in the control library. One measure of the reliability of a control is one minus the failure probability of the control. The reliability of each control can be carried over when the control is added to a new enterprise, organization, or process. Thus, audits can gauge the effectiveness of adding new controls to a process by using the results of the same control in a different process.

FIGS. 23A-B illustrate an example correlation between survey question results and audit results according to one embodiment. FIG. 23A illustrates a table 2300 showing a pair of example survey questions 2305 and 2307 and the estimated reliability of an associated control for each of five possible survey question results. For example, the survey question 2305, "Does Payables always check for manual check requests if unmatched invoices are over 30 days old," may be associated with a control "Check manual check requests if unmatched invoices are over 30 days old." In this example, a survey question result of "Strongly Agree" corresponds to control reliability of 100%, a survey question result of "Agree" corresponds to control reliability of 90%, a survey question result of "Unsure" corresponds to control reliability of 80%, a survey question result of "Disagree" corresponds to control reliability of 70%, and a survey question result of "Strongly Disagree" corresponds to control reliability of 60%. Similar reliability estimates can be associated with survey question 2307.

Following the completion of these survey questions and an audit, the reliability estimates for each survey question can be revised. FIG. 23B illustrates a table 2350 showing a pair of example survey questions 2362 and 2370, the estimated reliability of an associated control for each of five possible survey question results, and the correlation between survey question results and audit results. In this example, survey question 2362 has a survey answer 2365 of "Strongly Agree" and an audit result 2364 of "fail," indicating that an audit determined that the control associated with the survey question 2362 was ineffective at mitigating one or more risks. Similarly, survey question 2370 has a survey answer 2380 of "Agree" and an audit result 2375 of "fail," indicating that an audit determined that the control associated with the survey question 2370 was also ineffective at mitigating one or more risks.

Because the reliability of these example controls estimated from survey question results clearly contradicts the actual audit results of these controls, the estimated reliability should be updated. In this example, the reliability of the survey answer "Strongly Agree" for question 2362 and of the survey answer "Agree" for question 2370 are updated. In one embodiment, the reliability is updating using the formula: P1=(1−Alpha)*P0+(Alpha*Observation). In this formula, observation equals 100% if the control is passes and equals 0% if the control is fails; Alpha is a weighting factor to give more or less weight to recent observations; P1 is the revised relationship between the survey answer and the control reliability; and P0 is the previous relationship between the answer and the control reliability. Applying this formula to the results in table 2350, and using a value of 20% for Alpha, the estimated reliability of the control associated with question 2362 when the survey question result is "Strongly Agree" is equal to P1=(1−0.2)*1.0+0.2*0.0=0.8. Similarly, the estimated reliability of the control associated with question 2370 when the survey question result is "Agree" is equal to P1=(1−0.2)*0.93+0.2*0.0=0.74. The reliability values 2367 and 2377 are updated accordingly.

Figure 24:
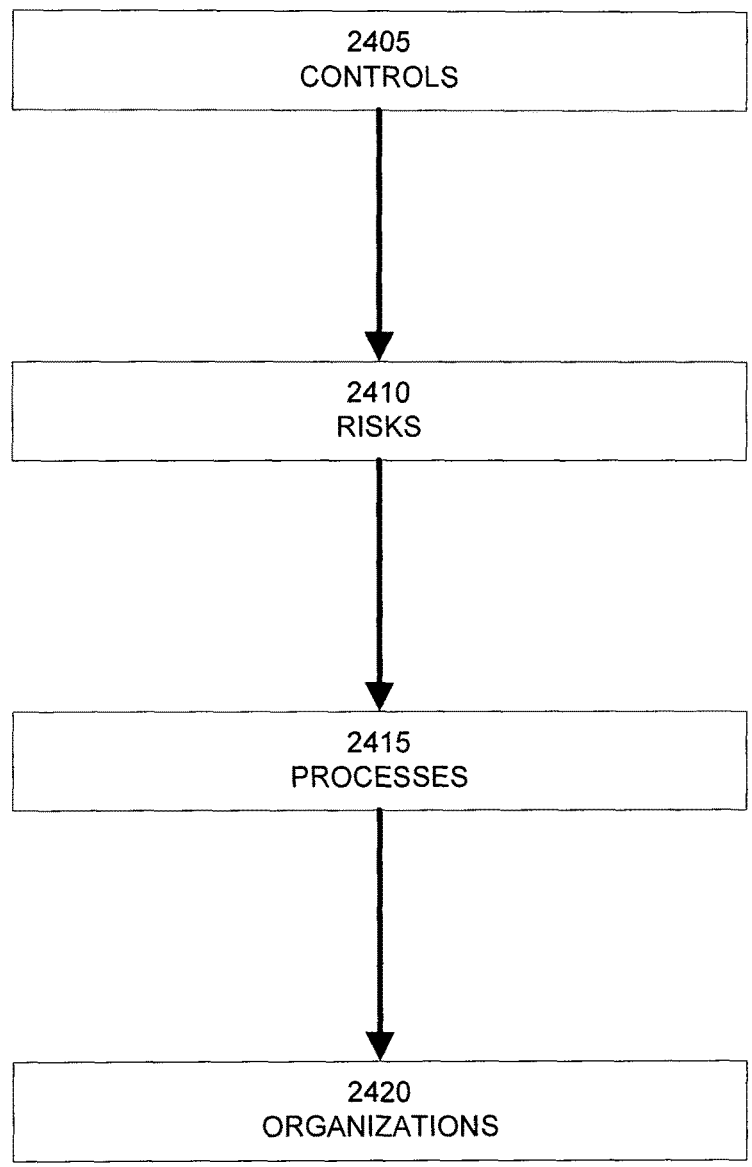
FIG. 24 illustrates a flowchart for audit operations according to one embodiment of the invention.

FIG. 24 illustrates a flowchart 2400 for audit operations according to one embodiment. Audit operations performed in accordance with flowchart 2400 provide a logical and structured system for evaluating an enterprise and providing audit opinions on its organizations, processes, risks, and risk controls. In this embodiment, auditors first evaluate the set of controls 2405 associated with an enterprise. Using the associations between the controls and risks defined by the audit system, as discussed above, auditors can identify and evaluate the set of risks 2410 associated with the set of controls 2405.

In an additional embodiment, each risk in the set of risks 2410 can be evaluated with reference to the audit results of its associated controls. For example, one risk to an enterprise may be the risk that materials purchased elsewhere at a discount price are fraudulently returned to the enterprise for refund at full price. To mitigate this example risk, a set of associated controls may include: matching serial numbers for materials previously sold by the enterprise to those of materials being returned; matching sales orders with return authorizations; and receiving and inspecting materials before approving refunds. If the evaluation of the set of controls 2405 determines that, for example, two of these three controls are not being implemented correctly and thus have a negative audit opinions, then the audit system can assign a negative audit opinion to this risk when evaluating the set of risk 2410.

In a further embodiment, the audit system streamlines the evaluation of risks by providing auditors with a suggested audit opinion for each risk in the set of risks 2410 using the audit results from the set of controls 2405. In one embodiment, each risk includes a criteria, rule, or heuristic used to determine a suggested audit opinion. For example, the risk of fraudulent returns discussed above may include a rule that requires the majority of its associated controls to have positive audit opinions. If this rule is violated, for example by two of three controls having negative audit opinions, then the audit system suggests a negative audit opinion for the risk as well. The audit system's suggested audit opinion can be accepted by an auditor or overridden. In either case, one embodiment of the audit system records the decision of auditors for future reference.

A variation of this rule can require that the percentage of positive audit opinions for associated controls exceed a predetermined threshold value. Alternatively, a rule could suggest a negative audit opinion if any of the associated controls have negative audit opinions. In another embodiment, each control can be associated with a coverage value representing the portion of the risk mitigated by the control. The audit system can then determine the total amount of risk mitigated for each risk from the sum of the risk mitigation values for all of the controls associated the risk and deemed effective in evaluating the set of controls 2405. The audit system can then evaluate the total risk mitigated for each risk and provide a suggested audit opinion. In general, the criteria, rules, or heuristics used by the audit system can include any arbitrary combination, comparison, and/or weighting of audit results to determine a suggested audit opinion for each risk.

The results of the audits of the set of controls 2405 and the set of risks 2410 can be used to evaluate the set of processes 2415 of the organization. In one embodiment, the set of processes 2415 are identified via the associations defined by the audit system between controls, risks, and processes. Additionally, each process in the set of processes 2415 can be evaluated with reference to the audit results of its associated risks and/or controls, in a similar manner to the evaluation of the set of controls 2410 discussed above. Continuing with the above example, if the risk of fraudulent returns is associated with the return of materials process, then a negative audit opinion for this risk can carry trigger a negative suggested audit opinion for this process. As each process can be associated with multiple risks, the suggested audit opinion for a given process may be affected by the audit opinions of each of its associated risks. Similar to the concept of risk mitigation for controls discussed above, in one embodiment, each risk associated with a process may include a risk severity value. Using these values, the audit system can determine a total risk impact value for each process. The total risk impact value can then be used to determine a suggested audit opinion for the process.

The results of the audits of the set of controls 2405, the set of risks 2410, and the set of processes 2415 can be used to evaluated the set of organizations 2420 of an enterprise. As with the set of risks 2410 and the set of processes 2415, the audit system can determine a suggested audit opinion for each organization from the audit results of its associated processes.

To evaluate the set of controls 2405, one embodiment of the audit system includes a set of audit procedures. Each audit procedure specifies one or more actions that should be performed to evaluate the effectiveness of one of the set of controls 2405. In one embodiment, the set of audit procedures is included in the set of process procedures 260 discussed above.

In a further embodiment, the audit manager 305 includes project templates for performing the set of audit procedures associated with the set of controls 2405 in a workflow-enabled project management application as discussed above.

In this embodiment, the work-flow enabled project management application defines the set of audit procedures as workflows in the workflow system. An audit project template can include standard audit procedures, document templates, and standard deliverables needed for an audit of an associated control. The audit manager 305 is interfaced with a workflow-enabled project management application to enable collaboration between auditors by providing planning functions, task assignment functions, progress tracking functions, communication functions, and document management functions. Task assignment functions enable the project management application to locate available people with the skill set to match assignments. Progress tracking functions enable the project management function to monitor progress against milestones.

In a further embodiment, the set of audit procedures is included as part of a hosted audit service, such as the hosted audit service 1205 discussed above. In this embodiment, auditors access the hosted audit service to select controls from a control library that are equivalent to the enterprise's business practices. Because the control library includes controls based on standard business and industry practices, it is very likely a portion of the controls in the control library will closely resemble the enterprise's actual business practices.

Based on the auditor's selection of controls, the hosted audit service creates an audit procedures manual from the set of audit procedures. As with the project templates discussed above, the audit procedures manual can include document templates and standard deliverables needed for an audit of an associated control. The enterprise's auditors can follow the audit procedures manual to audit the set of control 2405 of the enterprise. The audit results for the set of controls 2405 can then be used to evaluate the set of risks 2410, the set of processes 2415, and the set of organizations 2420.

An additional embodiment of the audit system includes an audit planning system enabling auditors to plan effective audits by identifying audit units in an enterprise having potentially large impacts and/or risks. Audit units can include anything subject to audit within an enterprise, such as organizational entities or units, including legal entities, divisions, departments, or other organizations and combinations thereof within an enterprise. The audit planning system enables auditors to select audit units to include in audits based on a variety of different criteria.

In one embodiment, the audit planning system uses an impacted financial statement to summarize the materiality of audit units' financial statement lines associated with a financial statement of an enterprise. An impacted financial statement is a financial report, such as a balance sheet, profit and loss statement, cash flow statement, management discussion and analysis, and statement of equity. As discussed above, the audit system can display an impacted financial statement that provides financial information regarding audit units. Within the audit system, users can select lines on the impacted financial statement to view the set of business processes, risks, and controls, and the financial data associated with each of these audit units.

Figure 33:
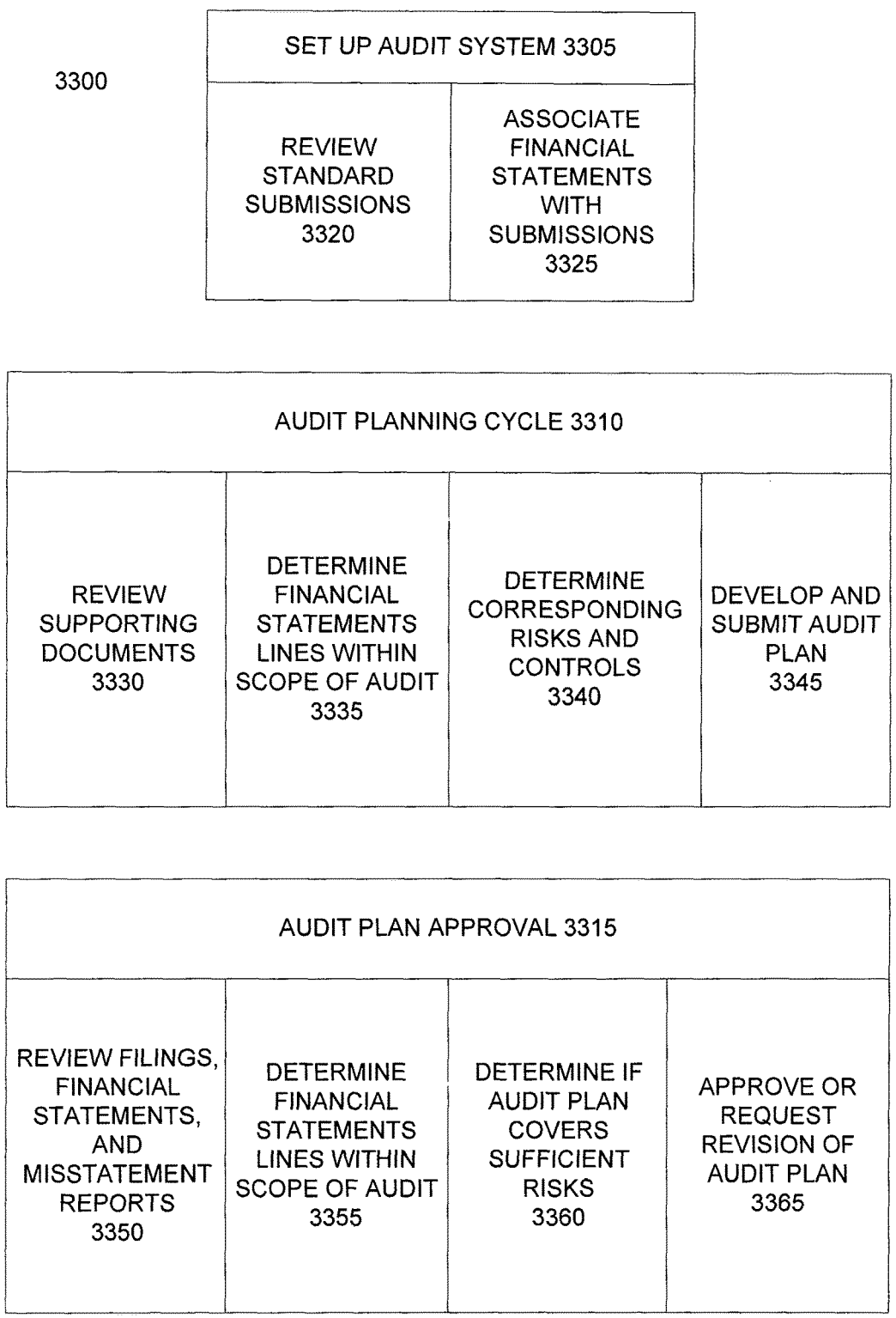
FIG. 33 illustrates the steps of audit planning system according to one embodiment of the invention.

FIG. 33 illustrates the steps of audit planning system 3300 according to one embodiment. The steps of the audit planning system 3300 includes a setup phase 3305, an audit planning cycle phase, 3310, and an audit plan approval phase 3315. In the first phase 3305, a user such as a chief accountant sets up the audit planning system to meet the needs of an enterprise. Phase 3305 includes a reviewing of audit submissions 3320 and associating the audit submissions with data from the financial statements of the enterprise 3325. In one embodiment, step 3325 associates audit submissions, which includes data resulting from audits, with one or more financial statement lines. The financial statement lines may be part of an impacted financial statement, as discussed above.

In the audit planning cycle phase 3310, a user such as a chief audit executive develops one or more audit plans based on the financial statement lines associated with audit submissions. In one embodiment, the audit planning cycle phase 3310 includes reviewing supporting documents 3330 such as regulatory filings, financial statements, and misstatement reports; determining at least a subset of the associated financial statement lines within the scope of a given audit 3335; determining the corresponding risks and controls associated with the subset of financial statement lines 3340; and developing an audit plan and submitting it for approval 3345. In one embodiment, these steps are facilitated by the association of financial statement lines, risks, and controls provided by the auditing system.

In the audit plan approval phase 3315, a user such as an audit committee member also reviews supporting documents 3350 such as regulatory filings and financial statements, and any financial misstatement reports; determines at least a subset of the associated financial statement lines within the scope of a given audit 3355; determines if the proposed audit plan adequately covers the risks of the enterprise 3360; and approves the proposed audit plan or requests revisions to the audit plan 3365. In one embodiment, these steps are facilitated by the association of financial statement lines, risks, and controls provided by the auditing system.

In further embodiments, the audit planning system facilitates the development and review of audit plans by visually presenting information on the materiality, risks, controls, and risk coverage associated with financial statement lines, audit units, legal entities, divisions, or other organizations and combinations thereof within an enterprise.

In one embodiment, the audit planning system further annotates the impacted financial statement with information regarding the materiality associated with audit units in an enterprise. In one embodiment, this information regarding the materiality is graphically displayed in conjunction with the impacted financial statement. For example, each audit unit associated with each line item in a financial statement is assigned a color based upon its materiality. In other embodiments, other types of graphical annotation can be used, such as text, images, or icons.

FIG. 25 illustrates an example screen display 2500 of an audit system presenting a summary of the materiality of audit units for a financial statement of an enterprise according to one embodiment. In this embodiment, each line item of the financial statement includes a column 2505 presenting the total value for line, and one or more additional columns presenting the value of one or more audit units contribution to that financial statement line. For example, columns 2510, 2515, and 2520 present the values of companies 1, 2, and 3, respectively, to the value in column 2505 for each line.

For each line of the impacted financial statement, columns 2510, 2515, and 2520 are assigned a color based upon its relative or absolute materiality. In the example of FIG. 25, colors are assigned based upon the relative materiality, or proportion of the total value, each audit unit contributes to a financial statement line. Each color can be associated with a threshold value. For example, audit units contributing 10% or less of the total for a line are assigned a green color, audit units contributing between 10% and 30% are assigned a yellow color, and audit units contributing greater than 30% are assigned a red color. For example, in line 2525, which in this example presents the tax liability of the enterprises, entry 2530 is assigned a red color, indicating that company 1 is responsible for more than 30% of the total tax liability. Similarly, entry 2535 is assigned a green color, and entry 2540 is assigned a yellow color based on the above example threshold values.

User interface input 2545 enables auditors to select criteria for materiality, such as absolute or relative revenue. Additionally, users can select any financial statement line or audit unit to view additional information, such as the risks, processes, controls, and organizations associated with the selection. Using this impacted financial statement, auditors or other users can readily identify the most critical audit units in an enterprise on any financial statement line or significant account and select all or a portion of these audit units for auditing. In a further embodiment, users can select an audit unit from the impacted financial statement to add its associated controls to an audit project.

Figure 26:
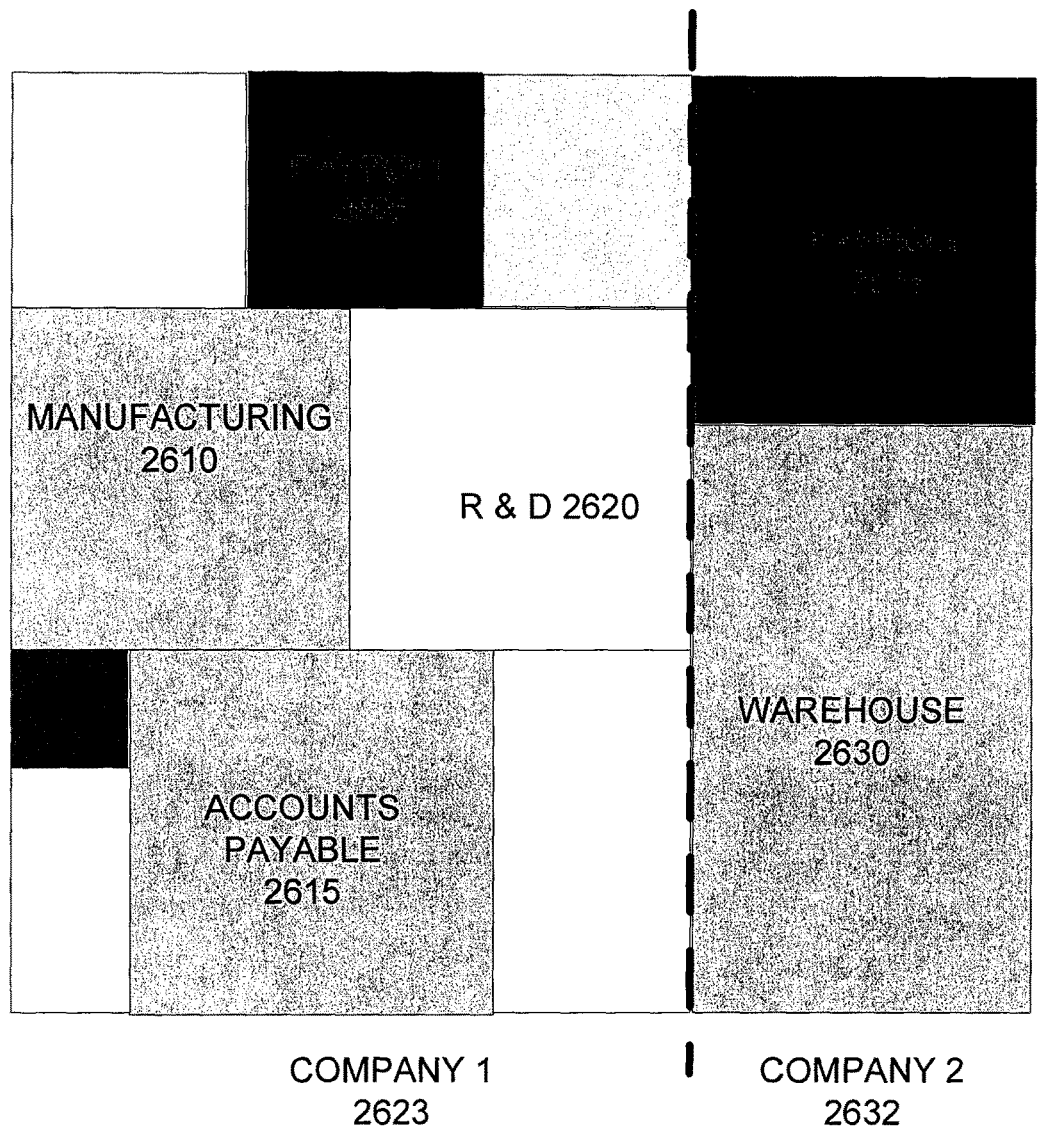
FIG. 26 illustrates an example tree map of an audit system summarizing the relative risk and impact of audit units in an enterprise according to one embodiment of the invention.

In another embodiment, the audit planning system includes the capability of presenting tree maps to show audit units and their associated risk exposures and impacts. FIG. 26 illustrates an example tree map 2600 of an audit system summarizing the relative risk exposure and impact of audit units in an enterprise according to one embodiment. A tree map represents a set of audit units as a set of polygons. For example, in tree map 2600, each rectangle represents a department within an organization. Furthermore, polygons representing related audit units can be positioned in close proximity. For example, polygons 2605, 2610, 2615, and 2620, representing the payroll, manufacturing, accounts payable, and research and development departments respectively, are all associated with Company 1 2623 and are therefore positioned together. Similarly, the payroll 2625 and warehouse 2630 departments of Company 2 2632 are positioned together.

In example tree map 2600, each polygon has a size proportional to its impact. The impact can be measured in absolute or relative terms with respect to an associated organization, such as company 1, 2623 or 2, 2632. Thus, in tree map 2600, it is apparent that payroll 2605 has a smaller impact than accounts payable 2615.

In tree map 2600, each polygon is further assigned a color or shade related to its exposure risk, or probability of failure, level. The exposure risk can be measured in absolute or relative terms with respect to an associated organization, such as company 1, 2623 or 2, 2632. In a further embodiment, colors can be assigned based upon threshold values, similar to that discussed above with respect to FIG. 25. The exposure risk can be expressed in a variety of different ways, such as a probability representing the likelihood of one or more controls associated with an audit unit failing.

In a further embodiment, the tree map is interactive, enabling users to select one or more audit units to view further information associated with the selected audit unit. In one embodiment, the information associated with the selected audit unit is also displayed as a tree map. For example, selecting a department audit unit from tree map 2600 will display a second tree map including a set of audit units, such as controls, processes, and risks, associated with the selected audit unit. In a further embodiment, users can select an audit unit from the tree map 2600 to add its associated controls to an audit project.

In another embodiment, the audit planning system includes the capability of identifying audit units based upon changes in exposure risk and impact. This enables auditors to spot changes in the audit units of an organization that may warrant inclusion in an audit. As discussed above, controls and their associated audit units can include a risk value. In one embodiment, risk values can be failure probability scores or auditor-provided failure probability estimates. For audit units associated with multiple controls, the failure probability score or failure probability estimate can be a combination of the failure probability scores or failure probability estimates of its controls. Additionally, audit units are associated with an impact value. The impact value of a control is an estimate of the consequences of the control failing. In one embodiment, this can be determined by evaluating the revenue of business processes associated with a control. For business processes having multiple controls, impact can be apportioned between all of the associated controls, for example using a coverage value discussed in detail below.

Figure 27:
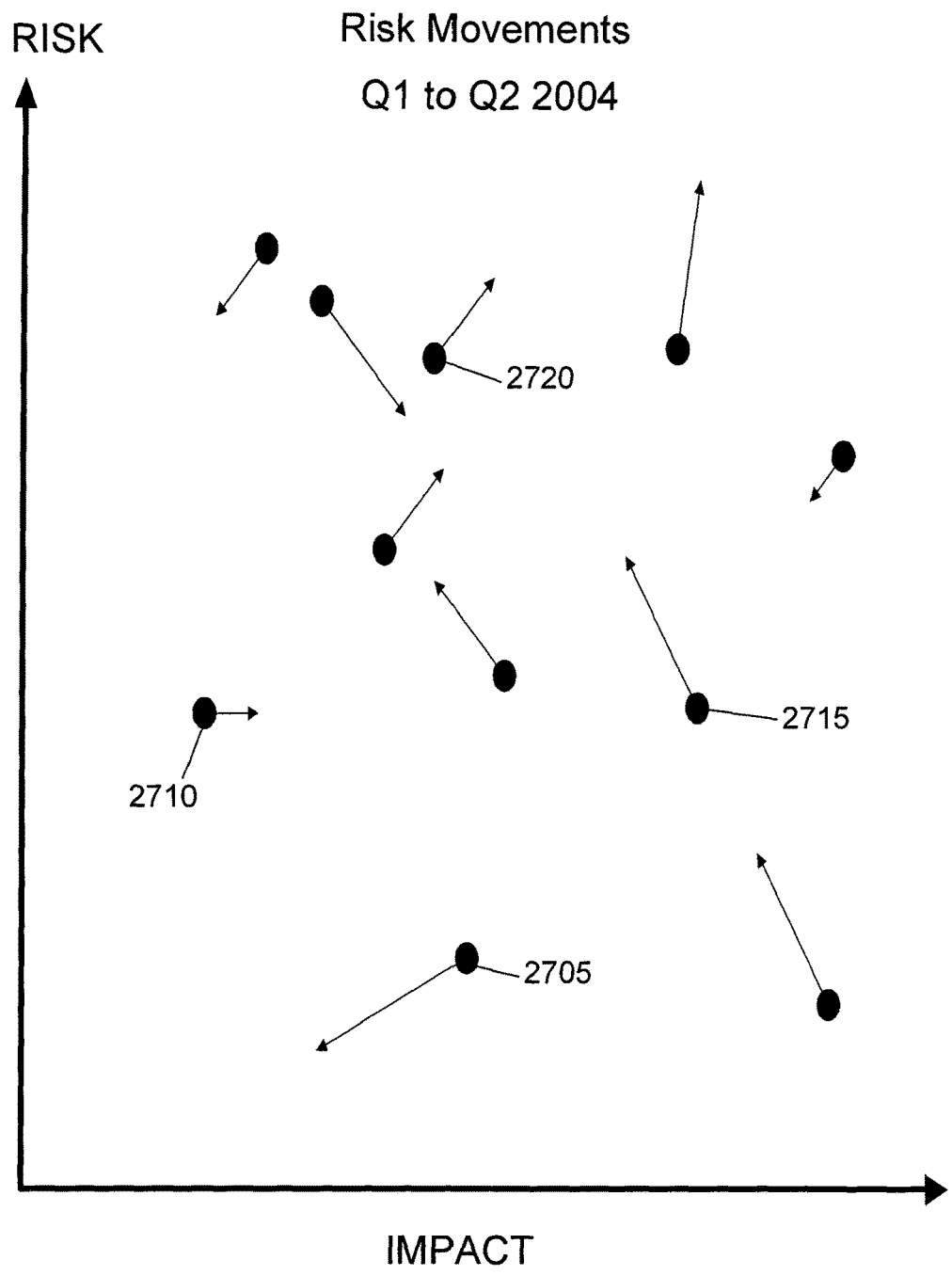
FIG. 27 illustrates an example graph of an audit system displaying changes in risk and impact for audit units in an enterprise according to one embodiment of the invention.

The audit system tracks changes in the risk and impact values associated with audit units over time. one embodiment of the audit planning system includes the capability of graphically displaying changes in the risks and impacts of audit units. FIG. 27 illustrates an example graph 2700 of an audit system displaying changes in risk and impact for audit units in an enterprise according to one embodiment. Graph 2700 displays the risk and impact values of a number of different audit units, including audit units 2705, 2710, 2715, and 2720. In the example graph 2700, absolute or relative risk values are plotted along the vertical axis, while absolute or relative impact values are plotted along the horizontal axis.

The audit units in graph 2700 can be organizations, risks, processes, or controls in an enterprise. Each audit unit includes a vector indicating a change in its risk and/or impact value over time. For example, the vector associated with audit unit 2705 indicates that both its risk and impact values have declined over time. Similarly, the risk and impact of audit unit 2720 has increased over time. For audit unit 2710, the risk has remained constant, but the impact has increased. For audit unit, 2715, the impact has decreased, but the risk has increased.

In one embodiment, users can specify the time period used in evaluating changes in risks and impacts of audit units, so that short-term or long-term trends can be evaluated. In a further embodiment, users can specify criteria for filtering audit units, so that only audit units matching the specified criteria are displayed. In an additional embodiment, the graph is interactive, enabling users to select one or more audit units to view further information associated with the selected audit unit. In one embodiment, the information associated with the selected audit unit is also displayed as a graph. For example, selecting a department audit unit from graph 2700 will display a second similar graph map including a set of audit units, such as controls, processes, and risks, associated with the selected audit unit. In a further embodiment, users can select an audit unit using the graph to add its associated controls to an audit project.

In another embodiment, the audit planning system includes the capability of identifying and displaying the exposure of audit units and the cumulative exposure of an enterprise. Users can use this exposure information to select audit units presenting the greatest exposure to the enterprise for auditing. Users can also use this exposure information to select a set of audit units for auditing that presents the most cumulative exposure to the enterprise.

Exposure is a combination of the risk and impact of an audit unit. In one embodiment, the exposure is product of the impact value and likelihood of control failure. FIG. 28 illustrates an example table 2850 and graph 2800 of an audit system displaying separate and cumulative exposure associated with audit units in an enterprise according to one embodiment. Table 2850 displays a set of risks, including fraud, 2855, theft, 2860, miscount, 2865, and assets overvalued, 2870. Each risk includes a failure probability value, an impact value, and an exposure value. For example, the failure probability, impact, and exposure values of the fraud risk 2855 are 5, 5, and 25. Similarly, the failure probability, impact, and exposure values of the miscount risk 2865 are 2, 4, and 8.

In one embodiment, the table 2850 ranks the set of risks according to their exposure values. For example, risk 2855 is ranked higher than risks 2860, 2865, and 2870. Table 2850 also includes a cumulative exposure column, presenting for each risk the cumulative sum of its exposure and the exposures of any higher ranked risks. Graph 2800 displays the set of risks in ranked order along its horizontal axis, and the cumulative exposure value along its vertical axis.

In an additional embodiment, the graph and table display similar information for other types of audit units, such as organizations, processes, and controls. In another embodiment, the graph and table are interactive, enabling users to select one or more audit units to view further information associated with the selected audit unit. In one embodiment, the information associated with the selected audit unit is also displayed as a similar table and/or graph. In a further embodiment, users can select an audit unit using the graph or table to add its associated controls to an audit project. For example, users can select a single audit unit or a range of the ranked set of audit units. In a further embodiment, users can specify a target cumulative exposure value, either as an absolute exposure value or a percentage of the total exposure, and the audit planning system will select a set of highest-ranking audit units having a cumulative exposure value reaching or approximating the target cumulative exposure.

In another embodiment, the audit planning system enables users to identify, display, and select for auditing audit units according to their coverage. Coverage is the portion of the total exposure of an audit unit covered by a control. In one embodiment, coverage values are estimated by auditors and included in the library of controls. If an audit unit is associated with multiple controls, the coverage values of its controls may be mutually exclusive or overlapping. In the case of the latter, the total coverage provided by a set of controls associated with an audit unit will be less than the sum of coverage values associated with the controls.

FIG. 30 illustrates an example table 3000 of an audit planning system displaying separate and cumulative coverage and residual risk associated with audit units in an enterprise according to one embodiment. Table 3000 includes a set of audit procedures, such as warehouse audit procedure 3005 and transport audit procedure 3025. Each of the audit procedures includes one or more controls. For example, audit procedure 3005 includes controls "serial numbering," 3010; "cycle count," 3015; "locked cage," 3020; and "approval of cycle count," 3030. Each control is associated with at least one risk, such as risks "fraudulent returns," 3035; "theft from warehouse," 3040 and 3045; and "miscount," 3050 associated with controls 3010, 3015, 3020, and 3030, respectively. In this example, the risk "theft from warehouse" is listed twice, as risks 3040 and 3045, because it is associated with two controls. As discussed above, audit units such as risks and controls can be associated with impact, risk probability, and exposure values. Columns 3055, 3060, and 3065 display the impact, risk probability, and exposure values for the set of controls in table 3000.

In addition, each control is associated with a coverage value. A coverage value is the amount of a risk's total exposure that is mitigated by an associated control. In one embodiment, coverage values are estimated by auditors and included in the control library. In a further embodiment, the control library includes coverage values expressed as a percentage or proportion of a total, so that as the impact of a risk varies, its coverage value can updated accordingly.

Column 3070 displays the coverage value associated with each control. For example, control 3010 has an exposure value of 25. The coverage value of control 3010 is 15, indicating that 15 of the 25 "points" of exposure of the risk 3035 are mitigated by this control. Similarly, risks 3040 and 3045, "theft from warehouse," have an exposure value of 20. The associated controls 3015 and 3020 have coverage values of 10 and 7, respectively, indicating that control 3015 covers half of exposure from the "theft from warehouse risk" and that control 3020 covers 35% (7 points out of 20 total) of the exposure from this same risk. As discussed above, often coverage values for controls are not mutually exclusive, so that a combination of controls 3015 and 3020 does not provide a total coverage of 17 out of 20, but rather some value less that. Column 3075 displays the residual risk associated with each control. The residual risk is the amount of exposure of an audit unit remaining after the coverage from an associated control is subtracted.

To assist users in selecting audit units to audit, one embodiment of the audit planning system ranks the set of risks according to their exposure values. Additionally, risks associated with multiple controls are sorted according to the controls providing the maximum coverage. Thus, for example, risk 3035, with an exposure of 25, is ranked higher than risk 3040, which has an exposure of 20. Within the "theft from warehouse" risk category, risk 3040 is ranked higher than risk 3045 because the former's control 3015 provides a higher level of coverage than control 3020. Using this ranked set of risks and controls, the audit planning system can determine cumulative values for coverage and residual risk.

Figure 29:
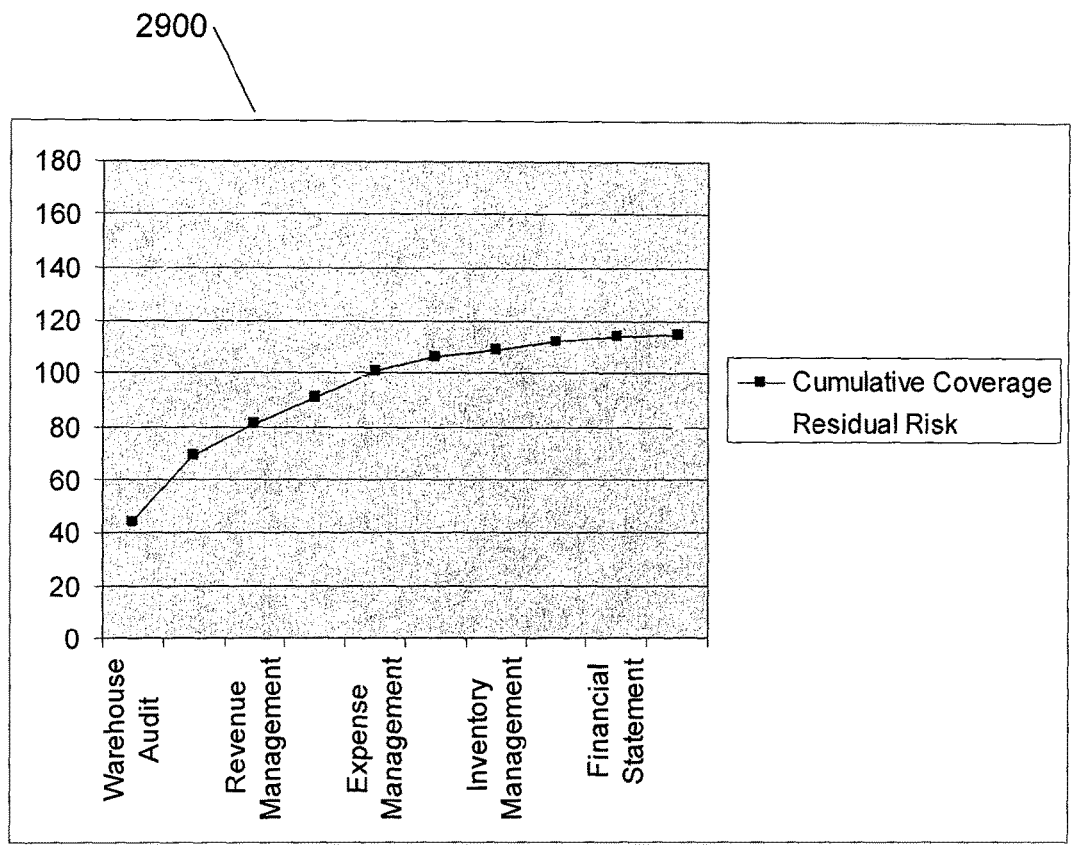
FIG. 29 illustrates an example graph of an audit system displaying cumulative coverage and residual risk associated with audit units in an enterprise according to one embodiment of the invention.

FIG. 29 illustrates an example graph 2900 of an audit system displaying cumulative coverage and residual risk associated with audit units in an enterprise according to one embodiment. Graph 2900 displays the ranked set of risks and control along the horizontal axis and the values of cumulative exposure and cumulative residual risk along the vertical axis. Each cumulative value reflects the sum of the value of a selected control and the values any higher ranked controls. Using the graph 2900, users can see the set of controls providing the maximum coverage.

In an additional embodiment, the graph and table display similar information for other types of audit units, such as organizations, as well as for business processes, and controls. In another embodiment, the graph and table are interactive, enabling users to select one or more audit units to view further information associated with the selected audit unit. In one embodiment, the information associated with the selected audit unit is also displayed as a similar table and/or graph. In a further embodiment, users can select an audit unit using the graph or table to add its associated controls to an audit project. For example, users can select a single audit unit or a range of the ranked set of audit units. In a further embodiment, users can specify a target cumulative coverage or residual risk value, either as an absolute value or as a percentage of the total exposure or total risk, and the audit planning system will select a set of highest-ranking audit units having a cumulative coverage value or residual risk reaching or approximating the target.

In addition to enabling users to plan audits based upon exposure, coverage, or residual risk, one embodiment of the audit planning system enables users to identify, display, and select for auditing audit units based upon resource constraints, such as the available time or money available for auditing. Table 1, below, illustrates an example set of audit procedures for an enterprise. In table 1, each audit procedure is associated with a time cost, which is the number of hours required to complete the procedure. Additionally each audit procedure is associated with a coverage value. In one embodiment, the coverage value of an audit procedure is determined by summing the coverage values of each control associated with the audit procedure. For example, table 3000 in FIG. 30 includes a warehouse audit procedure 3005, which is associated with controls 3010, 3015, 3020, 3030, and 3080. The sum of the coverage values for these controls is 44. Thus, in table 1, the cumulative coverage of the warehouse audit procedure is 44.

TABLE 1

| Audit Procedure | Hours to Execute | Coverage | Cumulative Coverage | Residual Risk | Coverage per Hour | Cumulative Hours |
| --- | --- | --- | --- | --- | --- | --- |
| Warehouse Audit | 5 | 44 | 44 | 153 | 8.8 | 5 |
| Payable Audit | 6 | 25 | 69 | 128 | 4.17 | 11 |
| Revenue Management Audit | 3 | 12 | 81 | 116 | 4 | 14 |
| Cash Processing Audit | 4 | 10 | 91 | 106 | 2.5 | 18 |
| Expense Management Audit | 6 | 10 | 101 | 96 | 1.67 | 24 |
| Asset Management Audit | 5 | 5 | 106 | 91 | 1 | 29 |
| Inventory Management Audit | 3 | 3 | 109 | 88 | 1 | 32 |
| Transport Audit | 6 | 3 | 112 | 85 | 0.5 | 38 |
| Financial Statement Preparation Audit | 5 | 2 | 114 | 83 | 0.4 | 43 |
| Tax Audit | 4 | 1 | 115 | 82 | 0.25 | 47 |

To maximize the cumulative coverage of an audit given a time constraint, it is often necessary to select audit procedures providing the most coverage in the least amount of time. For each audit procedure, the coverage can be divided by the time cost to determine a value for coverage per audit hour. The audit procedures can then be ranked according to the values of their coverage per audit hour. For example, in table 1, the warehouse audit procedure has a coverage per audit hour value of 8.8 and is ranked higher than the payable audit procedure, which as a coverage per hour value of 4.17. Using this ranked set of audit procedures, the audit planning system can determine cumulative values for coverage, residual risk, and total audit hours, as shown in table 1.

Figure 31:
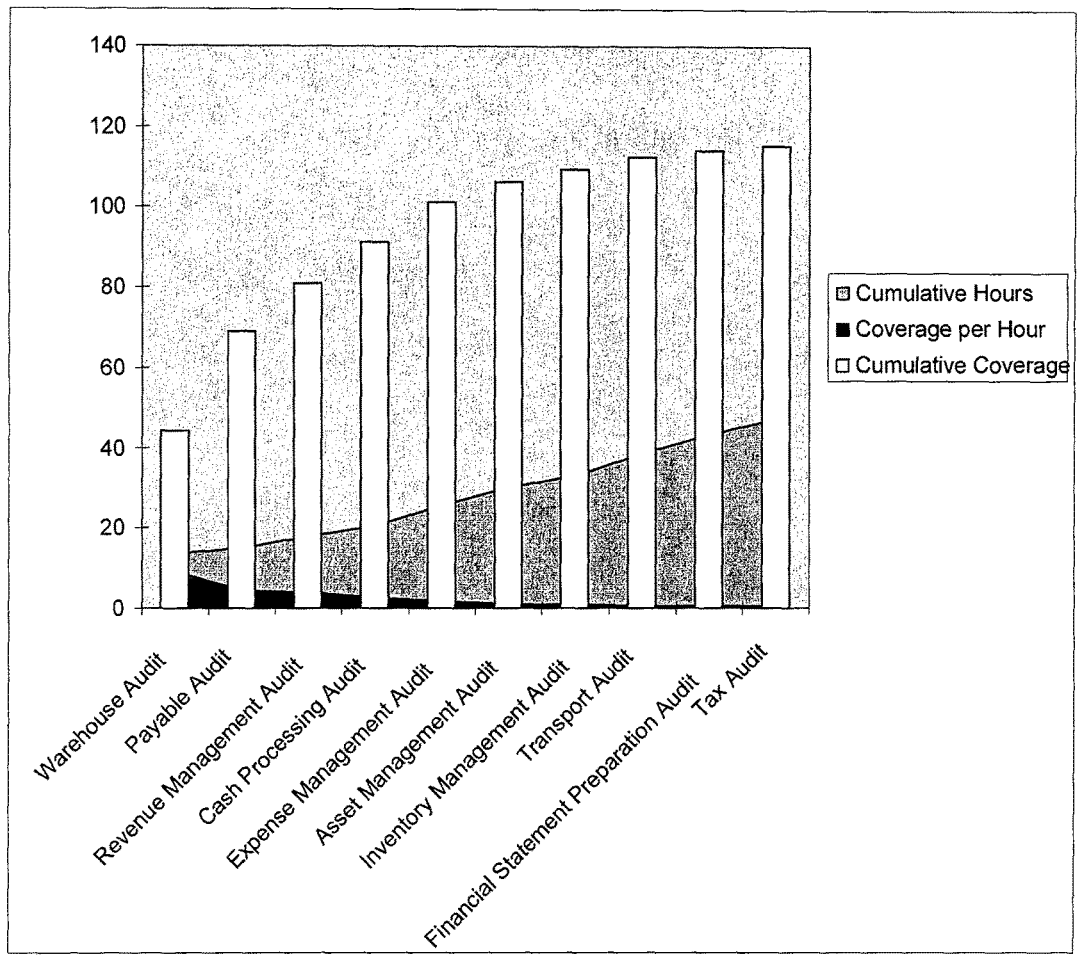
FIG. 31 illustrates an example graph of an audit system displaying separate and cumulative resource requirements associated with auditing audit units in an enterprise according to one embodiment of the invention.

FIG. 31 illustrates an example graph 3100 of an audit system displaying cumulative hours, the coverage per hour of each audit procedure, and the cumulative coverage of the audit procedures according to one embodiment. Graph 3100 displays the ranked set of audit procedures along the horizontal axis and the values of cumulative coverage, cumulative hours, and coverage per hour along the vertical axis. Each cumulative value reflects the sum of the value of a selected audit procedure and the values any higher ranked audit procedures. Using the graph 3100, users can see the set of audit procedures providing the maximum coverage.

Figure 32:
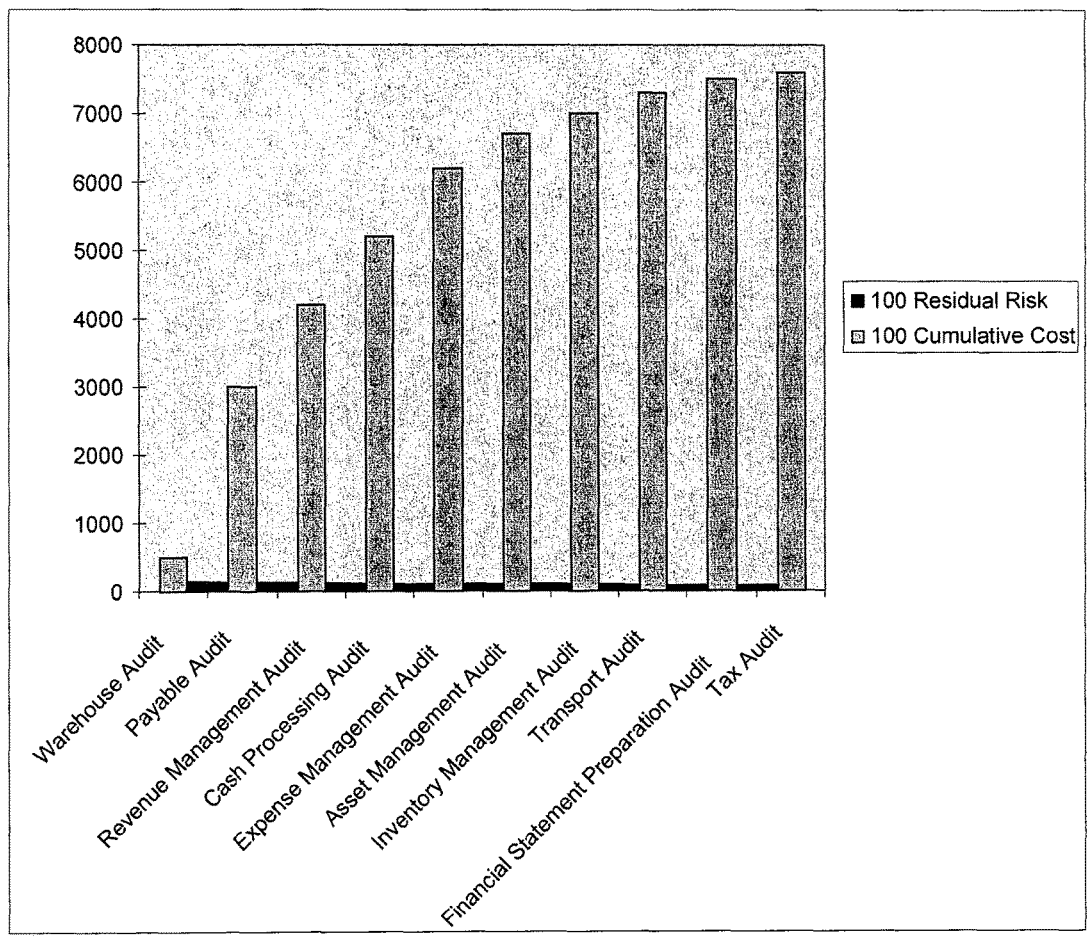
FIG. 32 illustrates an example graph of an audit system displaying separate and cumulative costs associated with auditing audit units in an enterprise according to one embodiment of the invention.

FIG. 32 illustrates an example graph 3200 of an audit system displaying cumulative hours, the coverage per hour of each audit procedure, and the cumulative coverage of the audit procedures according to one embodiment. Graph 3200 displays the ranked set of audit procedures along the horizontal axis and the values of cumulative cost and cumulative residual risk along the vertical axis. Each cumulative value reflects the sum of the value of a selected audit procedure and the values any higher ranked audit procedures. Using the graph 3200, users can see the set of audit procedures providing the maximum coverage for a given amount of resources.

In an additional embodiment, the graphs of FIGS. 31 and 32 and their associated tables display similar information for other types of audit units, such as organizational units, as well as business processes and controls. In another embodiment, the graphs and tables are interactive, enabling users to select one or more audit units, business processes, controls, or other aspects to view further information. In one embodiment, the information associated with the selected audit unit is also displayed as a similar table and/or graph. In a further embodiment, users can select an audit unit using the graph or table to add its associated controls to an audit project. For example, users can select a single audit unit or a range of the ranked set of audit units. In a further embodiment, users can specify a target cumulative coverage or residual risk value, either as an absolute value or as a percentage of the total

TABLE 2

| Audit Procedure | Hours to Execute | Cover. | Cumulative Coverage | Res. Risk | Cover per $ | Cumulative Cost |
|---|---|---|---|---|---|---|
| Warehouse Audit | 5 | 44 | 44 | 153 | $0.0880 | 500 |
| Payable Audit | 6 | 25 | 69 | 128 | $0.0417 | 1100 |
| Revenue Management Audit | 3 | 12 | 81 | 116 | $0.0400 | 1400 |
| Cash Processing Audit | 4 | 10 | 91 | 106 | $0.0250 | 1800 |
| Expense Management Audit | 6 | 10 | 101 | 96 | $0.0167 | 2400 |
| Asset Management Audit | 5 | 5 | 106 | 91 | $0.0100 | 2900 |
| Inventory Management Audit | 3 | 3 | 109 | 88 | $0.0100 | 3200 |
| Transport Audit | 6 | 3 | 112 | 85 | $0.0050 | 3800 |
| Financial Statement Preparation Audit | 5 | 2 | 114 | 83 | $0.0040 | 4300 |
| Tax Audit | 4 | 1 | 115 | 82 | $0.0025 | 4700 |

Similarly, audit procedures can be evaluated in terms of monetary cost, instead of time cost. In one embodiment, each audit procedure is associated with a cost. A cost can be directly assigned to an audit procedure, or determined from a time requirement of the audit procedure multiplied by one or more hourly costs. Table 2 lists an example set of audit procedures, their time cost, their coverage, and their coverage per dollar. In this example, it is assumed that each audit procedure costs $100 per hour to perform. However, in more complicated embodiments, each audit procedure can have different hourly rates, based for example on the hourly rates of different types of personnel, different associated expenses, and other resources required for the audit procedure. The audit planning system can rank the set of audit procedures according to the values of their coverage per audit hour.

exposure or total risk, and the audit planning system will select a set of highest-ranking audit units having a cumulative coverage value or residual risk reaching or approximating the target. In yet a further embodiment, users can specify a target resource usage value, in terms of audit hours, money, or any other resource, and the audit planning system will select a set of highest-ranking audit procedures having a cumulative cost meeting or approximating the target resource usage value. This enables users to plan audits that provide the most coverage for a given amount of available resources.

In a further embodiment, the audit planning system can use the control failure prediction capabilities discussed above to select controls most likely to fail for inclusion in an audit. For example, the risk exposures associated with risks can be weighted by a control reliability value determined from the control failure prediction capabilities discussed above. For example, if a risk has an exposure of 12, and its control is only 50% reliable, then a weighted exposure of the risk could be 24, which reflects the likelihood of the control failing. Similarly, if the control were only 25% reliable, then the weighted exposure of the risk would be 48. one embodiment of the audit planning system can rank controls according to their reliability weighted exposure values and select the highest ranked controls for inclusion in an audit. Table 3 is a set of example risks and associated controls ranked according to reliability weighted exposure values.

TABLE 3

| Audit Proc. | Contr. | Risk | Rel | Lik | Exp | Cov | Res Rsk | Rel. Wtd Exp | Cum. Rel. Wtd. Exp. |
|---|---|---|---|---|---|---|---|---|---|
| Payable Audit | Match Type Control | Pay Invoice Without Receipt | 9% | 2 | 8 | 6 | 2 | 22 | 22 |
| Warehouse Audit | Serial Numbering | Fraudulent Returns | 50% | 5 | 25 | 15 | 10 | 20 | 42 |
| Warehouse Audit | Locked Cage | Theft From Warehouse | 70% | 5 | 20 | 7 | 13 | 19 | 61 |
| Payable Audit | Match Type Control | Pay Invoice Without Order | 11% | 2 | 8 | 6 | 2 | 18 | 79 |
| Expense Mgmt Audit | Verification by AP | Collusion on Expenses | 70% | 5 | 20 | 10 | 10 | 14 | 93 |
| Revenue Mgmt Audit | Approval of Credit Request | Bad Debt | 80% | 4 | 16 | 5 | 11 | 14 | 107 |
| Warehouse Audit | Cycle Count | Theft From Warehouse | 80% | 5 | 20 | 10 | 10 | 13 | 120 |
| Transport Audit | Proof of Delivery Signature | Spoilage in Transit | 67% | 3 | 12 | 3 | 9 | 13 | 133 |
| Warehouse Audit | Approval of Cycle Count Adjustment | Miscount | 54% | 4 | 8 | 4 | 4 | 7 | 140 |
| Inventory Mgmt Audit | Days of Sales in Inventory | Obsolete Stock | 41% | 2 | 6 | 3 | 3 | 7 | 147 |
| Warehouse Audit | Order Backlog Movement Reconciliation | Ship with No Invoice | 70% | 5 | 10 | 8 | 2 | 3 | 150 |
| Payable Audit | Duplicate Invoice Check | Pay Invoice Twice | 93% | 5 | 10 | 7 | 3 | 3 | 153 |
| Asset Mgmt Audit | Depreciation Reserve Review | Provision for Replacement Inadequate | 54% | 2 | 4 | 3 | 1 | 2 | 155 |
| Financial Statement Preparation Audit | Chief Accountant Review | Liabilities not Recorded | 53% | 3 | 3 | 2 | 1 | 2 | 157 |
| Tax Audit | | Tax Underpaid | 90% | 2 | 2 | 1 | 1 | 1 | 158 |
| Payable Audit | Match Type Control | Pay Invoice for Substandard Goods | 67% | 2 | 6 | 6 | 0 | 0 | 158 |
| Cash Processing Audit | Bank Reconciliation | Receipts not Banked | 26% | 3 | 6 | 6 | 0 | 0 | 158 |
| Cash Processing Audit | Bank Reconciliation | Dispersements not Recorded | 93% | 2 | 4 | 4 | 0 | 0 | 158 |
| Revenue Management Audit | Inventory Movement Reconciliation | Revenue recorded without Cost of Goods Sold | 72% | 4 | 4 | 4 | 0 | 0 | 158 |
| Revenue Management Audit | Revenue Accounting Procedures | Revenue Released when Customer has right of return | 60% | 1 | 3 | 3 | 0 | 0 | 158 |
| Asset Management Audit | Depreciation Reserve Review | Assets Overvalued | 70% | 2 | 2 | 2 | 0 | 0 | 158 |

Additionally, as discussed above, multiple controls can be associated with a risk. In an further embodiment, a cumulative weighted exposure for each risk can be determined from the combined reliability value of all of the controls associated with this risk. Controls can be identified, ranked, displayed, and selected for auditing using reliability weighted exposure values in a similar manner to that used for controls having un-weighted exposure values discussed above.

Figure 34:
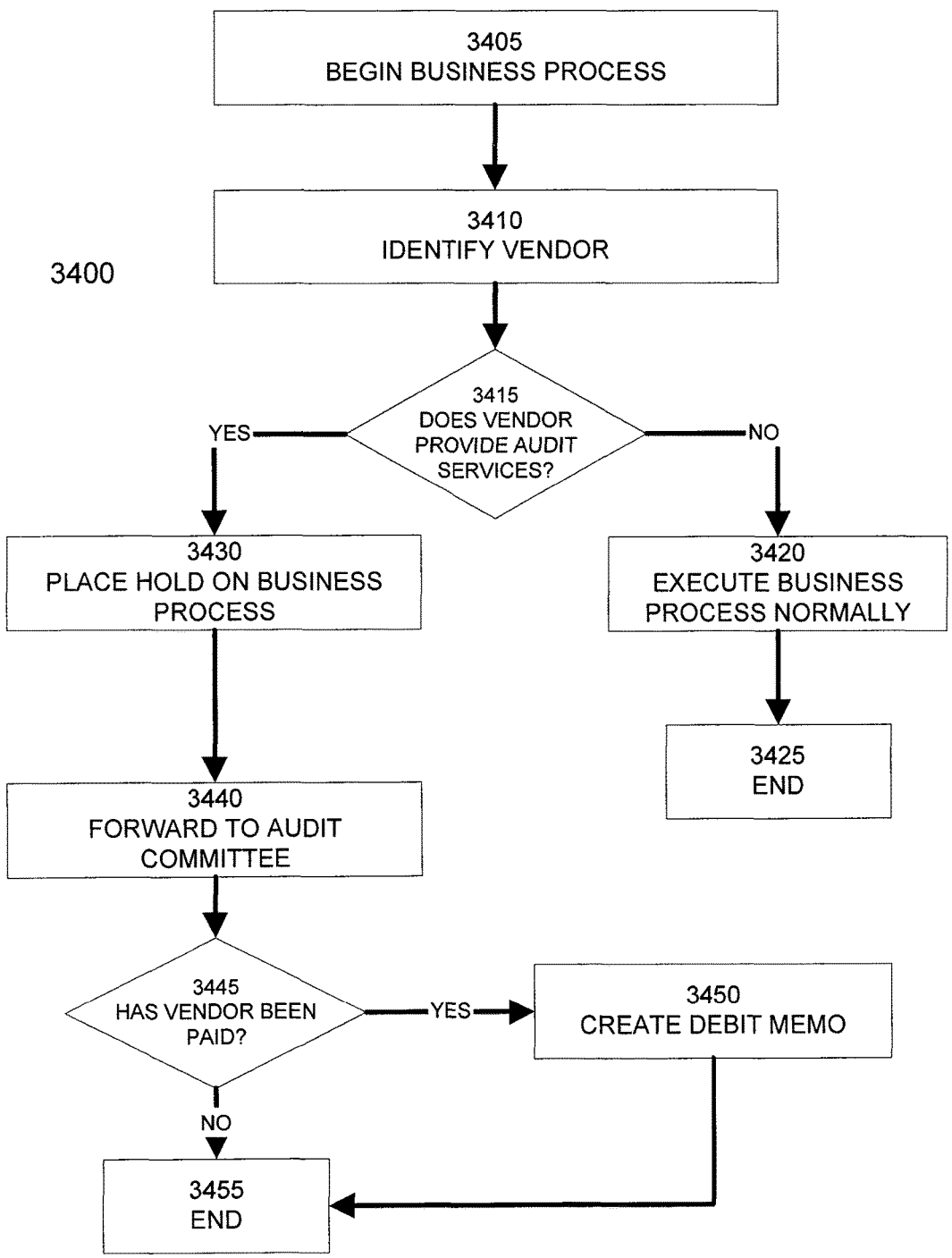
FIG. 34 illustrates a method for automatically monitoring and handling business processes for prohibited non-audit services according to one embodiment of the invention.

FIG. 34 illustrates a method 3400 for automatically monitoring and handling business processes for prohibited non-audit services according to one embodiment. For example, under the Sarbanes-Oxley Act of 2002, an enterprise's appointed auditor is prohibited from providing other non-audit related services. Step 3405 begins an instance of one or more business process to be monitored for prohibited non-audit services. Example business processes to be monitored include accounts payable business processes for paying invoices received by the enterprise and purchasing business processes for arranging the purchase of products and/or services by the enterprise. In general, any business process of an enterprise associated with a contractual relationship with an auditor may be monitored for prohibited non-audited services.

Step 3410 identifies the vendor associated with the instance of the business process. Step 3415 determines whether the identified vendor provides audit services. In one embodiment, the audit system maintains information for each vendor that provides any product and/or service to the enterprise. The information for each vendor can include a data field, flag, or other data structure the type of service or product provided by the vendor or to explicitly indicate whether the vendor provides audit services and/or is the enterprise's appointed auditor. In one embodiment, this information is provided when the vendor is first added to the audit system. In this embodiment, step 3415 retrieves the vendor information corresponding with the identified vendor from the audit system to determine whether the vendor is prohibited from providing any non-audit services to the enterprise. In some cases, any vendor providing audit-related services may be prohibited from also providing non-audit services. In other cases, only the enterprise's appointed auditor is prohibited from performing non-audit services and other vendors may perform both audit and non-audit related services. In one embodiment, the data field, flag, or other data structure associated with each vendor in the audit system can be configured to account for these different cases.

If step 3415 determines that the identified vendor is not prohibited from performing non-audit services to the enterprise, method 3400 proceeds to step 3420. Step 3420 executes the instance of the business process normally. Following step 3420, step 3425 ends the method until another instance of a business process monitored by the method 3400 is invoked.

Conversely, if step 3415 determines that the identified vendor does provide an audit services to the enterprise, method 3400 proceeds to step 3430. Step 3430 suspends the instance of the business process. In one embodiment, step 3430 places a hold on the instance of the business process. The hold prevents the instance of the business process from being completed until the hold is released.

Step 3440 forwards the information about the instance of the business process to the audit committee of the enterprise. In one embodiment, step 3440 can utilize the messaging and communication system described above. In one embodiment, the information about the instance of the business process includes details of the invoked business process, such as an invoice or purchase order being processed by the invoked business process. In a further embodiment, the information can include data on why the invoked business process is on hold and one or more steps necessary to remove the hold.

Step 3445 determines if the vendor has been paid for the product or service associated with the invoked business process. In one embodiment, the audit system is interfaced with an accounting system or database that maintains payment information for purchase orders, invoices, or other types of information from similar business processes. In another embodiment, the invoked business process includes information about whether the vendor has already been paid for the good or service in question.

If the vendor has not been paid for the good or service associated with the invoked business process, method 3400 proceeds to step 3455, which ends the method 3400 until another instance of a business process monitored by the method 3400 is invoked.

Conversely, if the enterprise has already paid for the good or service associated with the invoked business process, method 3400 proceeds to step 3450. one embodiment of step 3450 creates a debit memo, or demand for a refund, in the enterprise's accounts payable system. In an alternate embodiments, step 3450 can initiate a refund demand in other ways. Following step 3450, method 3400 proceeds to step 3455, which ends the method 3400 until another instance of a business process monitored by the method 3400 is invoked.

Following method step 3430 of method 3400, the audit committee or any other designated authority in the enterprise can review the suspended instance of the business process. If the instance of the business process does not fall into a category of prohibited services, then the audit committee can approve the invoked business process. Otherwise, the audit committee can terminate the invoked business process. In one embodiment, the audit system records the disposition of the suspended business process by the audit committee.

In one embodiment, if the audit committee approves the invoked business process, then the audit system will resume execution of the invoked business process.

Exemplary Operating Environments Components and Technology

Figure 35:
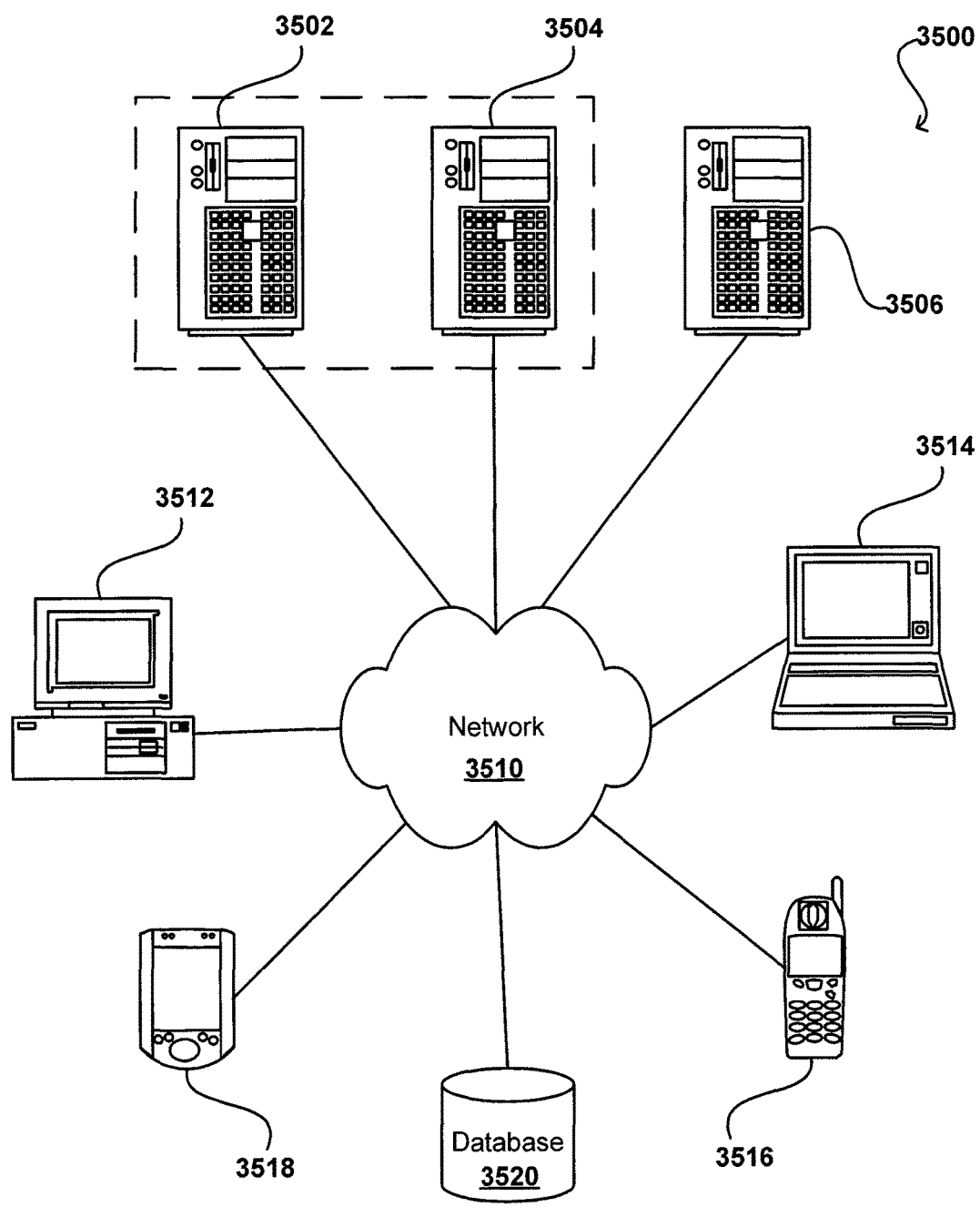
FIG. 35 illustrates components of a computer network that can be used in accordance with one embodiment of the present invention.

FIG. 35 is a block diagram illustrating components of an exemplary operating environment in which various embodiments of the present invention may be implemented. The system 3500 can include one or more user computers, computing devices, or processing devices 3512, 3514, 3516, 3518, which can be used to operate a client, such as a dedicated application, Web browser, etc. The user computers 3512, 3514, 3516, 3518 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 3512, 3514, 3516, 3518 may also have any of a variety of applications, including one or more development systems, database client and/or server applications, and Web browser applications. Alternatively, the user computers 3512, 3514, 3516, 3518 may be any other electronic device, such as a thin-client computer, Internet-enabled gaming system, and/or personal messaging device, capable of communicating via a network (e.g., the network 3510 described below) and/or displaying and navigating Web pages or other types of electronic documents. Although the exemplary system 3500 is shown with four user computers, any number of user computers may be supported.

In most embodiments, the system 3500 includes some type of network 3510. The network may can be any type of network familiar to those skilled in the art that can support data communications using any of a variety of commercially-available protocols, including without limitation TCP/IP, SNA, IPX, AppleTalk, and the like. Merely by way of example, the network 3510 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 3502, 3504, 3506 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 3506) may be dedicated to running applications, such as a business application, a Web server, application server, etc. Such servers may be used to process requests from user computers 3512, 3514, 3516, 3518. The applications can also include any number of applications for controlling access to resources of the servers 3502, 3504, 3506.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 3512, 3514, 3516, 3518. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 3512, 3514, 3516, 3518.

The system 3500 may also include one or more databases 3520. The database(s) 3520 may reside in a variety of locations. By way of example, a database 3520 may reside on a storage medium local to (and/or resident in) one or more of the computers 3502, 3504, 3506, 3512, 3514, 3516, 3518. Alternatively, it may be remote from any or all of the computers 3502, 3504, 3506, 3512, 3514, 3516, 3518, and/or in communication (e.g., via the network 3510) with one or more of these. In a particular set of embodiments, the database 3520 may reside in a storage-area network ("SAN") familiar to those skilled in the art. Similarly, any necessary files for performing the functions attributed to the computers 3502, 3504, 3506, 3512, 3514, 3516, 3518 may be stored locally on the respective computer and/or remotely, as appropriate. In one set of embodiments, the database 3520 may be a relational database, such as Oracle 10 g, that is adapted to store, update, and retrieve data in response to SQL-formatted commands.

Figure 36:
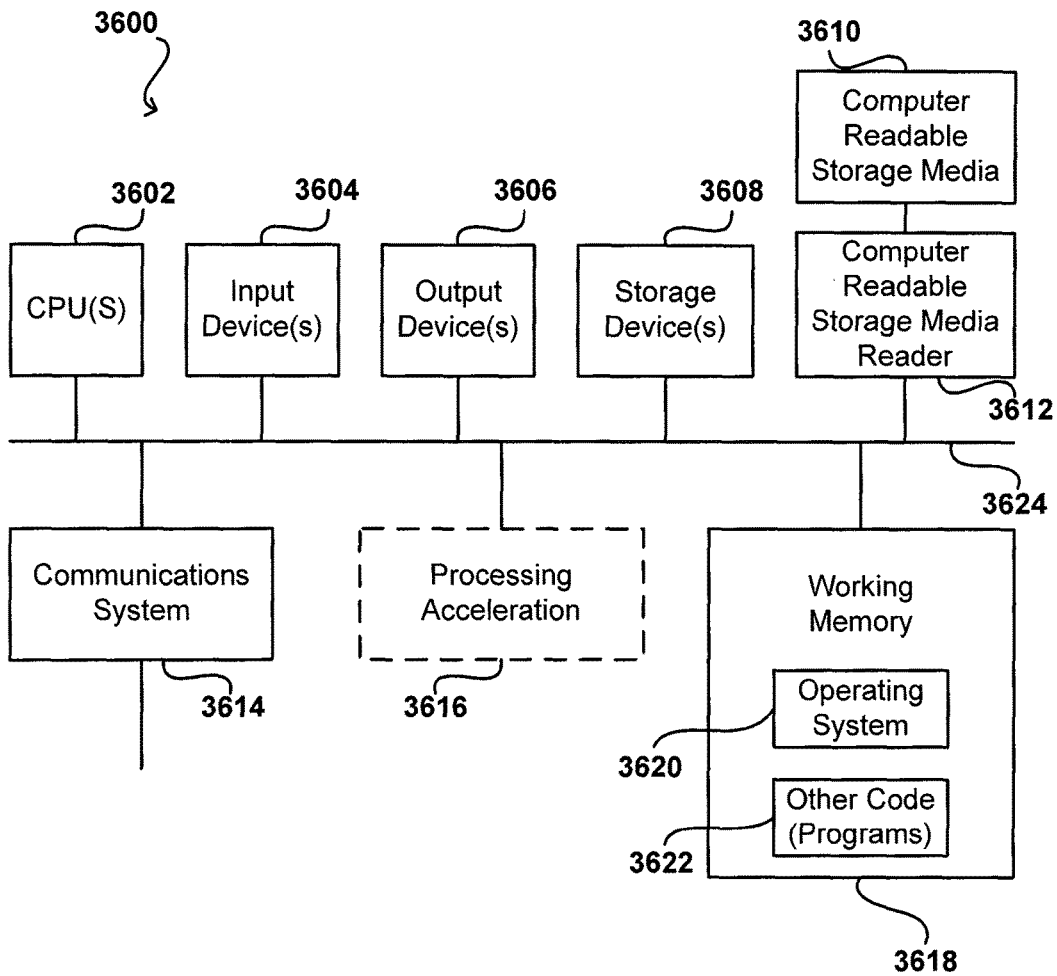
FIG. 36 illustrates components of a computerized device that can be used in accordance with one embodiment of the present invention.

FIG. 36 illustrates an exemplary computer system 3600, in which various embodiments of the present invention may be implemented. The system 3600 may be used to implement any of the computer systems described above. The computer system 3600 is shown comprising hardware elements that may be electrically coupled via a bus 3624. The hardware elements may include one or more central processing units (CPUs) 3602, one or more input devices 3604 (e.g., a mouse, a keyboard, etc.), and one or more output devices 3606 (e.g., a display device, a printer, etc.). The computer system 3600 may also include one or more storage devices 3608. By way of example, the storage device(s) 3608 can include devices such as disk drives, optical storage devices, solid-state storage device such as a random access memory ("RAM") and/or a read-only memory ("ROM"), which can be programmable, flash-updateable and/or the like.

The computer system 3600 may additionally include a computer-readable storage media reader 3612, a communications system 3614 (e.g., a modem, a network card (wireless or wired), an infra-red communication device, etc.), and working memory 3618, which may include RAM and ROM devices as described above. In some embodiments, the computer system 3600 may also include a processing acceleration unit 3616, which can include a digital signal processor DSP, a special-purpose processor, and/or the like.

The computer-readable storage media reader 3612 can further be connected to a computer-readable storage medium 3610, together (and, optionally, in combination with storage device(s) 3608) comprehensively representing remote, local, fixed, and/or removable storage devices plus storage media for temporarily and/or more permanently containing, storing, transmitting, and retrieving computer-readable information. The communications system 3614 may permit data to be exchanged with the network and/or any other computer described above with respect to the system 3600.

The computer system 3600 may also comprise software elements, shown as being currently located within a working memory 3618, including an operating system 3620 and/or other code 3622, such as an application program (which may be a client application, Web browser, mid-tier application, RDBMS, etc.). It should be appreciated that alternate embodiments of a computer system 3600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method comprising:
storing information in a data store for each respective vendor of a plurality of vendors that provide services to an enterprise including associating with each vendor a respective flag of a plurality of flags, the respective flag indicative of whether the respective vendor providing a first type of service is prohibited from also providing a second type of service;
defining, within a process library of a workflow system, a set of processes for executing a planned series of functions on a processor, the set of processes invokable by a plurality of workflow-enabled applications that are in communication with the workflow system, wherein at least one workflow-enabled application providing a particular function for checking security of at least one software resource;
registering, within a registry of the workflow system, a set of one or more functions that are incompatible with the particular function and defined within the process library, wherein the particular function includes a plurality of sub-functions, wherein the sub-functions inherit incompatibility from the particular function and correspond to menus of the workflow-enabled applications such that a collection of sub-functions that are compatible with the particular function may be activated via a particular menu for the particular function, wherein at least one sub-function in the plurality of sub-functions is a sub-function of another sub-function in the plurality of sub-functions;
monitoring, by the processor, the workflow system while the workflow system is implementing the set of processes to detect that an instance of a particular process in the set of processes is invoked by a particular workflow-enabled application of the plurality of workflow-enabled applications in communication with the workflow system;
recording, by the processor, details of the instance of the particular process invoked by the particular workflow-enabled application, the process including one or more functions registered within the workflow system and executable by the process to implement at least a portion of a non-audit service;
identifying, by the processor, from the recorded details of the instance of the particular process invoked by the particular workflow-enabled application, that a particular user (a) is associated with a first vendor mapped to a first flag, of the plurality of flags, indicating the first vendor offers the first type of service that is incompatible with the non-audit service and is prohibited from causing execution of processes implementing the non-audit service, and (b) is accessing the one or more functions registered within the workflow system, wherein the one or more functions are incompatible with the particular function;
after identifying that the particular user (a) is associated with the first vendor mapped to the first flag, of the plurality of flags, indicating the first vendor offers the first type of service that is incompatible with the non-audit service and is prohibited from causing execution of processes implementing the non-audit service and (b) is accessing the one or more functions registered within the workflow system,
(a) preventing execution, by the processor, of the instance of the particular process invoked by the particular workflow-enabled application; and
(b) preventing, by the workflow system, the particular user from accessing the particular function and the plurality of sub-functions from the menus of the workflow enabled applications after the particular user has accessed the one or more functions that are incompatible with the particular function, wherein a second collection of sub-functions that are compatible with the one or more functions are accessible to the particular user via a menu interface.

2. The method of claim 1, further comprising monitoring a set of key performance indicators (KPI) values for the set of processes.

3. The method of claim 1, wherein preventing execution of the instance of the particular process is further performed responsive to determining that pre-approval for the non-audit service has expired.

4. The method of claim 1, further comprising automatically forwarding a message to an authority of the enterprise in response to execution being denied.

5. The method of claim 4, wherein the message includes one or both of information identifying the instance of the particular process and information on a step to execute the instance of the particular process.

6. The method of claim 4, further comprising:
resuming execution of the instance of the particular process in response to receiving approval for permissible service.

7. The method of claim 1, further comprising:
determining if the first vendor has been paid in conjunction with the instance of the particular process; and
creating a refund demand in response to a determination that the first vendor has been paid in conjunction with the instance of the particular process.

8. The method of claim 7, wherein the refund demand includes a debit memo in an accounting system.

9. The method of claim 1, wherein the particular process includes an accounts payable business process.

10. The method of claim 9, wherein the instance of the particular process includes an invoice from the first vendor.

11. The method of claim 1, wherein the particular process includes a purchasing business process.

12. The method of claim 11, wherein the instance of the particular process includes a purchase order directed to the first vendor.

13. A non-transitory information storage medium storing a plurality of instructions adapted to direct an information processing device, the non-transitory information storage medium comprising:
instructions for storing information in a data store for each respective vendor of a plurality of vendors that provide services to an enterprise including associating with each vendor a respective flag of a plurality of flags, the respective flag indicative of whether the respective vendor providing a first type of service is prohibited from also providing a second type of service;

instructions for defining, within a process library of a workflow system, a set of processes for executing a planned series of functions on a processor, the set of processes invokable by a plurality of workflow-enabled applications that are in communication with the workflow system, wherein at least one workflow-enabled application provides a particular function for checking security of at least one software resource;

instructions for registering, within a registry of the workflow system, a set of one or more functions that are incompatible with the particular function and defined within the process library, wherein the particular function includes a plurality of sub-functions, wherein the sub-functions inherit incompatibility from the particular function and correspond to menus of the workflow-enabled applications such that a first collection of sub-functions that are compatible with the particular function may be activated via a particular menu for the particular function, wherein at least one sub-function in the plurality of sub-functions is a sub-function of another sub-function in the plurality of sub-functions;

instructions for monitoring the workflow system while the workflow system is implementing the set of processes to detect that an instance of a particular process in the set of processes is invoked by a particular workflow-enabled application of the plurality of workflow-enabled applications in communication with the workflow system;

instructions for recording details of the instance of the particular process invoked by the particular workflow-enabled application, the particular process including one or more functions registered within the workflow system and executable by the processor to implement at least a portion of a non-audit service;

instructions for identifying from the recorded details of the instance of the particular process invoked by the particular workflow-enabled application, that a particular user (a) is associated with a first vendor mapped to a first flag, of the plurality of flags, indicating the first vendor offers the first type of service that is incompatible with the non-audit service and is prohibited from causing execution of processes implementing the non-audit service, and (b) is accessing the one or more functions registered within the workflow system, wherein the one or more functions are incompatible with the particular function;

instructions for after identifying that the particular user (a) is associated with the first vendor mapped to the first flag, of the plurality of flags, indicating the first vendor offers the first type of service that is incompatible with the non-audit service and is prohibited from causing execution of processes implementing the non-audit service and (b) is accessing the one or more functions registered within the workflow system,
(a) preventing execution, by the processor, of the instance of the particular process invoked by the particular workflow-enabled application; and
(b) preventing, by the workflow system, the particular user from accessing the particular function and the plurality of sub-functions from the menus of the workflow enabled applications after the particular user has accessed the one or more functions that are incompatible with the particular function, wherein a second collection of sub-functions that are compatible with the particular function ii one or more functions are accessible to the particular user via a menu interface.

14. The non-transitory information storage medium of claim 13, further comprising instructions for automatically forwarding a message to an authority of the enterprise in response to a determination that the first vendor is prohibited from providing the non-audit service to the enterprise.

15. The non-transitory information storage medium of claim 14, wherein the message includes information identifying the instance of the particular process.

16. The non-transitory information storage medium of claim 14, wherein the message includes information on a step to continue execution of the instance of the particular process.

17. The non-transitory information storage medium of claim 14, wherein the authority includes an audit committee member of the enterprise.

18. The non-transitory information storage medium of claim 14, further comprising:
instructions for receiving an approval message from the authority;
instructions for storing at least a portion of the approval message; and
instructions for resuming execution of the instance of the particular process in response to the approval message.

19. The non-transitory information storage medium of claim 14, further comprising:
instructions for receiving a denial message from the authority;
instructions for storing at least a portion of the denial message; and
instructions for terminating execution of the instance of the particular process in response to the denial message.

20. The non-transitory information storage medium of claim 13, further comprising:
instructions for determining if the first vendor has been paid in conjunction with the instance of the particular process; and
instructions for creating a refund demand in response to a determination that the first vendor has been paid in conjunction with the instance of the particular process.

21. The non-transitory information storage medium of claim 20, wherein the refund demand includes a debit memo in an accounting system.

22. The non-transitory information storage medium of claim 13, wherein the particular process includes an accounts payable business process.

23. The non-transitory information storage medium of claim 22, wherein the instance of the particular process includes an invoice from the first vendor.

24. The non-transitory information storage medium of claim 13, wherein the particular process includes a purchasing business process.

25. A system for executing business processes in an enterprise; the system comprising:
a hardware processor; and
a memory storing a set of instructions which when executed by the hardware processor configure the hardware processor to:
store information in a data store for each respective vendor of a plurality of vendors that provide services to an enterprise including associating with each vendor a respective flag of a plurality of flags, the respective flag indicative of whether the respective vendor providing a first type of service is prohibited from also providing a second type of service;

define, within a process library of a workflow system, a set of processes for executing a planned series of functions on a processor, the set of processes invokable by a plurality of workflow-enabled applications that are in communication with the workflow system, wherein at least one workflow-enabled application provides a particular function for checking security of at least one software resource;

register, within a registry of the workflow system, a set of one or more functions that are incompatible with the particular function and defined within the process library, wherein the particular function includes a plurality of sub-functions, wherein the sub-functions inherit incompatibility from the particular function and correspond to menus of the workflow-enabled applications such that a collection of sub-functions that are compatible with the particular function may be activated via a particular menu for the particular function, wherein at least one sub-function in the plurality of sub-functions is a sub-function of another sub-function in the plurality of sub-functions;

monitor the workflow system while the workflow system is implementing the set of processes to detect that an instance of a particular process in the set of processes is invoked by a particular workflow-enabled application of the plurality of workflow-enabled applications in communication with the workflow system;

record details of the instance of the particular process invoked by the particular workflow-enabled application, the process including one or more functions registered within the workflow system and executable by the process to implement at least a portion of a non-audit service;

identify from the recorded details of the instance of the particular process invoked by the particular workflow-enabled application, that a particular user (a) is associated with a first vendor mapped to a first flag, of the plurality of flags, indicating the first vendor offers the first type of service that is incompatible with the non-audit service and is prohibited from causing execution of processes implementing the non-audit service, and (b) is accessing the one or more functions registered within the workflow system, wherein the one or more functions are incompatible with the particular function;

after identifying that the particular user (a) is associated with the first vendor mapped to a first flag, of the plurality of flags, indicating the first vendor offers the first type of service that is incompatible with the non-audit service and is prohibited from causing execution of processes implementing the non-audit service and (b) is accessing the one or more functions registered within the workflow system, (a) prevent execution, by the hardware processor, of the instance of the particular process invoked by the particular workflow-enabled application; and (b) prevent the particular user from accessing the particular function and the plurality of sub-functions from the menus of the workflow enabled applications after the particular user has accessed the one or more functions that are incompatible with the particular function, wherein a second collection of sub-functions that are compatible with the one or more functions are accessible to the particular user via a menu interface.

26. The non-transitory information storage medium of claim 13 further comprising instructions for monitoring a set of key performance indicators (KPI) values for the set of processes.

* * * * *

UNITED STATES PATENT AND TRADEMARK OFFICE
CERTIFICATE OF CORRECTION

PATENT NO. : 10,453,029 B2
APPLICATION NO. : 11/831762
DATED : October 22, 2019
INVENTOR(S) : King et al.

Page 1 of 1

It is certified that error appears in the above-identified patent and that said Letters Patent is hereby corrected as shown below:

On the Title Page

Column 1, under Title, Line 1, after "ULTRA" insert -- VIRES --.

On page 3, Column 1, Item (56) under Other Publications, Line 16, delete "Learnng." and insert -- Learning. --, therefor.

In the Drawings

On sheet 37 of 45, in FIG. 28, delete "Underpayed" and insert -- Underpaid --, therefor.

In the Specification

In Column 1, Line 1, after "ULTRA" insert -- VIRES --.

In Column 46, Line 43, delete "Environments Components" and insert -- Environments, Components, --, therefor.

In the Claims

In Column 52, Line 1, in Claim 13, after "the" delete "particular function ii".

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*